US011677895B2

(12) United States Patent
Kawai et al.

(10) Patent No.: US 11,677,895 B2
(45) Date of Patent: Jun. 13, 2023

(54) IMAGING ELEMENT, IMAGING APPARATUS, OPERATION METHOD OF IMAGING ELEMENT, AND PROGRAM

(71) Applicant: FUJIFILM CORPORATION, Tokyo (JP)

(72) Inventors: Tomoyuki Kawai, Saitama (JP); Hitoshi Sakurabu, Saitama (JP); Ryo Hasegawa, Saitama (JP); Makoto Kobayashi, Saitama (JP); Kazufumi Sugawara, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 89 days.

(21) Appl. No.: 17/397,995

(22) Filed: Aug. 10, 2021

(65) Prior Publication Data

US 2021/0368072 A1    Nov. 25, 2021

Related U.S. Application Data

(63) Continuation of application No. PCT/JP2020/002927, filed on Jan. 28, 2020.

(30) Foreign Application Priority Data

Feb. 20, 2019  (JP) .............................. JP2019-028841

(51) Int. Cl.
*H04N 5/04* (2006.01)
*H04N 5/77* (2006.01)
(Continued)

(52) U.S. Cl.
CPC .............. *H04N 5/04* (2013.01); *H04N 5/772* (2013.01); *H04N 23/617* (2023.01); *H04N 23/665* (2023.01); *H04N 23/80* (2023.01)

(58) Field of Classification Search
CPC ........ H04N 5/04; H04N 5/772; H04N 23/617; H04N 23/665; H04N 23/80; H04N 25/75;
(Continued)

(56) References Cited

U.S. PATENT DOCUMENTS 7,511,713 B2 *   3/2009  Sadanand .............. G09G 5/399
                                                                345/545
2005/0168610 A1   8/2005  Kobayashi
(Continued)

FOREIGN PATENT DOCUMENTS

CN          1649393 A      8/2005
CN        103095989 A      5/2013
(Continued)

OTHER PUBLICATIONS

English language translation of the following: Office action dated Sep. 14, 2022 from the SIPO in a Chinese patent application No. 202080015089.2 corresponding to the instant patent application. This office action translation is submitted now in order to supplement the understanding of the cited references which are being disclosed in the instant Information Disclosure Statement.
(Continued)

*Primary Examiner* — Abdelaaziz Tissire
(74) *Attorney, Agent, or Firm* — Solaris Intellectual Property Group, PLLC

(57) ABSTRACT

Provided is an imaging element including a reception interface that receives an imaging synchronization signal related to a timing of imaging and at least one output synchronization signal related to a timing of output of image data obtained by imaging from an outside of the imaging element, a memory that is incorporated in the imaging element and stores the image data obtained by imaging at a first frame rate in accordance with the imaging synchronization signal received by the reception interface, and an output
(Continued)

circuit that is incorporated in the imaging element and outputs the image data stored in the memory at a second frame rate in accordance with the output synchronization signal received by the reception interface, in which the first frame rate is greater than or equal to the second frame rate.

19 Claims, 30 Drawing Sheets

(51) Int. Cl.
  *H04N 23/80* (2023.01)
  *H04N 23/617* (2023.01)
  *H04N 23/60* (2023.01)

(58) Field of Classification Search
  CPC ........ H04N 5/783; H04N 23/00; H04N 23/53; H04N 5/225; H04N 5/232; H04N 5/378
  See application file for complete search history.

(56) References Cited

U.S. PATENT DOCUMENTS

| | | | | |
|---|---|---|---|---|
| 2006/0132651 A1* | 6/2006 | Matsushima | ........ | H04N 5/0736 348/513 |
| 2013/0114938 A1 | 5/2013 | Kuriyama | | |
| 2015/0163403 A1* | 6/2015 | Wakabayashi | ....... | H04N 25/772 348/308 |
| 2016/0006923 A1* | 1/2016 | Imamura | .............. | H04N 23/689 348/208.11 |
| 2017/0359524 A1 | 12/2017 | Hosono et al. | | |
| 2017/0374275 A1* | 12/2017 | Shimokura | ............ | H04N 23/65 |
| 2019/0204448 A1* | 7/2019 | Eki | ......... | H04N 23/61 |

FOREIGN PATENT DOCUMENTS

| | | |
|---|---|---|
| CN | 104429057 A | 3/2015 |
| CN | 107493423 A | 12/2017 |
| JP | 2004-221955 A | 8/2004 |
| JP | 2005-57809 A | 3/2005 |
| JP | 2007-295096 A | 11/2007 |
| JP | 2007-295616 A | 11/2007 |
| JP | WO2014/007004 A1 | 6/2016 |
| WO | 2014/007004 A1 | 1/2014 |

OTHER PUBLICATIONS

International Search Report issued in International Application No. PCT/JP2020/002927 dated Apr. 21, 2020.
Written Opinion of the ISA issued in International Application No. PCT/JP2020/002927 dated Apr. 21, 2020.
International Preliminary Report on Patentability issued in International Application No. PCT/JP2020/002927 dated Aug. 11, 2020.

* cited by examiner

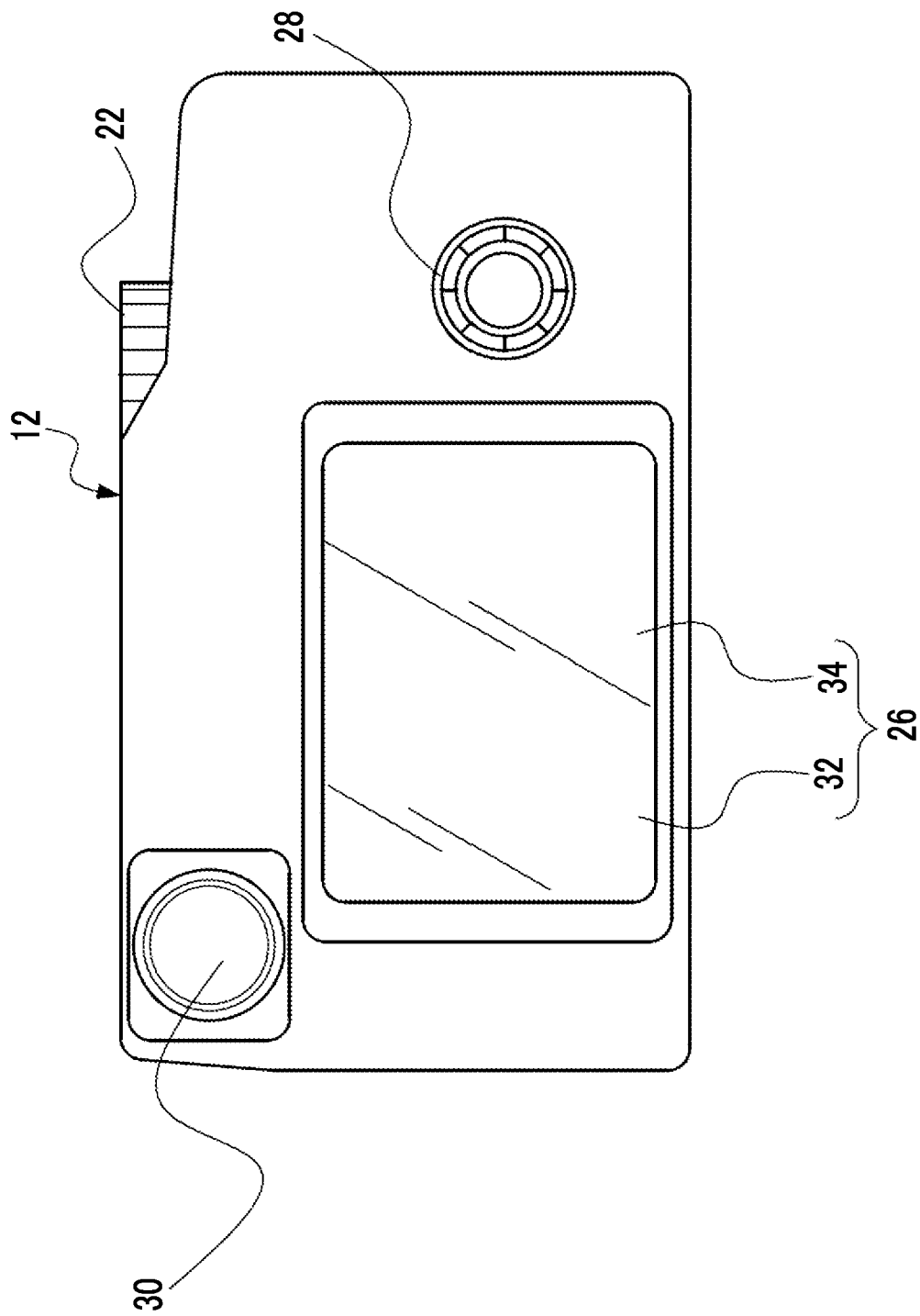

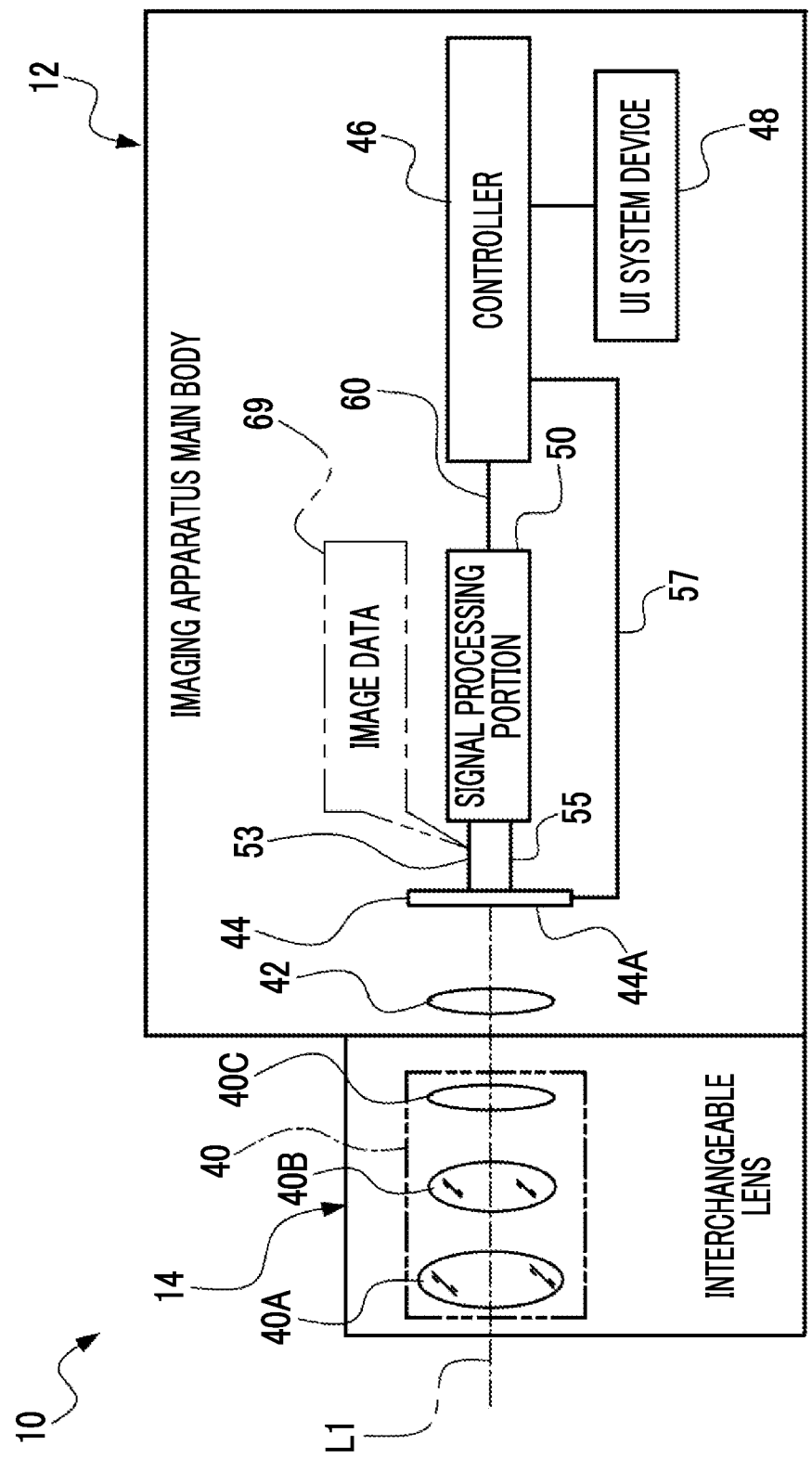

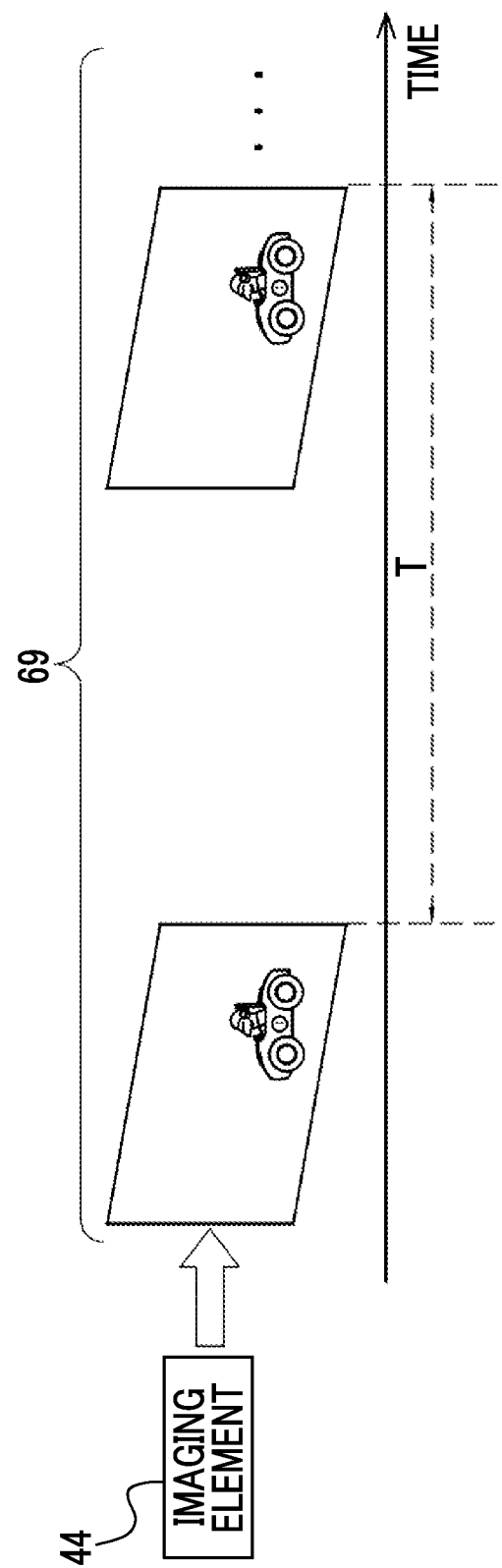

IMAGING ELEMENT, IMAGING APPARATUS, OPERATION METHOD OF IMAGING ELEMENT, AND PROGRAM

CROSS-REFERENCE TO RELATED APPLICATIONS

This application is a continuation application of International Application No. PCT/JP2020/002927, filed Jan. 28, 2020, the disclosure of which is incorporated herein by reference in its entirety. Further, this application claims priority from Japanese Patent Application No. 2019-028841, filed Feb. 20, 2019, the disclosure of which is incorporated herein by reference in its entirety.

BACKGROUND

1. Technical Field

The technology of the present disclosure relates to an imaging element, an imaging apparatus, an operation method of an imaging element, and a program.

2. Related Art

JP2014-7004A discloses an imaging element in which a chip in which a signal processing portion, a memory portion, a data processing portion, and a control portion are formed, and a chip in which a pixel array portion is formed are laminated. In the imaging element disclosed in JP2014-7004A, pixel data that is read out from each pixel of the pixel array portion and digitized is transferred to the memory portion at a first speed, and the pixel data is read out from the memory portion at a second speed lower than the first speed. The imaging element disclosed in JP2014-7004A operates based on reference signals such as a horizontal synchronization signal, a vertical synchronization signal, and a master clock provided from an outside of the chips.

JP2007-295096A discloses a digital camera in which a synchronization signal generated on an outside of an imaging element is input into the imaging element, and in which the imaging element operates in accordance with the synchronization signal input from the outside.

SUMMARY

An embodiment according to the technology of the present disclosure provides an imaging element, an imaging apparatus, an operation method of an imaging element, and a program capable of implementing imaging and output corresponding to a situation of an outside of the imaging element.

A first aspect according to the technology of the present disclosure is an imaging element comprising a reception portion that receives an imaging synchronization signal related to a timing of imaging and at least one output synchronization signal related to a timing of output of image data obtained by imaging from an outside of the imaging element, a storage portion that is incorporated in the imaging element and stores the image data obtained by imaging at a first frame rate in accordance with the imaging synchronization signal received by the reception portion, and an output portion that is incorporated in the imaging element and outputs the image data stored in the storage portion at a second frame rate in accordance with the output synchronization signal received by the reception portion, in which the first frame rate is greater than or equal to the second frame rate. Accordingly, imaging and output corresponding to a situation of the outside of the imaging element can be implemented.

A second aspect according to the technology of the present disclosure is the imaging element according to the first aspect, in which the imaging synchronization signal is a signal including at least one of an imaging vertical synchronization signal or an imaging horizontal synchronization signal. Accordingly, an imaging timing can be adjusted from the outside of the imaging element.

A third aspect according to the technology of the present disclosure is the imaging element according to the first or second aspect, in which the output synchronization signal is a signal including at least one of an output vertical synchronization signal or an output horizontal synchronization signal. Accordingly, an output timing can be adjusted from the outside of the imaging element.

A fourth aspect according to the technology of the present disclosure is the imaging element according to any one of the first to third aspects, in which the output portion includes a plurality of output interfaces, and the reception portion receives a plurality of the output synchronization signals respectively corresponding to the plurality of output interfaces. Accordingly, even in a case where a plurality of output destinations of the image data are present, the image data can be processed in accordance with a situation of each output destination.

A fifth aspect according to the technology of the present disclosure is the imaging element according to any one of the first to fourth aspects, in which the output portion outputs latest image data that is stored in the storage portion at a point in time when the output synchronization signal is received by the reception portion. Accordingly, real-timeness between imaging and output can be increased, compared to a case where the image data stored earlier than the point in time when the output synchronization signal is received is output.

A sixth aspect according to the technology of the present disclosure is the imaging element according to any one of the first to fourth aspects, in which the output portion outputs latest image data that is a latest one among a plurality of pieces of the image data, and in a case where storage of the image data of one frame related to a subject imaged at a current point in time in the storage portion is completed within an output completion time period predicted as a time period in which output of the image data of one frame is completed, the latest image data is the image data of one frame related to the subject imaged at the current point in time, and in a case where storage of the image data of one frame related to the subject imaged at the current point in time in the storage portion is not completed within the output completion time period, the latest image data is the image data of which one frame is already stored in the storage portion. Accordingly, both of the real-timeness between imaging and output and avoidance of a delay in output of the image data can be established.

A seventh aspect according to the technology of the present disclosure is the imaging element according to the sixth aspect, in which in a case where storage of the latest image data in the storage portion is not completed within the output completion time period, the latest image data is the latest one stored in the storage portion. Accordingly, the real-timeness between imaging and output can be secured, compared to a case where the image data already stored in the storage portion earlier by a plurality of frames than the image data that is being stored in the storage portion at the current point in time is output.

An eighth aspect according to the technology of the present disclosure is the imaging element according to the sixth or seventh aspect, in which the output synchronization signal is a signal including an output horizontal synchronization signal, and the output completion time period is a time period that is predicted based on a cycle in which the output horizontal synchronization signal is received by the reception portion. Accordingly, the output completion time period can be accurately obtained, compared to a case where the output completion time period is obtained using a signal other than the output horizontal synchronization signal.

A ninth aspect according to the technology of the present disclosure is the imaging element according to any one of the first to eighth aspects, in which the imaging synchronization signal is a signal including an imaging vertical synchronization signal, and the imaging element further comprises an imaging system holding portion that holds imaging system driving method instruction information for providing an instruction for a driving method of an imaging system of the imaging element, and an imaging system control portion that, in a case where the imaging vertical synchronization signal is received by the reception portion, performs a control for driving the imaging system using the driving method of the instruction provided by the imaging system driving method instruction information held by the imaging system holding portion. Accordingly, the imaging system can be driven using the driving method of the instruction provided by the imaging system driving method instruction information for each frame.

A tenth aspect according to the technology of the present disclosure is the imaging element according to the ninth aspect, in which the reception portion receives imaging system rewriting content information indicating a content of rewriting of the imaging system driving method instruction information, and in a case where the imaging system rewriting content information is received by the reception portion, the imaging system driving method instruction information held by the imaging system holding portion is rewritten with the content indicated by the imaging system rewriting content information. Accordingly, the content of the imaging system driving method instruction information held in the imaging element can be rewritten from the outside of the imaging element.

An eleventh aspect according to the technology of the present disclosure is the imaging element according to the tenth aspect, in which the imaging system driving method instruction information is information including at least one of information related to an imaging region, information related to pixel thinning, information related to a pixel addition method, information related to an exposure time period, information related to conversion gain switching, information related to an analog gain, or information related to A/D conversion accuracy. Accordingly, a content of the information including at least one of the information related to the imaging region, the information related to the pixel thinning, the information related to the pixel addition method, the information related to the exposure time period, the information related to the conversion gain switching, the information related to the analog gain, or the information related to the A/D conversion accuracy held in the imaging element can be rewritten from the outside of the imaging element.

A twelfth aspect according to the technology of the present disclosure is the imaging element according to any one of the first to eleventh aspects, in which the output synchronization signal is a signal including an output vertical synchronization signal, and the imaging element further comprises an output system holding portion that holds output system driving method instruction information for providing an instruction for a driving method of an output system of the imaging element, and an output system control portion that, in a case where the output vertical synchronization signal is received by the reception portion, performs a control for driving the output system using the driving method of the instruction provided by the output system driving method instruction information held by the output system holding portion. Accordingly, the output system can be driven using the driving method of the instruction provided by the output system driving method instruction information for each frame.

A thirteenth aspect according to the technology of the present disclosure is the imaging element according to the twelfth aspect, in which the reception portion receives output system rewriting content information indicating a content of rewriting of the output system driving method instruction information, and in a case where the output system rewriting content information is received by the reception portion, the output system driving method instruction information held by the output system holding portion is rewritten with the content indicated by the output system rewriting content information. Accordingly, the content of the output system driving method instruction information held in the imaging element can be rewritten from the outside of the imaging element.

A fourteenth aspect according to the technology of the present disclosure is the imaging element according to the twelfth or thirteenth aspect, in which the output system driving method instruction information is information including at least one of information related to an output destination, information related to digital thinning, information related to a digital addition method, information related to an average number of output frames, information related to a digital gain, information related to the number of A/D output bits, or information related to a method of filling a lower empty bit. Accordingly, a content of the information including at least one of the information related to the output destination, the information related to the digital thinning, the information related to the digital addition method, the information related to the average number of output frames, the information related to the digital gain, the information related to the number of A/D output bits, or the information related to the method of filling the lower empty bit held in the imaging element can be rewritten from the outside of the imaging element.

A fifteenth aspect according to the technology of the present disclosure is the imaging element according to any one of the first to fourteenth aspects, in which at least a photoelectric conversion element and the storage portion are formed in one chip. Accordingly, portability of the imaging element is increased, compared to an imaging element in which the photoelectric conversion element and the storage portion are not formed in one chip.

A sixteenth aspect according to the technology of the present disclosure is the imaging element according to the fifteenth aspect, in which the imaging element is a laminated imaging element in which the photoelectric conversion element is laminated with the storage portion. Accordingly, a transfer speed of the image data from the photoelectric conversion element to the storage portion can be increased, compared to a case of not laminating the photoelectric conversion element and the storage portion.

A seventeenth aspect according to the technology of the present disclosure is an imaging apparatus comprising the imaging element according to any one of the first to sixteenth aspects, and a display control portion that performs a control for displaying an image based on the image data output by the output portion on a display portion. Accordingly, imaging and output corresponding to the situation of the outside of the imaging element can be implemented.

An eighteenth aspect according to the technology of the present disclosure is an operation method of an imaging element that includes a reception portion, a storage portion, and an output portion and incorporates the storage portion and the output portion, the operation method comprising, by the reception portion, receiving an imaging synchronization signal related to a timing of imaging and at least one output synchronization signal related to a timing of output of image data obtained by imaging from an outside of the imaging element, by the storage portion, storing the image data obtained by imaging at a first frame rate in accordance with the imaging synchronization signal received by the reception portion, by the output portion, outputting the image data stored in the storage portion at a second frame rate in accordance with the output synchronization signal received by the reception portion, and setting the first frame rate to be greater than or equal to the second frame rate. Accordingly, imaging and output corresponding to the situation of the outside of the imaging element can be implemented.

A nineteenth aspect according to the technology of the present disclosure is a program causing a computer to function as a reception portion and an output portion included in an imaging element that includes the reception portion, a storage portion, and the output portion and incorporates the storage portion and the output portion, in which the reception portion receives an imaging synchronization signal related to a timing of imaging and at least one output synchronization signal related to a timing of output of image data obtained by imaging from an outside of the imaging element, the storage portion stores the image data obtained by imaging at a first frame rate in accordance with the imaging synchronization signal received by the reception portion, the output portion outputs the image data stored in the storage portion at a second frame rate in accordance with the output synchronization signal received by the reception portion, and the first frame rate is greater than or equal to the second frame rate. Accordingly, imaging and output corresponding to the situation of the outside of the imaging element can be implemented.

A twentieth aspect according to the technology of the present disclosure is an imaging element comprising a processor and a memory each incorporated in the imaging element, in which the processor is configured to receive an imaging synchronization signal related to a timing of imaging and at least one output synchronization signal related to a timing of output of image data obtained by imaging from an outside of the imaging element, the memory stores the image data obtained by imaging at a first frame rate in accordance with the imaging synchronization signal received by the processor, the processor is configured to output the image data stored in the memory at a second frame rate in accordance with the received output synchronization signal, and the first frame rate is greater than or equal to the second frame rate.

BRIEF DESCRIPTION OF THE DRAWINGS

Exemplary embodiments of the technology of the disclosure will be described in detail based on the following figures, wherein:

FIG. 2 is a rear view illustrating an example of the exterior on a rear surface side of the imaging apparatus illustrated in FIG. 1;

FIG. 3 is a block diagram illustrating an example of a configuration of the imaging apparatus according to the first to fourth embodiments;

FIG. 4B is a conceptual diagram for describing an output frame rate of the imaging element included in the imaging apparatus according to the first to fifth embodiments;

DETAILED DESCRIPTION

Hereinafter, an example of embodiments of an imaging apparatus according to the embodiments of the technology of the present disclosure will be described in accordance with the appended drawings.

First, meanings of terms used in the following description will be described.

In the following description, the abbreviation CPU stands for "Central Processing Unit". In addition, in the following description, the abbreviation RAM stands for "Random Access Memory". In addition, in the following description, the abbreviation ROM stands for "Read Only Memory". In addition, in the following description, the abbreviation DRAM stands for "Dynamic Random Access Memory". In addition, in the following description, the abbreviation SRAM stands for "Static Random Access Memory".

In addition, in the following description, the abbreviation LSI stands for "Large-Scale Integration". In addition, in the following description, the abbreviation ASIC stands for "Application Specific Integrated Circuit". In addition, in the following description, the abbreviation PLD stands for "Programmable Logic Device". In addition, in the following description, the abbreviation FPGA stands for "Field-Programmable Gate Array".

In addition, in the following description, the abbreviation SSD stands for "Solid State Drive". In addition, in the following description, the abbreviation DVD-ROM stands for "Digital Versatile Disc Read Only Memory". In addition, in the following description, the abbreviation USB stands for "Universal Serial Bus". In addition, in the following description, the abbreviation HDD stands for "Hard Disk Drive". In addition, in the following description, the abbreviation EEPROM stands for "Electrically Erasable and Programmable Read Only Memory".

In addition, in the following description, the abbreviation CCD stands for "Charge Coupled Device". In addition, in the following description, the abbreviation CMOS stands for "Complementary Metal Oxide Semiconductor". In addition, in the following description, the abbreviation EL stands for "Electro-Luminescence". In addition, in the following description, the abbreviation A/D stands for "Analog/Digital". In addition, in the following description, the abbreviation I/F stands for "Interface". In addition, in the following description, the abbreviation UI stands for "User Interface".

First Embodiment

Figure 1:
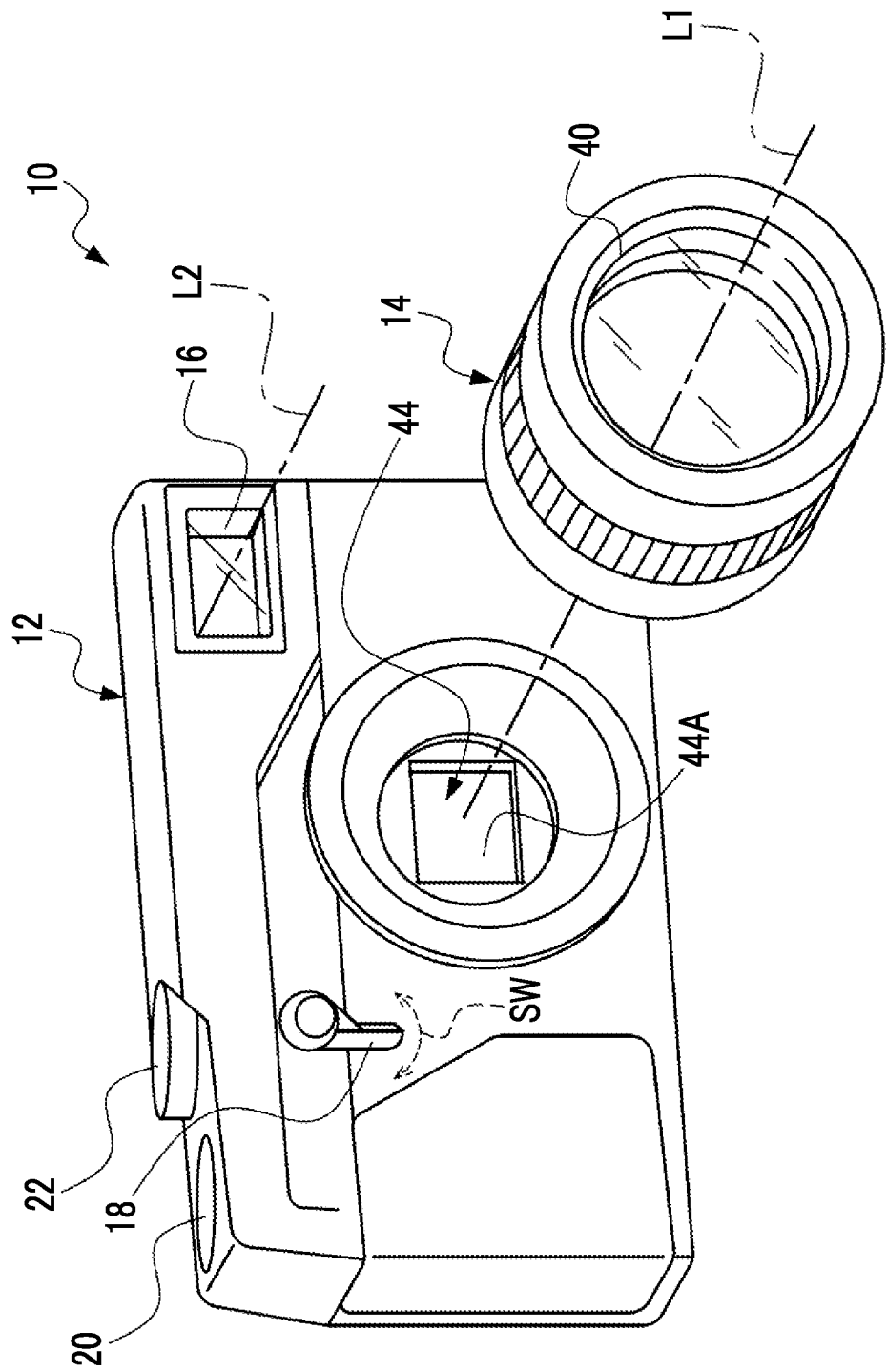
FIG. 1 is a perspective view illustrating an example of an exterior of an imaging apparatus according to first to fifth embodiments.

As illustrated in FIG. 1 as an example, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and that does not include a reflex mirror.

An imaging element 44 is disposed in the imaging apparatus main body 12. In a case where the interchangeable lens 14 is mounted on the imaging apparatus main body 12, subject light that shows a subject is transmitted through the interchangeable lens 14, and an image of the subject light is formed on the imaging element 44. Image data 69 (for example, refer to FIG. 4A and FIG. 4B) that indicates an image of the subject is generated by the imaging element 44.

A hybrid finder (registered trademark) 16 is disposed in the imaging apparatus main body 12. For example, the hybrid finder 16 here refers to a finder in which an optical view finder (hereinafter, referred to as the OVF) and an electronic view finder (hereinafter, referred to as the EVF) are selectively used. The abbreviation OVF stands for "optical view finder". In addition, the abbreviation EVF stands for "electronic view finder".

A finder switching lever 18 is disposed on a front surface of the imaging apparatus main body 12. An optical image visually recognizable by the OVF and a live view image that is an electronic image visually recognizable by the EVF are switched by rotationally moving the finder switching lever 18 in a direction of arrow SW. The "live view image" here refers to a motion picture image for displaying based on the image data 69 obtained by imaging performed by the imaging element 44. The live view image is generally referred to as a live preview image. A release button 20 and a dial 22 are disposed on an upper surface of the imaging apparatus main body 12. The dial 22 is operated in a case of setting an operation mode of an imaging system, an operation mode of a playback system, and the like.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10, an imaging mode and a playback mode are selectively set as an operation mode in accordance with an instruction of a user. The imaging mode is broadly divided into a display motion picture imaging mode and a recording imaging mode.

As illustrated in FIG. 2 as an example, a touch panel display 26, an instruction key 28, and a finder eyepiece portion 30 are disposed on a rear surface of the imaging apparatus main body 12.

Figure 5:
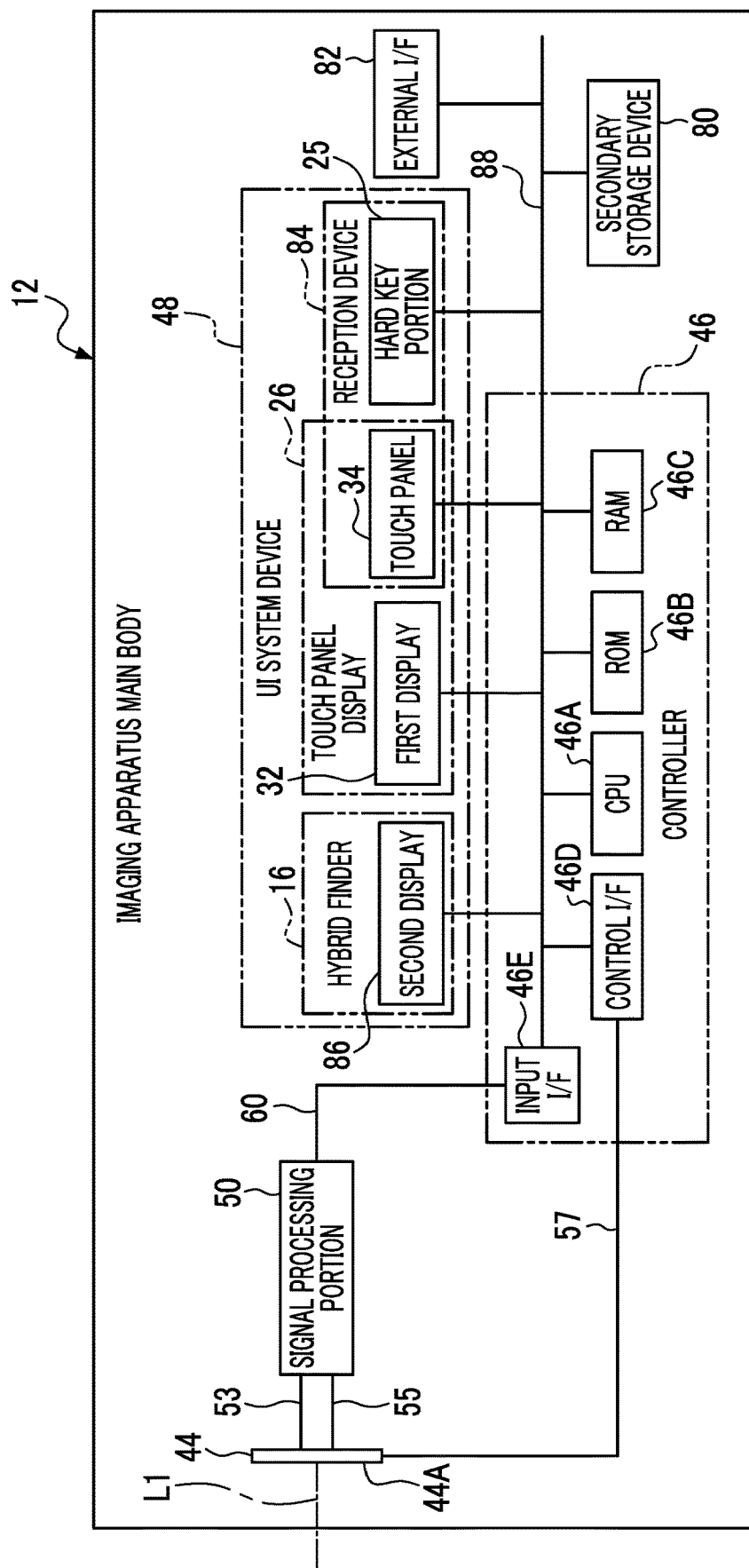
FIG. 5 is a block diagram illustrating an example of a configuration of an electric system of an imaging apparatus main body according to the first to fourth embodiments.

The touch panel display 26 comprises a first display 32 and a touch panel 34 (refer to FIG. 5). A liquid crystal display is exemplified as an example of the first display 32. The first display 32 may not be the liquid crystal display, and other displays such as an organic EL display may be used.

The first display 32 displays images, text information, and the like. The first display 32 is used for displaying the live view image obtained by consecutive imaging in a case where the imaging apparatus 10 is in the imaging mode. In addition, the first display 32 is used for displaying a still picture image obtained by imaging in a case where a still picture image capturing instruction is provided. Furthermore, the first display 32 is used for displaying a playback image and displaying a menu screen and the like in a case where the imaging apparatus 10 is in the playback mode.

The touch panel 34 is a transmissive touch panel and is overlaid on a surface of a display region of the first display 32. The touch panel 34 detects a contact of an instruction object such as a finger or a stylus pen.

The instruction key 28 receives various instructions such as selection of one or a plurality of menus, confirmation of a selected content, deletion of the selected content, zooming, and frame advance.

As illustrated in FIG. 3 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side to an imaging apparatus main body 12 side. The focus lens 40B and the stop 40C operate by receiving motive power from a driving source (not illustrated) such as a motor. That is, the focus lens 40B and the stop 40C move along the optical axis L1 in response to the provided motive power. In addition, the stop 40C adjusts exposure by operating in response to the provided motive power.

The imaging apparatus main body 12 comprises a mechanical shutter 42 and the imaging element 44. The mechanical shutter 42 operates by receiving motive power from a driving source (not illustrated) such as a motor. In a case where the interchangeable lens 14 is mounted on the imaging apparatus main body 12, the subject light showing the subject is transmitted through the imaging lens 40, and the image of the subject light is formed on a light receiving surface 44A of the imaging element 44 through the mechanical shutter 42.

The imaging apparatus main body 12 comprises a controller 46, a UI system device 48, and a signal processing portion 50. Each of the controller 46 and the signal processing portion 50 corresponding to a rear stage circuit of the imaging element 44 is an example of an "outside of an imagine element" according to the embodiments of the technology of the present disclosure.

The controller 46 controls the entire imaging apparatus 10. The UI system device 48 is a device that presents information to the user or receives an instruction from the user. The UI system device 48 is connected to the controller 46. The controller 46 acquires various types of information from the UI system device 48 and controls the UI system device 48.

The imaging element 44 is connected to the controller 46 through a communication line 57 and generates the image data 69 indicating the image of the subject by imaging the subject under control of the controller 46.

The imaging element 44 is connected to the signal processing portion 50 through a communication line 53 and a communication line 55. The signal processing portion 50 is an LSI, specifically, a device including an ASIC. The controller 46 is connected to the signal processing portion 50 through a communication line 60. The controller 46 acquires various types of information from the signal processing portion 50 and controls the signal processing portion 50.

The signal processing portion 50 outputs a signal to the imaging element 44 through the communication line 55. As will be described in detail later, the imaging element 44 performs an operation corresponding to the signal which is input from the signal processing portion 50 through the communication line 55. The image data 69 is input into the signal processing portion 50 from the imaging element 44 through the communication line 53. The signal processing portion 50 performs various types of signal processing on the image data 69 which is input from the imaging element 44 through the communication line 53. The various types of signal processing include well-known signal processing such as white balance adjustment, sharpness adjustment, gamma correction, color space conversion processing, and color difference correction.

While the device including the ASIC is illustrated as the signal processing portion 50 in the present embodiment, the technology of the present disclosure is not limited thereto. The signal processing portion 50 may be a device including an ASIC, an FPGA, and/or a PLD. In addition, the signal processing portion 50 may be a computer including a CPU, a ROM, and a RAM. The number of CPUs may be singular or plural. In addition, the signal processing portion 50 may be implemented by a combination of a hardware configuration and a software configuration.

The imaging element 44 is an example of a "laminated imaging element" according to the embodiments of the technology of the present disclosure. In the present embodiment, the imaging element 44 is a CMOS image sensor. In addition, while the CMOS image sensor is illustrated here as the imaging element 44, the technology of the present disclosure is not limited thereto. For example, the technology of the present disclosure is also established in a case where the imaging element 44 is a CCD image sensor.

Figure 4A:
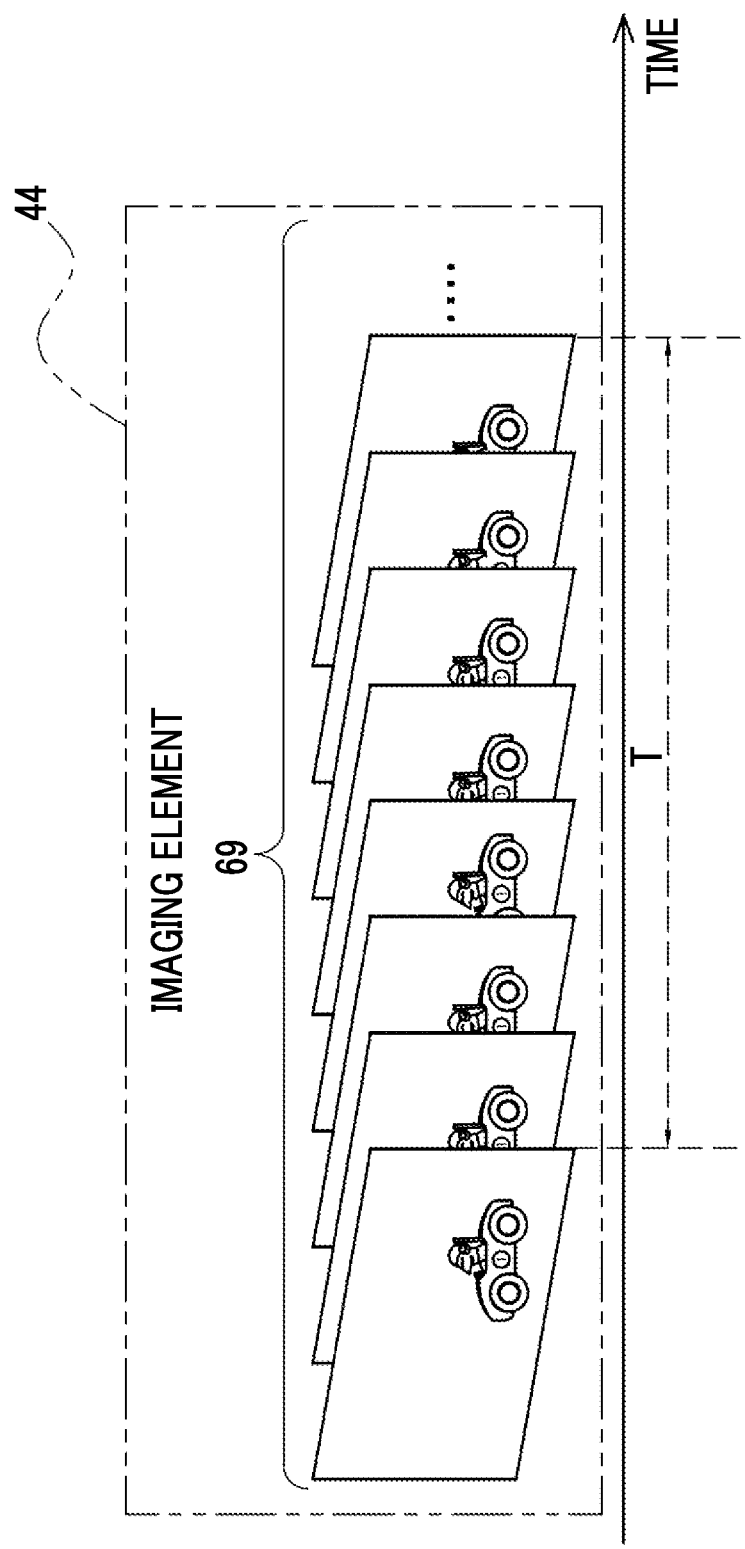
FIG. 4A is a conceptual diagram for describing an imaging frame rate of an imaging element included in the imaging apparatus according to the first to fifth embodiments.

In the imaging element 44, as illustrated in FIGS. 4A and 4B as an example, a plurality of pieces of image data 69 each indicating the subject are generated by imaging the subject at an imaging frame rate. In addition, in the imaging element 44, the generated plurality of pieces of image data 69 are output at an output frame rate. Any of the imaging frame rate and the output frame rate is a variable frame rate. The imaging frame rate is an example of a "first frame rate" according to the embodiments of the technology of the present disclosure, and the output frame rate is an example of a "second frame rate" according to the embodiments of the technology of the present disclosure.

The imaging frame rate and the output frame rate have a relationship of "imaging frame rate≥output frame rate". For example, the imaging frame rate is a frame rate at which imaging of eight frames is performed within a period T as illustrated in FIG. 4A, and the output frame rate is a frame rate at which two frames are output within the period T as illustrated in FIG. 4B. Specifically, 240 frames per second (fps) is exemplified as an example of the imaging frame rate, and 60 fps is exemplified as an example of the output frame rate.

As illustrated in FIG. 5 as an example, the controller 46 comprises a CPU 46A, a ROM 46B, a RAM 46C, a connection I/F 46D, and an input I/F 46E. The CPU 46A, the ROM 46B, the RAM 46C, the connection I/F 46D, and the input I/F 46E are connected to each other through a busline 88.

The ROM 46B stores various programs. The CPU 46A reads out the various programs from the ROM 46B and loads the read various programs into the RAM 46C. The CPU 46A controls the entire imaging apparatus 10 in accordance with the various programs loaded in the RAM 46C.

The connection I/F 46D is a communication device including an FPGA and is connected to the imaging element 44 through the communication line 57. The CPU 46A controls the imaging element 44 through the connection I/F 46D.

The input I/F 46E is a communication device including an FPGA and is connected to the signal processing portion 50 through the communication line 60. The image data 69 (refer to FIG. 4A and FIG. 4B) on which the various types of signal processing are performed by the signal processing portion 50 is input into the input I/F 46E through the communication line 60. The input I/F 46E transfers the image data 69 input from the signal processing portion 50 to the CPU 46A.

A secondary storage device 80 and an external I/F 82 are connected to the busline 88. The secondary storage device 80 is a non-volatile memory such as an SSD, an HDD, or an EEPROM. The CPU 46A reads out and writes various types of information in the secondary storage device 80.

The external I/F 82 is a communication device including an FPGA. An external apparatus (not illustrated) such as a USB memory and a memory card is connected to the external I/F 82. The external I/F 82 exchanges various types of information between the CPU 46A and the external apparatus.

The UI system device 48 comprises the hybrid finder 16, the touch panel display 26, and a reception device 84. The first display 32 and the touch panel 34 are connected to the busline 88. Accordingly, the CPU 46A displays various types of information on the first display 32 and operates in accordance with various instructions received by the touch panel 34.

The reception device 84 comprises the touch panel 34 and a hard key portion 25. The hard key portion 25 includes a plurality of hard keys of a release button 20, a dial 22, and an instruction key 28. The hard key portion 25 is connected to the busline 88, and the CPU 46A operates in accordance with various instructions received by the hard key portion 25.

The hybrid finder 16 comprises a second display 86. The CPU 46A displays various types of information on the second display 86. A liquid crystal display is exemplified as an example of the second display 86. The second display 86 may not be the liquid crystal display, and other displays such as an organic EL display may be used.

Figure 6:
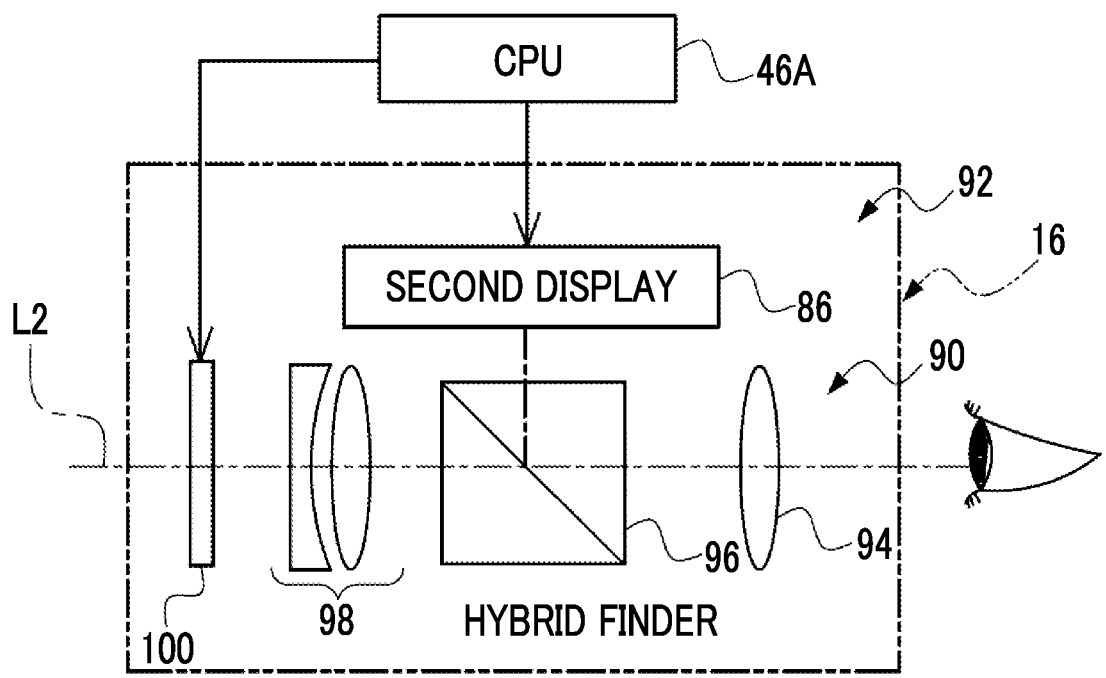
FIG. 6 is a schematic configuration diagram illustrating a configuration of a hybrid finder included in the imaging apparatus according to the first to fifth embodiments.

As illustrated in FIG. 6 as an example, the hybrid finder 16 includes an OVF 90 and an EVF 92. The OVF 90 is a reverse Galilean finder and includes an eyepiece lens 94, a prism 96, and an objective lens 98. The EVF 92 includes the second display 86, the prism 96, and the eyepiece lens 94.

A liquid crystal shutter 100 is arranged closer to the subject side than the objective lens 98 along an optical axis L2 of the objective lens 98. The liquid crystal shutter 100 blocks light such that the optical image is not incident on the objective lens 98 in a case of using the EVF 92.

The prism 96 reflects and guides the electronic image or various types of information displayed on the second display 86 to the eyepiece lens 94 and combines the optical image with the electronic image and/or the various types of information displayed on the second display 86. A live view image 102 based on the image data 69 is exemplified as the electronic image displayed on the second display 86.

In a case of an OVF mode, the CPU 46A enables the optical image to be visually recognized from the eyepiece lens 94 by controlling the liquid crystal shutter 100 to a non-light blocking state. In addition, in a case of an EVF mode, the CPU 46A enables only the electronic image displayed on the second display 86 to be visually recognized from the eyepiece lens 94 by controlling the liquid crystal shutter 100 to a light blocking state.

Hereinafter, for convenience of description, the first display 32 (refer to FIG. 2 and FIG. 5) and the second display 86 will be referred to as the "display" without a reference sign unless otherwise necessary to distinguish therebetween. The display is an example of a "display portion (display)" according to the embodiments of the technology of the present disclosure. In addition, the CPU 46A is an example of a "display control portion (display processor)" according to the embodiments of the technology of the present disclosure.

Figure 7:
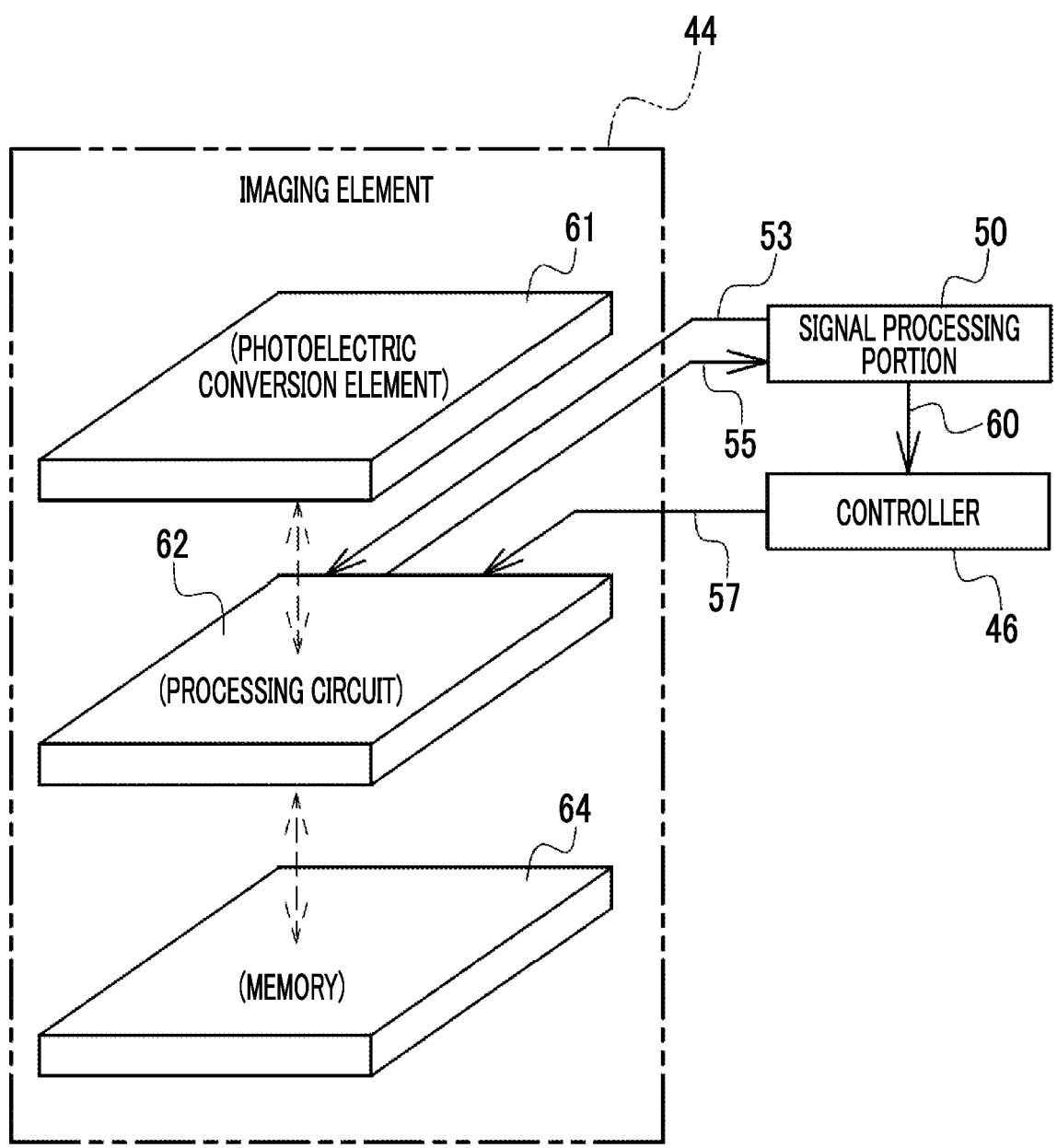
FIG. 7 is a block diagram illustrating an example of a laminated structure of the imaging element included in the imaging apparatus according to the first to fourth embodiments, and an example of a connection relationship among the imaging element, a signal processing portion, and a controller.

As illustrated in FIG. 7 as an example, the imaging element 44 incorporates a photoelectric conversion element 61, a processing circuit 62, and a memory 64. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. In the imaging element 44, the photoelectric conversion element 61 is laminated with the processing circuit 62 and the memory 64. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity. While a three-layer structure of the photoelectric conversion element 61, the processing circuit 62, and the memory 64 is illustrated here, the technology of the present disclosure is not limited thereto. A two-layer structure of the photoelectric conversion element 61 and a memory layer in which the processing circuit 62 and the memory 64 are formed in one layer may be used. The memory 64 is an example of a "storage portion" according to the embodiments of the technology of the present disclosure.

The processing circuit 62 is, for example, an LSI, and the memory 64 is, for example, a DRAM. However, the technology of the present disclosure is not limited thereto, and an SRAM may be employed as the memory 64 instead of the DRAM.

The processing circuit 62 is a device including an ASIC and an FPGA and controls the entire imaging element 44 in accordance with an instruction of the controller 46. While an example of implementing the processing circuit 62 by the device including the ASIC and the FPGA is exemplified here, the technology of the present disclosure is not limited thereto. For example, a device including an ASIC, an FPGA, and/or a PLD may be used. In addition, a computer including a CPU, a ROM, and a RAM may be employed as the processing circuit 62. The number of CPUs may be singular or plural. In addition, the processing circuit 62 may be implemented by a combination of a hardware configuration and a software configuration.

The photoelectric conversion element 61 includes a plurality of photodiodes arranged in a matrix form. Photodiodes of "4896×3265" pixels are illustrated as an example of the plurality of photodiodes.

Color filters are arranged in each photodiode included in the photoelectric conversion element 61. The color filters include a G filter corresponding to green (G) that most contributes to obtaining a brightness signal, an R filter corresponding to red (R), and a B filter corresponding to blue (B). The photoelectric conversion element 61 includes R pixels, G pixels, and B pixels. The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels are arranged with predetermined periodicity in each of a row direction (horizontal direction) and a column direction (vertical direction). In the present embodiment, the R pixels, the G pixels, and the B pixels are arranged with periodicity corresponding to X-Trans (registered trademark) arrangement. While the X-Trans arrangement is illustrated here, the technology of the present disclosure is not limited thereto. Arrangement of the R pixels, the G pixels, and the B pixels may be Bayer arrangement or honeycomb arrangement.

The imaging element 44 has a so-called electronic shutter function and controls an electric charge accumulation time period of each photodiode in the photoelectric conversion element 61 by performing the electronic shutter function under control of the controller 46. The electric charge accumulation time period refers to a so-called shutter speed.

In the imaging apparatus 10, imaging for the still picture image and imaging for the motion picture image are performed using a rolling shutter method. The imaging for the still picture image is implemented by performing the electronic shutter function and operating the mechanical shutter 42 (refer to FIG. 3). The imaging for the motion picture image is implemented by performing the electronic shutter function without operating the mechanical shutter 42. While the rolling shutter method is illustrated here, the technology of the present disclosure is not limited thereto. A global shutter method may be applied instead of the rolling shutter method.

The processing circuit 62 reads out the image data 69 obtained by imaging the subject by the photoelectric conversion element 61. The image data 69 is signal electric charges accumulated in the photoelectric conversion element 61. The processing circuit 62 performs A/D conversion on the analog image data 69 read out from the photoelectric conversion element 61. The processing circuit 62 stores the digital image data 69 obtained by performing the A/D conversion on the analog image data 69 in the memory 64.

The processing circuit 62 is connected to the signal processing portion 50 through the communication line 53 and the communication line 55. In addition, the processing circuit 62 is connected to the controller 46 through the communication line 57.

Figure 8:
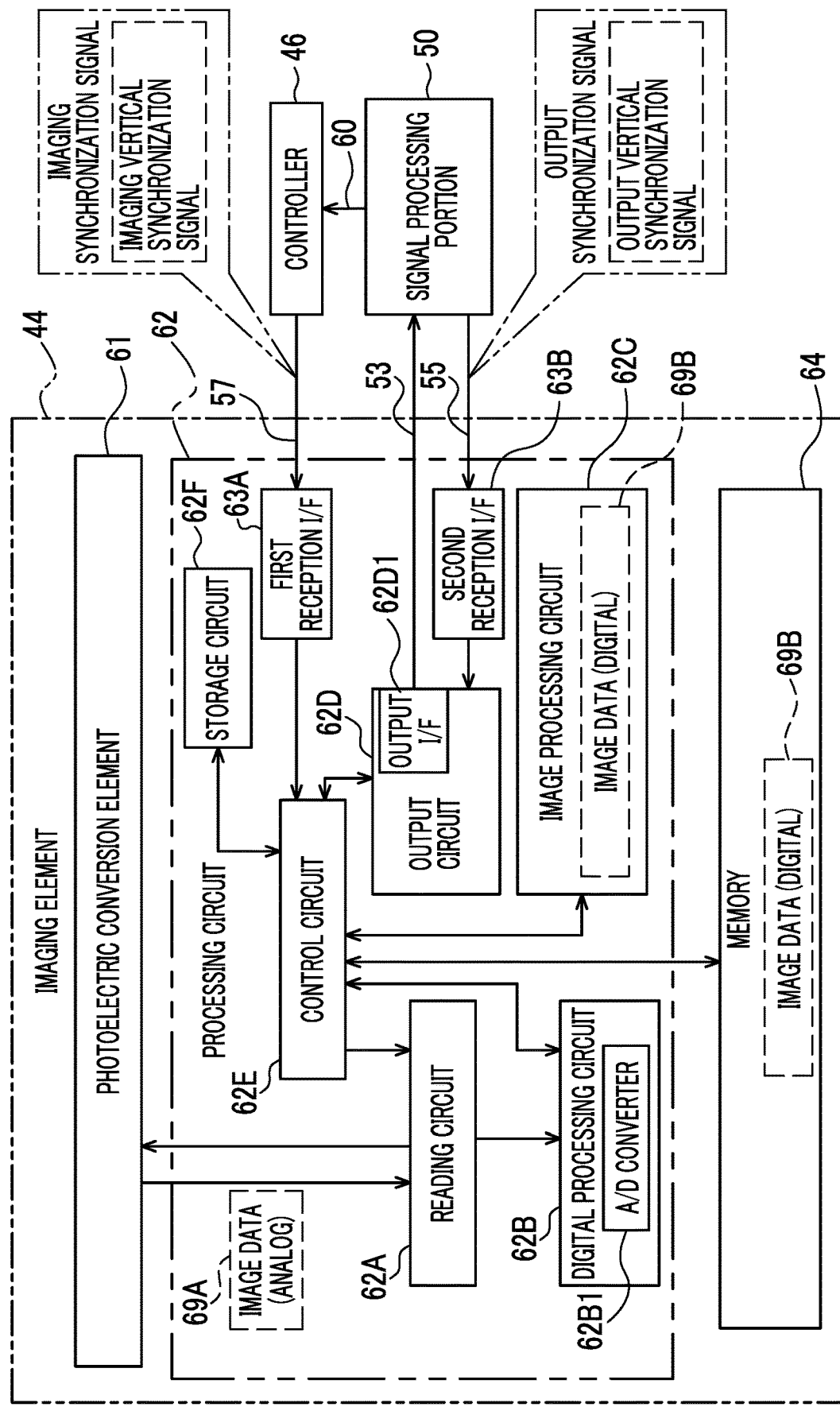
FIG. 8 is a block diagram illustrating an example of a configuration of an electric system of the imaging element included in the imaging apparatus according to the first embodiment.

As illustrated in FIG. 8 as an example, the processing circuit 62 comprises a reading circuit 62A, a digital processing circuit 62B, an image processing circuit 62C, an output circuit 62D, a control circuit 62E, and a storage circuit 62F. The output circuit 62D is an example of an "output portion (output circuit)" according to the embodiments of the technology of the present disclosure. The control circuit 62E is an example of an "imaging system control portion (imaging system control circuit)" and an "output system control portion (output system control circuit)" according to the embodiments of the technology of the present disclosure.

The reading circuit 62A is connected to the photoelectric conversion element 61, the digital processing circuit 62B, and the control circuit 62E. The memory 64 is connected to the control circuit 62E. The image processing circuit 62C is also connected to the control circuit 62E. The output circuit 62D is also connected to the control circuit 62E. The storage circuit 62F is also connected to the control circuit 62E.

As illustrated in FIG. 8 as an example, the image data 69 is broadly divided into analog image data 69A and digital image data 69B. Hereinafter, for convenience of description, the analog image data 69A and the digital image data 69B will be referred to as the "image data 69" unless otherwise necessary to distinguish therebetween.

The processing circuit 62 comprises a first reception I/F 63A and a second reception I/F 63B. Any of the first reception I/F 63A and the second reception I/F 63B is a communication device having an FPGA. The first reception I/F 63A and the second reception I/F 63B are an example of a "reception portion" according to the embodiments of the technology of the present disclosure.

The first reception I/F 63A is connected to the control circuit 62E. In addition, the first reception I/F 63A is connected to the controller 46 through the communication line 57.

The second reception I/F 63B is connected to the output circuit 62D. In addition, the second reception I/F 63B is connected to the signal processing portion 50 through the communication line 55.

The reading circuit 62A controls the photoelectric conversion element 61 and reads out the analog image data 69A from the photoelectric conversion element 61 under control of the control circuit 62E. Reading of the analog image data 69A of one frame from the photoelectric conversion element 61 is performed in accordance with an imaging synchronization signal related to a timing of imaging.

The first reception I/F 63A receives the imaging synchronization signal. Specifically, the imaging synchronization signal is output to the first reception I/F 63A through the communication line 57 by the controller 46, and the imaging synchronization signal is received by the first reception I/F 63A. The first reception I/F 63A outputs the received imaging synchronization signal to the control circuit 62E. The imaging synchronization signal includes an imaging vertical synchronization signal. The imaging vertical synchronization signal is a signal for defining a start timing of reading of the analog image data 69A of one frame. In the imaging element 44, imaging is performed at the imaging frame rate in accordance with the imaging vertical synchronization signal received by the first reception I/F 63A.

The control circuit 62E transfers the imaging vertical synchronization signal, which is input from the controller 46 through the first reception I/F 63A, to the reading circuit 62A. In a case where the imaging vertical synchronization signal is input from the control circuit 62E, the reading circuit 62A starts reading out the analog image data 69A of one frame from the photoelectric conversion element 61. The reading circuit 62A performs analog signal processing on the analog image data 69A read out from the photoelectric conversion element 61. The analog signal processing includes well-known processing such as noise cancelation processing and analog gain processing. The noise cancelation processing is processing of canceling a noise caused by variations in characteristics between pixels included in the photoelectric conversion element 61. The analog gain processing is processing of applying a gain to the analog image data 69A. The analog image data 69A on which the analog signal processing is performed in such a manner is output to the digital processing circuit 62B by the reading circuit 62A.

The digital processing circuit 62B comprises an A/D converter 62B1. The digital processing circuit 62B performs digital signal processing on the analog image data 69A input from the reading circuit 62A. For example, the digital signal processing includes correlative double sampling, A/D conversion performed by the A/D converter 62B1, and digital gain processing.

The correlative double sampling is performed on the analog image data 69A by the digital processing circuit 62B. The A/D converter 62B1 performs the A/D conversion on the analog image data 69A on which signal processing of the correlative double sampling is performed. Accordingly, the analog image data 69A is digitized, and the digital image data 69B is obtained. The digital gain processing is performed on the digital image data 69B by the digital processing circuit 62B. The digital gain processing refers to processing of applying a gain to the digital image data 69B.

The control circuit 62E acquires the digital image data 69B, which is obtained by performing the digital signal processing, from the digital processing circuit 62B and stores the acquired digital image data 69B in the memory 64.

The memory 64 is a memory that can store the digital image data 69B of a plurality of frames. The memory 64 has a storage region (not illustrated) in units of pixels. The digital image data 69B is stored in a corresponding storage region of the memory 64 in units of pixels by the control circuit 62E.

The control circuit 62E can randomly access the memory 64 and acquires the digital image data 69B from the memory 64. The control circuit 62E outputs the digital image data 69B acquired from the memory 64 to the image processing circuit 62C. The image processing circuit 62C performs image processing on the digital image data 69B input from the control circuit 62E. Demosaicing, digital thinning processing, digital addition processing, data filling processing, and the like are exemplified as the "image processing" here.

The demosaicing is processing of calculating every color information for each pixel from a mosaic image corresponding to arrangement of the color filters. For example, in a case of an imaging element consisting of color filters of three colors of R, G, and B, color information on all of R, G, and B for each pixel from a mosaic image consisting of R, G, and B is calculated.

The digital thinning processing is processing of thinning out pixels included in the digital image data 69B in units of lines. For example, the units of lines refer to units of horizontal lines and/or units of vertical lines. The digital addition processing is, for example, processing of calculating an arithmetic mean of pixel values for a plurality of pixels included in the digital image data 69B. Processing of filling a lower empty bit of the digital image data 69B with specific data, or the like is exemplified as the data filling processing. For example, information for specifying a method of the digital thinning processing performed on the digital image data 69B, or a frame number for specifying a frame is exemplified as the "specific data" here.

The image processing circuit 62C outputs the digital image data 69B after the image processing to the control circuit 62E. The control circuit 62E stores the digital image data 69B input from the image processing circuit 62C in the memory 64.

The control circuit 62E acquires the digital image data 69B from the memory 64 in units of frames. The control circuit 62E outputs the digital image data 69B acquired from the memory 64 to the output circuit 62D.

The second reception I/F 63B receives an output synchronization signal related to a timing of output of the digital image data 69B obtained by imaging. Specifically, the output synchronization signal is output to the second reception I/F 63B through the communication line 55 by the signal processing portion 50, and the output synchronization signal is received by the second reception I/F 63B. The second reception I/F 63B outputs the received output synchronization signal to the output circuit 62D. The output synchronization signal includes an output vertical synchronization signal. The output vertical synchronization signal is a signal for defining a start timing of output of the digital image data 69B of one frame. In the imaging element 44, the digital image data 69B stored in the memory 64 is output to the signal processing portion 50 at the output frame rate in accordance with the output vertical synchronization signal received by the second reception I/F 63B.

The output circuit 62D comprises an output I/F 62D1. The output I/F 62D1 is a communication device including an FPGA. The output I/F 62D1 is connected to the signal processing portion 50 through the communication line 53. In a case where the output vertical synchronization signal is input from the signal processing portion 50 through the second reception I/F 63B, the output circuit 62D starts outputting the digital image data 69B of one frame to the signal processing portion 50 from the output I/F 62D1.

Figure 9:
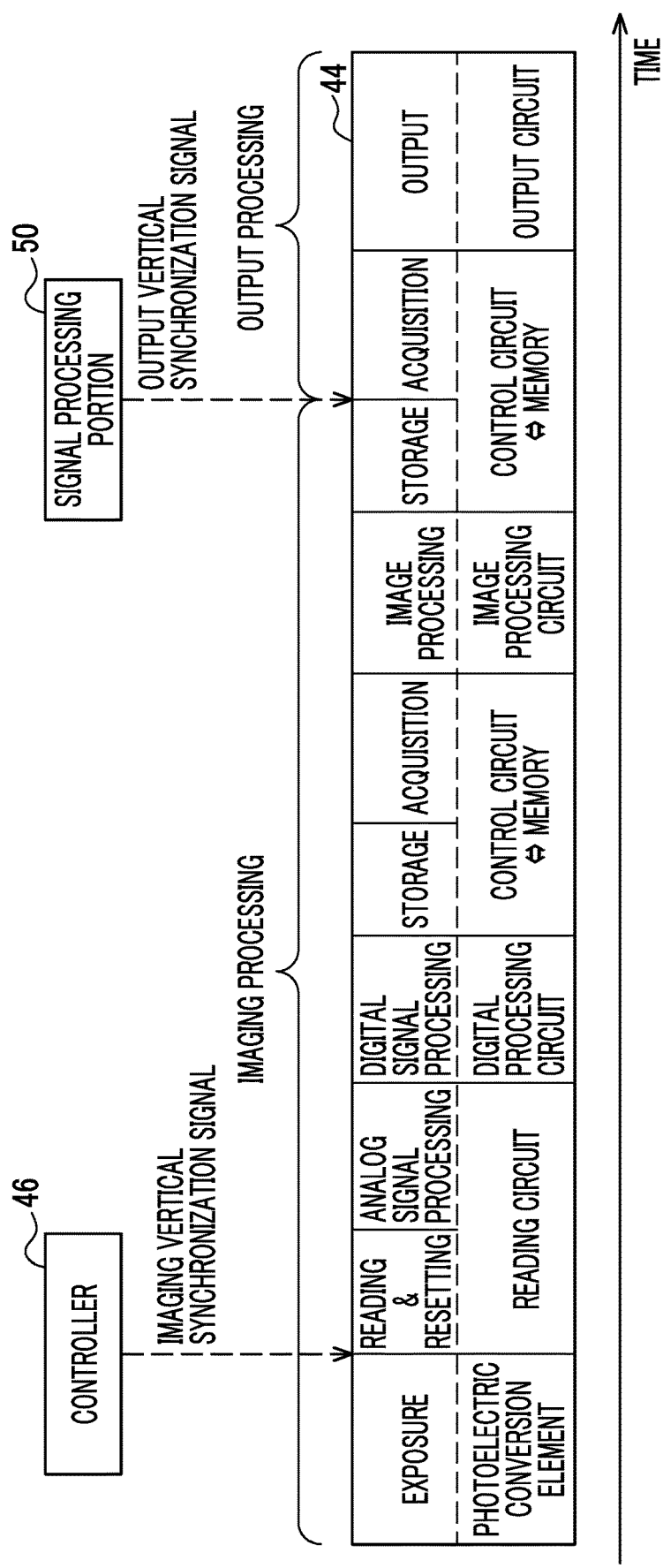
FIG. 9 is a state transition diagram illustrating an example of time-series processing contents of imaging processing and output processing performed by the imaging element included in the imaging apparatus according to the first embodiment.

As illustrated in FIG. 9 as an example, in the imaging element 44, processing including imaging processing and output processing is performed. The imaging processing is performed in accordance with the imaging frame rate, and the output processing is performed in accordance with the output frame rate.

In the imaging processing, exposure, reading of the analog image data 69A, resetting of the photoelectric conversion element 61, the analog signal processing, the digital signal processing, first-time storage, first-time acquisition, the image processing, and second-time storage are performed in this order.

The exposure is performed by the photoelectric conversion element 61. Reading of the analog image data 69A, resetting of the photoelectric conversion element 61, and the analog signal processing are performed by the reading circuit 62A. A period in which the exposure is performed by the photoelectric conversion element 61 is a period in which reading of the analog image data 69A and resetting of the photoelectric conversion element 61 are not performed.

The digital signal processing is performed by the digital processing circuit 62B. The first-time storage refers to storage of the digital image data 69B obtained by performing the digital signal processing in the memory 64. The first-time acquisition refers to acquisition of the digital image data 69B from the memory 64 for the first time. The first-time storage and the first-time acquisition are performed by the control circuit 62E. The image processing circuit 62C performs the image processing on the digital image data 69B acquired by the control circuit 62E. The second-time storage refers to storage of the digital image data 69B on which the image processing is performed, in the memory 64. The second-time storage is performed by the control circuit 62E.

In the output processing, second-time acquisition and output of the digital image data 69B are performed. The second-time acquisition refers to acquisition of the digital image data 69B after the image processing from the memory 64. The second-time acquisition is performed by the control circuit 62E. Output of the digital image data 69B refers to output of the digital image data 68A after the image processing, which is acquired from the memory 64 by the control circuit 62E, to the output circuit 62D.

In the imaging processing, reading of the analog image data 69A is started on a condition that the imaging vertical synchronization signal is received by the first reception I/F 63A. In addition, the output processing is started on a condition that the output vertical synchronization signal is received by the second reception I/F 63B.

Figure 10:
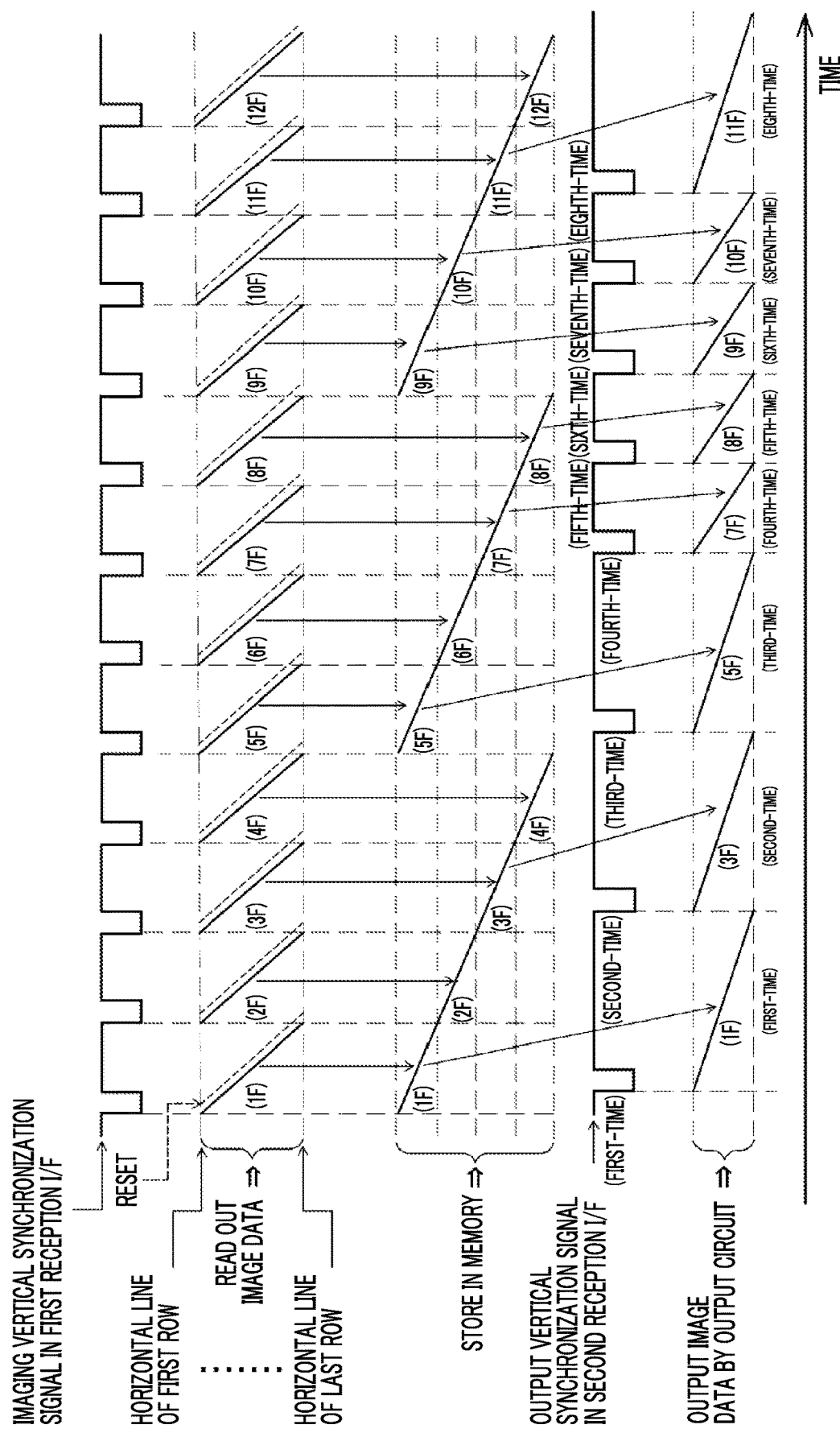
FIG. 10 is a time chart illustrating an example of a flow of operation of the imaging element included in the imaging apparatus according to the first embodiment.

FIG. 10 illustrates an example of a flow of reading to storage of the image data 69 of a first frame (1F) to a twelfth frame (12F) in the memory 64 and a flow of output processing for the image data 69 of eight frames. Here, "F" of 1F to 12F illustrated in FIG. 10 is the abbreviation of "Frame". In addition, in the example illustrated in FIG. 10, for convenience of description, an aspect of storing the digital image data 69B of maximum four frames in the memory 64 is illustrated.

As illustrated in FIG. 10 as an example, each time the imaging vertical synchronization signal is received by the first reception I/F 63A, reading of the analog image data 69A of one frame from the photoelectric conversion element 61 is started. Reading of the analog image data 69A is performed for each line from a horizontal line of a first row to a horizontal line of a last row of the photoelectric conversion element 61. In a case where reading is finished for each line, each pixel of a horizontal line in which reading is finished is reset. The analog image data 69A is converted into the digital image data 69B, and the digital image data 69B is stored in the memory 64 in units of frames in a distinguishable manner in order of frame of the read analog image data 69A.

In a case where the output vertical synchronization signal is received by the second reception I/F 63B, output is started using the digital image data 69B that is being stored in the memory 64 at a point in time when the output vertical synchronization signal is received by the second reception I/F 63B as an output target of the output circuit 62D. That is, the latest digital image data 69B stored in the memory 64 is used as the output target of the output circuit 62D and is output to the signal processing portion 50.

In FIG. 10, the digital image data 69B of the first frame output by the output circuit 62D in accordance with a first-time output vertical synchronization signal is the digital image data 69B of the first frame that is being stored in the memory 64 at a point in time when the first-time output vertical synchronization signal is received. In addition, the digital image data 69B of the second frame output by the output circuit 62D in accordance with a second-time output vertical synchronization signal is the digital image data 69B of the third frame that is being stored in the memory 64 at a point in time when the first-time output vertical synchronization signal is received. In addition, the digital image data 69B of the third frame output by the output circuit 62D in accordance with a third-time output vertical synchronization signal is the digital image data 69B of the fifth frame that is being stored in the memory 64 at a point in time when the third-time output vertical synchronization signal is received. In addition, the digital image data 69B of the fourth frame output by the output circuit 62D in accordance with a fourth-time output vertical synchronization signal is the digital image data 69B of the seventh frame that is being stored in the memory 64 at a point in time when the fourth-time output vertical synchronization signal is received.

In addition, the digital image data 69B of the fifth frame output by the output circuit 62D in accordance with a fifth-time output vertical synchronization signal is the digital image data 69B of the eighth frame that is being stored in the memory 64 at a point in time when the fifth-time output vertical synchronization signal is received. In addition, the digital image data 69B of the sixth frame output by the output circuit 62D in accordance with a sixth-time output vertical synchronization signal is the digital image data 69B of the ninth frame that is being stored in the memory 64 at a point in time when the sixth-time output vertical synchronization signal is received. In addition, the digital image data 69B of the seventh frame output by the output circuit 62D in accordance with a seventh-time output vertical synchronization signal is the digital image data 69B of the tenth frame that is being stored in the memory 64 at a point in time when the seventh-time output vertical synchronization signal is received. Furthermore, the digital image data 69B of the eighth frame output by the output circuit 62D in accordance with an eighth-time output vertical synchronization signal is the digital image data 69B of the eleventh frame that is being stored in the memory 64 at a point in time when the eighth-time output vertical synchronization signal is received.

Figure 11:
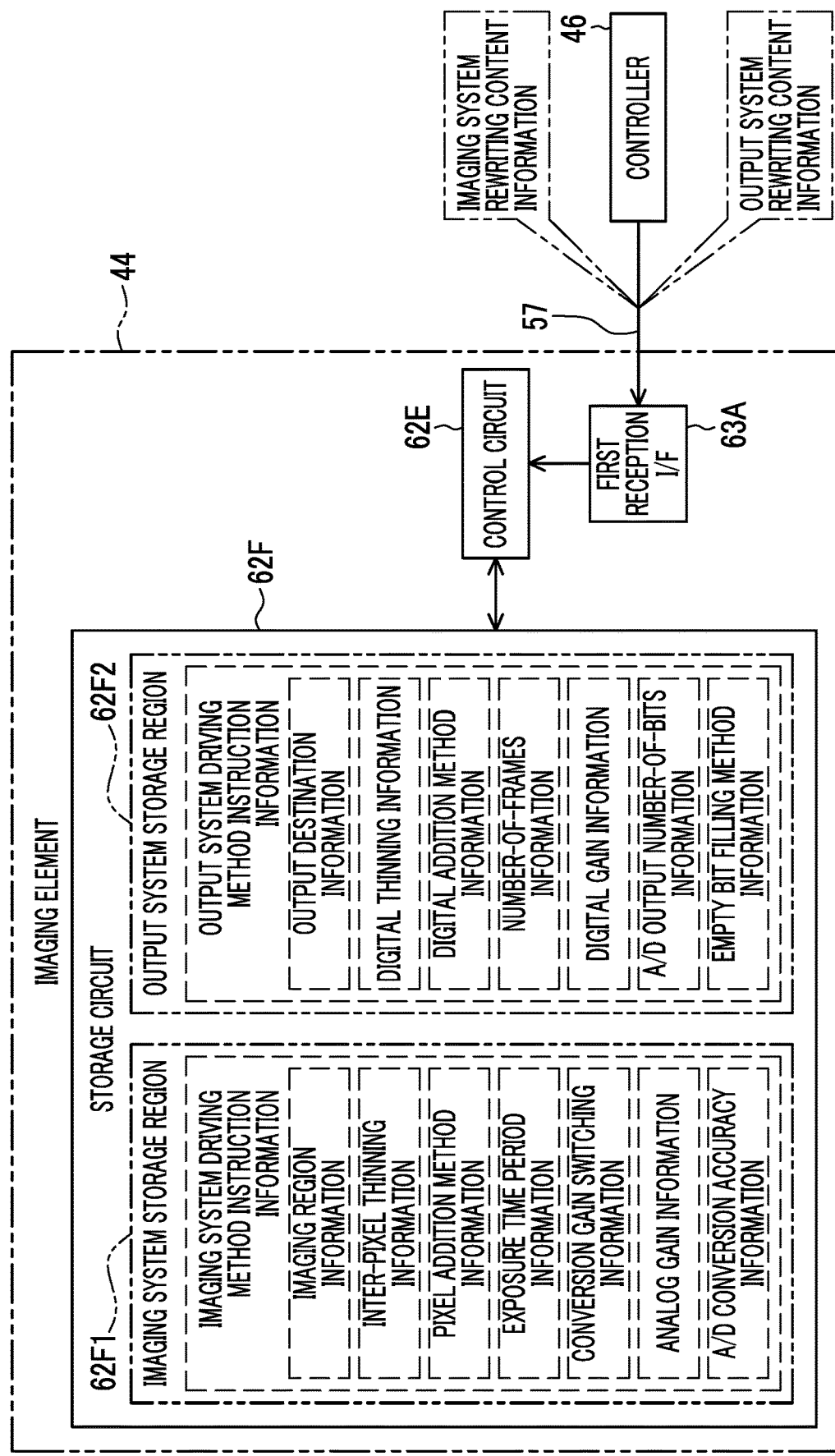
FIG. 11 is a conceptual diagram illustrating an example of a storage content of a storage circuit in the imaging element included in the imaging apparatus according to the first to fifth embodiments.

As illustrated in FIG. 11 as an example, the storage circuit 62F has an imaging system storage region 62F1 and an output system storage region 62F2. The imaging system storage region 62F1 is an example of an "imaging system holding portion (imaging system holding circuit)" according to the embodiments of the technology of the present disclosure and holds imaging system driving method instruction information for providing an instruction for a driving method of the imaging system of the imaging element 44. The "imaging system" here refers to the reading circuit 62A and the digital processing circuit 62B.

The output system storage region 62F2 is an example of an "output system holding portion" according to the embodiments of the technology of the present disclosure and holds output system driving method instruction information for providing an instruction for a driving method of an output system of the imaging element 44. The "output system" here refers to the digital processing circuit 62B, the image processing circuit 62C, the output circuit 62D, and the control circuit 62E. The control circuit 62E controls driving of the imaging system of the imaging element 44 in accordance with the imaging system driving method instruction information and controls driving of the output system of the imaging element 44 in accordance with the output system driving method instruction information.

The imaging system storage region 62F1 is a non-volatile memory of which a storage content can be rewritten. The imaging system driving method instruction information is stored in the imaging system storage region 62F1. The imaging system driving method instruction information can be rewritten by the control circuit 62E. The imaging system driving method instruction information is information including imaging region information, pixel thinning information, pixel addition method information, exposure time period information, conversion gain switching information, analog gain information, and A/D conversion accuracy information. In the present embodiment, while the information including the imaging region information, the pixel thinning information, the pixel addition method information, the exposure time period information, the conversion gain switching information, the analog gain information, and the A/D conversion accuracy information is illustrated as the imaging system driving method instruction information, the technology of the present disclosure is not limited thereto. That is, the imaging system driving method instruction information may be information including at least one of the imaging region information, the pixel thinning information, the pixel addition method information, the exposure time period information, the conversion gain switching information, the analog gain information, or the A/D conversion accuracy information.

The imaging region information is information related to an imaging region. Information for providing an instruction for an effective region of the light receiving surface 44A (refer to FIG. 5) of the imaging element 44 used for imaging is exemplified as an example of the information related to the imaging region.

The pixel thinning information is information related to pixel thinning. Information for providing an instruction to read out the analog image data 69A as image data indicating a vertically 1/Y thinned image is exemplified as an example of the information related to the pixel thinning. Here, "Y" denotes a natural number greater than or equal to two. The vertically 1/Y thinned image is an image in which horizontal lines of the image are thinned out in the vertical direction by skipping Y−1 lines at a time.

While an example of thinning out the horizontal lines of the image in the vertical direction is exemplified here, the technology of the present disclosure is not limited thereto. Vertical lines of the image may be thinned out in the horizontal direction. Alternatively, the horizontal lines of the image may be thinned out in the vertical direction, and the vertical lines of the image may be thinned out in the horizontal direction. In such a manner, various thinning methods are considered.

The pixel addition method information is information related to a pixel addition method. Information for providing an instruction to read out the analog image data 69A as image data obtained by calculating an arithmetic mean of pixel values of a plurality of adjacent pixels is exemplified as an example of the information related to the pixel addition method. The exposure time period information is information related to an exposure time period. Information for providing an instruction for a time period of the exposure performed by the photoelectric conversion element 61 is exemplified as an example of the information related to the exposure time period.

The conversion gain switching information is information related to conversion gain switching. Information for providing an instruction to switch a gain of floating diffusion of the photoelectric conversion element 61 is exemplified as an example of the information related to the conversion gain switching. The analog gain information is information related to an analog gain. Information for providing an instruction for the gain to be applied to the analog image data 69A is exemplified as an example of the information related to the analog gain. The A/D conversion accuracy information is information related to A/D conversion accuracy. Information for providing an instruction for bit accuracy of the A/D conversion performed by the A/D converter 62B1 (refer to FIG. 8) is exemplified as an example of the information related to the A/D conversion accuracy.

The output system driving method instruction information is information including output destination information, digital thinning information, digital addition method information, number-of-frames information, digital gain information, A/D output number-of-bits information, and empty bit filling method information. In the present embodiment, while the information including the output destination information, the digital thinning information, the digital addition method information, the number-of-frames information, the digital gain information, the A/D output number-of-bits information, and the empty bit filling method information is illustrated as the output system driving method instruction information, the technology of the present disclosure is not limited thereto. The output system driving method instruction information may be information including at least one of the output destination information, the digital thinning information, the digital addition method information, the number-of-frames information, the digital gain information, the A/D output number-of-bits information, or the empty bit filling method information.

The output destination information is information related to an output destination. Information for providing an instruction for an output destination of the digital image data 69B output by the output circuit 62D (FIG. 8) is exemplified as an example of the information related to the output destination. In the present embodiment, the output destination of the digital image data 69B is the signal processing portion 50.

The digital thinning information is information related to digital thinning. Information for providing an instruction for a processing method of the digital thinning processing is exemplified as an example of the information related to the digital thinning.

The digital addition method information is information related to a digital addition method. Information for providing the instruction for the processing method of the digital thinning processing is exemplified as an example of the information related to the digital addition method.

The number-of-frames information is information related to an average number of output frames. Information for providing an instruction for an average number of frames of the digital image data 69B output by the output circuit 62D per unit time period is exemplified as an example of the information related to the average number of output frames. In this case, the control circuit 62E controls the output circuit 62D such that the average number of frames per unit time period of the instruction provided by the number-of-frames information is achieved. For example, the control circuit 62E controls the output circuit 62D to restrict output of the digital image data 69B or output the digital image data 69B regardless of the output vertical synchronization signal, such that the average number of frames of the instruction provided by the number-of-frames information is achieved.

The digital gain information is information related to a digital gain. Information for providing an instruction for a gain to be used in the digital gain processing is exemplified as an example of the information related to the digital gain.

The A/D output number-of-bits information is information related to an A/D output bit. Information for providing an instruction for the number of bits of the digital image data 69B output by the A/D converter 62B1 is exemplified as an example of the information related to the A/D output bit.

The empty bit filling method information is information related to a method of filling the lower empty bit. Information for providing an instruction for a processing method of the data filling processing is exemplified as an example of the information related to the method of filling the lower empty bit.

The controller 46 outputs imaging system rewriting content information indicating a content of rewriting of the imaging system driving method instruction information to the first reception I/F 63A through the communication line 57. The imaging system rewriting content information is output to the first reception I/F 63A by the controller 46 in accordance with an instruction received by the reception device 84 (refer to FIG. 5). The first reception I/F 63A receives the imaging system rewriting content information output by the controller 46. The control circuit 62E rewrites a content of the imaging system driving method instruction information in the imaging system storage region 62F1 in accordance with the imaging system rewriting content information received by the first reception I/F 63A.

The controller 46 outputs output system rewriting content information indicating a content of rewriting of the output system driving method instruction information to the first reception I/F 63A through the communication line 57. The output system rewriting content information is output to the first reception I/F 63A by the controller 46 in accordance with an instruction received by the reception device 84 (refer to FIG. 5). The first reception I/F 63A receives the output system rewriting content information output by the controller 46. The control circuit 62E rewrites a content of the output system driving method instruction information in the output system storage region 62F2 in accordance with the output system rewriting content information received by the first reception I/F 63A.

Hereinafter, for convenience of description, the imaging system rewriting content information and the output system rewriting content information will be referred to as the "rewriting content information" unless otherwise necessary to distinguish therebetween.

Next, an action of the imaging apparatus 10 according to the first embodiment will be described.

First, a flow of reading and storage processing executed by the processing circuit 62 of the imaging element 44 will be described with reference to FIG. 12.

Figure 12:
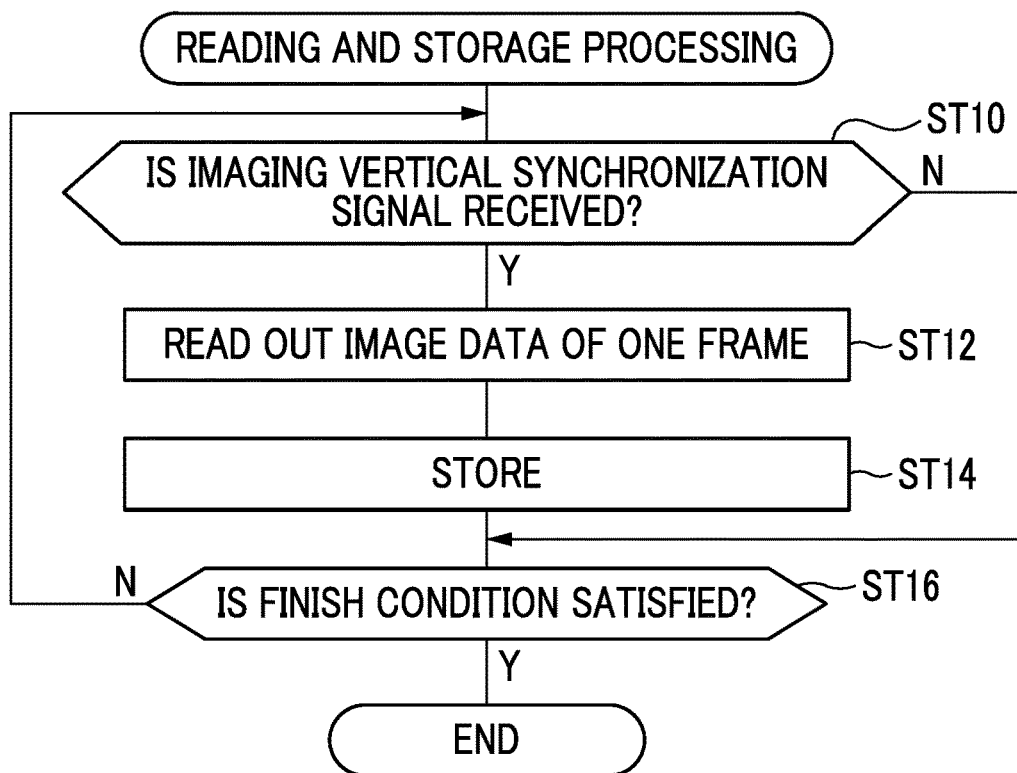
FIG. 12 is a flowchart illustrating an example of a flow of reading and storage processing according to the first embodiment.

In the reading and storage processing illustrated in FIG. 12, first, in step ST10, the control circuit 62E determines whether or not the imaging vertical synchronization signal is received by the first reception I/F 63A. In step ST10, in a case where the imaging vertical synchronization signal is not received by the first reception I/F 63A, a negative determination is made, and the reading and storage processing transitions to step ST16. In step ST10, in a case where the imaging vertical synchronization signal is received by the first reception I/F 63A, a positive determination is made, and the reading and storage processing transitions to step ST12.

In step ST12, the reading circuit 62A reads out the analog image data 69A of one frame from the photoelectric conversion element 61. The analog image data 69A read out from the photoelectric conversion element 61 by the reading circuit 62A is converted into the digital image data 69B and output to the control circuit 62E by the digital processing circuit 62B.

In subsequent step ST14, the control circuit 62E stores the digital image data 69B input from the digital processing circuit 62B in the memory 64. Then, the reading and storage processing transitions to step ST16.

In step ST16, the control circuit 62E determines whether or not a condition (hereinafter, referred to as a "reading and storage processing finish condition") under which the reading and storage processing is finished is satisfied. A condition that an instruction to finish the reading and storage processing is received by the reception device 84 (refer to FIG. 5) is exemplified as an example of the reading and storage processing finish condition. In step ST16, in a case where the reading and storage processing finish condition is not satisfied, a negative determination is made, and the reading and storage processing transitions to step ST10. In step ST16, in a case where the reading and storage processing finish condition is satisfied, a positive determination is made, and the reading and storage processing is finished.

Next, a flow of output processing executed by the processing circuit 62 of the imaging element 44 will be described with reference to FIG. 13.

Figure 13:
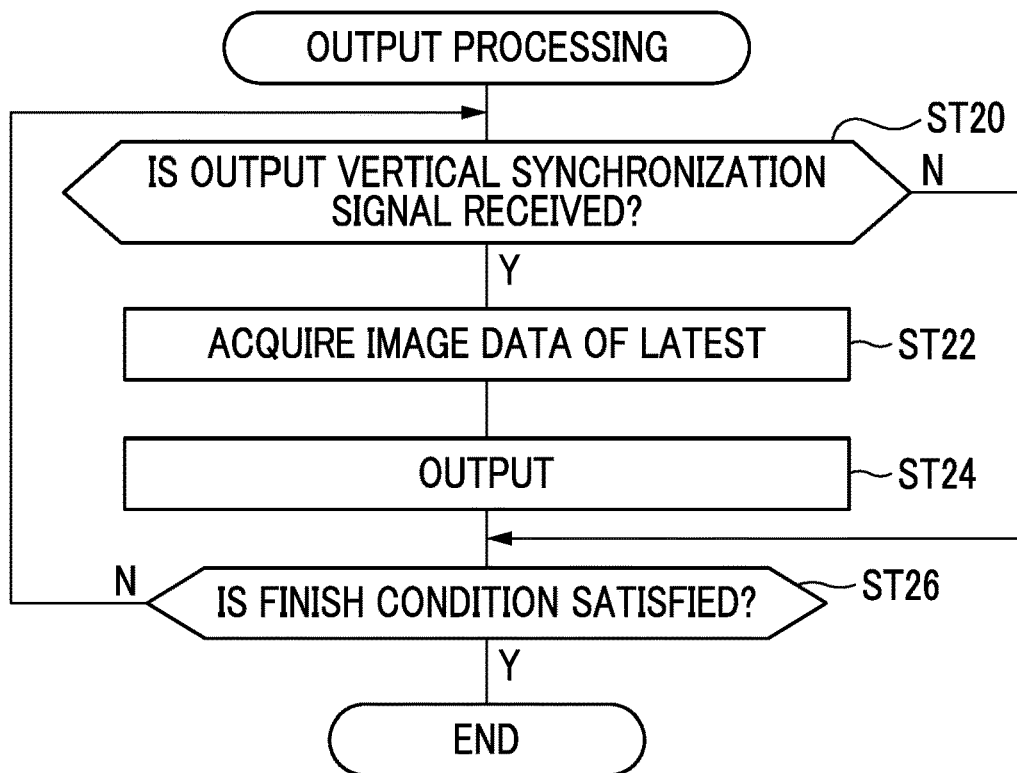
FIG. 13 is a flowchart illustrating an example of a flow of output processing according to the first embodiment.

In the output processing illustrated in FIG. 13, in step ST20, the control circuit 62E determines whether or not the output vertical synchronization signal is received by the second reception I/F 63B. In step ST20, in a case where the output vertical synchronization signal is not received by the second reception I/F 63B, a negative determination is made, and the output processing transitions to step ST26. In step ST20, in a case where the output vertical synchronization signal is received by the second reception I/F 63B, a positive determination is made, and the output processing transitions to step ST22.

In step ST22, the control circuit 62E acquires the latest digital image data 69B of one frame from the memory 64. Here, the latest digital image data 69B refers to the digital image data 69B that is being stored in the memory 64 at the current point in time. The digital image data 69B acquired by the control circuit 62E by executing processing of step ST22 is transferred to the output circuit 62D.

In subsequent step ST24, the output circuit 62D outputs the digital image data 69B, which is input from the control circuit 62E, to the signal processing portion 50 from the output I/F 62D through the communication line 53. Then, the output processing transitions to step ST26.

In step ST26, the control circuit 62E determines whether or not a condition (hereinafter, referred to as an "output processing finish condition") under which the output processing is finished is satisfied. A condition that an instruction to finish the output processing is received by the reception device 84 (refer to FIG. 5) is exemplified as an example of the output processing finish condition. In step ST26, in a case where the output processing finish condition is not satisfied, a negative determination is made, and the output processing transitions to step ST20. In step ST26, in a case where the output processing finish condition is satisfied, a positive determination is made, and the output processing is finished.

Next, a flow of imaging system driving processing executed by the processing circuit 62 of the imaging element 44 will be described with reference to FIG. 14.

Figure 14:
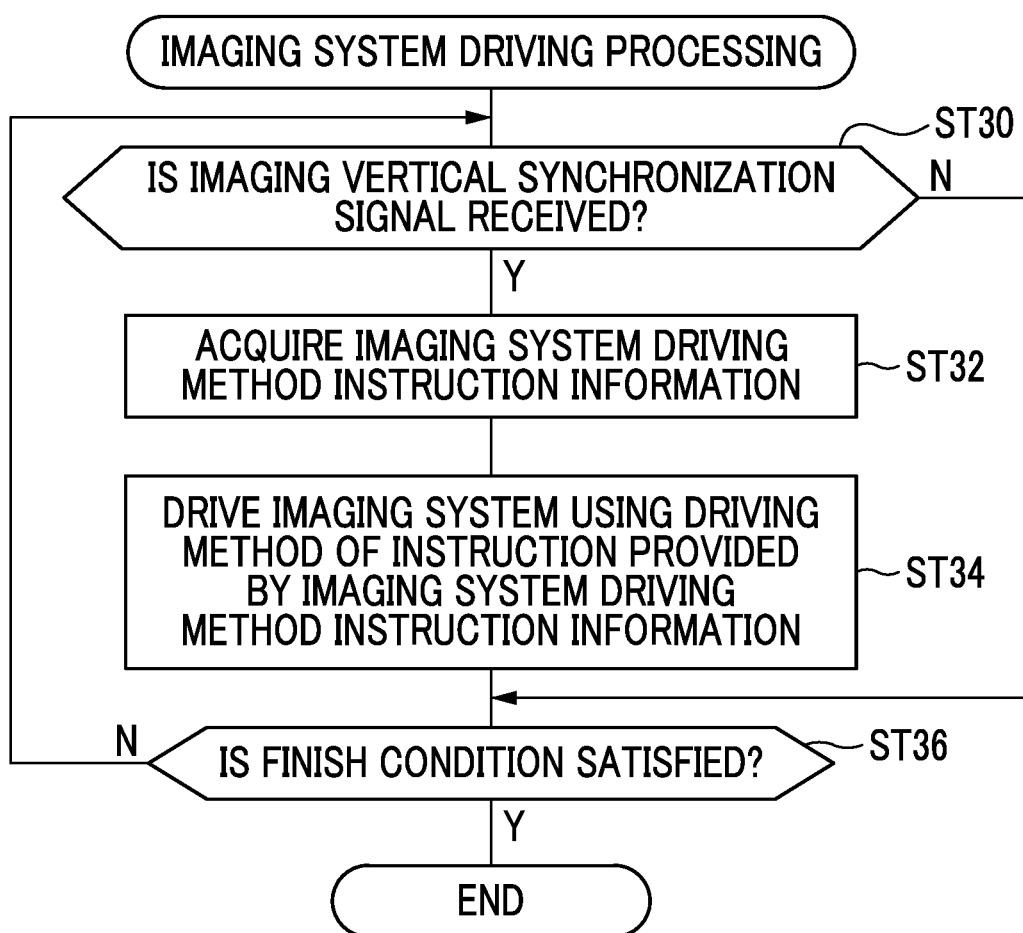
FIG. 14 is a flowchart illustrating an example of a flow of imaging system driving processing according to the first embodiment.

In the imaging system driving processing illustrated in FIG. 14, first, in step ST30, the control circuit 62E determines whether or not the imaging vertical synchronization signal is received by the first reception I/F 63A. In step ST30, in a case where the imaging vertical synchronization signal is not received by the first reception I/F 63A, a negative determination is made, and the imaging system driving processing transitions to step ST36. In step ST30, in a case where the imaging vertical synchronization signal is received by the first reception I/F 63A, a positive determination is made, and the imaging system driving processing transitions to step ST32.

In step ST32, the control circuit 62E acquires the imaging system driving method instruction information from the imaging system storage region 62F1 (refer to FIG. 11). Then, the imaging system driving processing transitions to step ST34.

In step ST34, the control circuit 62E drives the imaging system using the driving method of the instruction provided by the imaging system driving method instruction information acquired in step ST32. Then, the imaging system driving processing transitions to step ST36. The reading circuit 62A is driven in accordance with the imaging region information, the pixel thinning information, the pixel addition method information, the exposure time period information, and the analog gain information. The digital processing circuit 62B is driven in accordance with the conversion gain switching information and the A/D conversion accuracy information.

In step ST36, a determination as to whether or not a condition (hereinafter, referred to as an "imaging system driving processing finish condition") under which the imaging system driving processing is finished is satisfied is performed. A condition that an instruction to finish the imaging system driving processing is received by the reception device 84 (refer to FIG. 5) is exemplified as an example of the imaging system driving processing finish condition. In step ST36, in a case where the imaging system driving processing finish condition is not satisfied, a negative determination is made, and the imaging system driving processing transitions to step ST30. In step ST36, in a case where the imaging system driving processing finish condition is satisfied, a positive determination is made, and the imaging system driving processing is finished.

Next, a flow of output system driving processing executed by the processing circuit 62 of the imaging element 44 will be described with reference to FIG. 15.

Figure 15:
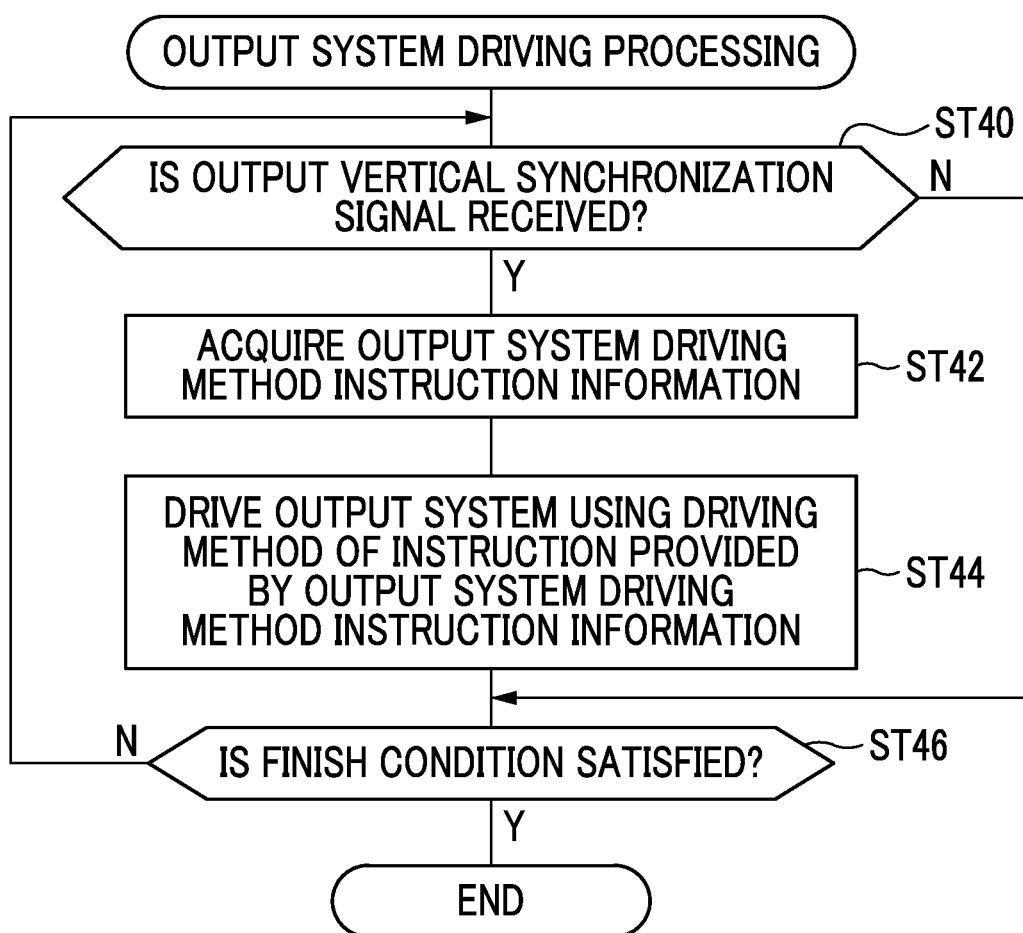
FIG. 15 is a flowchart illustrating an example of a flow of output system driving processing according to the first embodiment.

In the output system driving processing illustrated in FIG. 15, first, in step ST40, the control circuit 62E determines whether or not the output vertical synchronization signal is received by the second reception I/F 63B. In step ST40, in a case where the output vertical synchronization signal is not received by the second reception I/F 63B, a negative determination is made, and the output system driving processing transitions to step ST46. In step ST40, in a case where the output vertical synchronization signal is received by the second reception I/F 63B, a positive determination is made, and the output system driving processing transitions to step ST42.

In step ST42, the control circuit 62E acquires the output system driving method instruction information from the output system storage region 62F2 (refer to FIG. 11). Then, the output system driving processing transitions to step ST44.

In step ST44, the control circuit 62E drives the output system using the driving method of the instruction provided by the output system driving method instruction information acquired in step ST42. Then, the output system driving processing transitions to step ST46. The digital processing circuit 62B is driven in accordance with the digital gain information and the A/D output number-of-bits information. The image processing circuit 62C is driven in accordance with the digital thinning information, the digital addition method information, and the empty bit filling method information. The output circuit 62D is driven in accordance with the output destination information. The control circuit 62E is driven in accordance with the number-of-frames information.

In step ST46, a determination as to whether or not a condition (hereinafter, referred to as an "output system driving processing finish condition") under which the output system driving processing is finished is satisfied is performed. A condition that an instruction to finish the output system driving processing is received by the reception device 84 (refer to FIG. 5) is exemplified as an example of the output system driving processing finish condition. In step ST46, in a case where the output system driving processing finish condition is not satisfied, a negative determination is made, and the output system driving processing transitions to step ST40. In step ST46, in a case where the output system driving processing finish condition is satisfied, a positive determination is made, and the output system driving processing is finished.

Next, a flow of rewriting processing executed by the processing circuit 62 of the imaging element 44 will be described with reference to FIG. 16.

Figure 16:
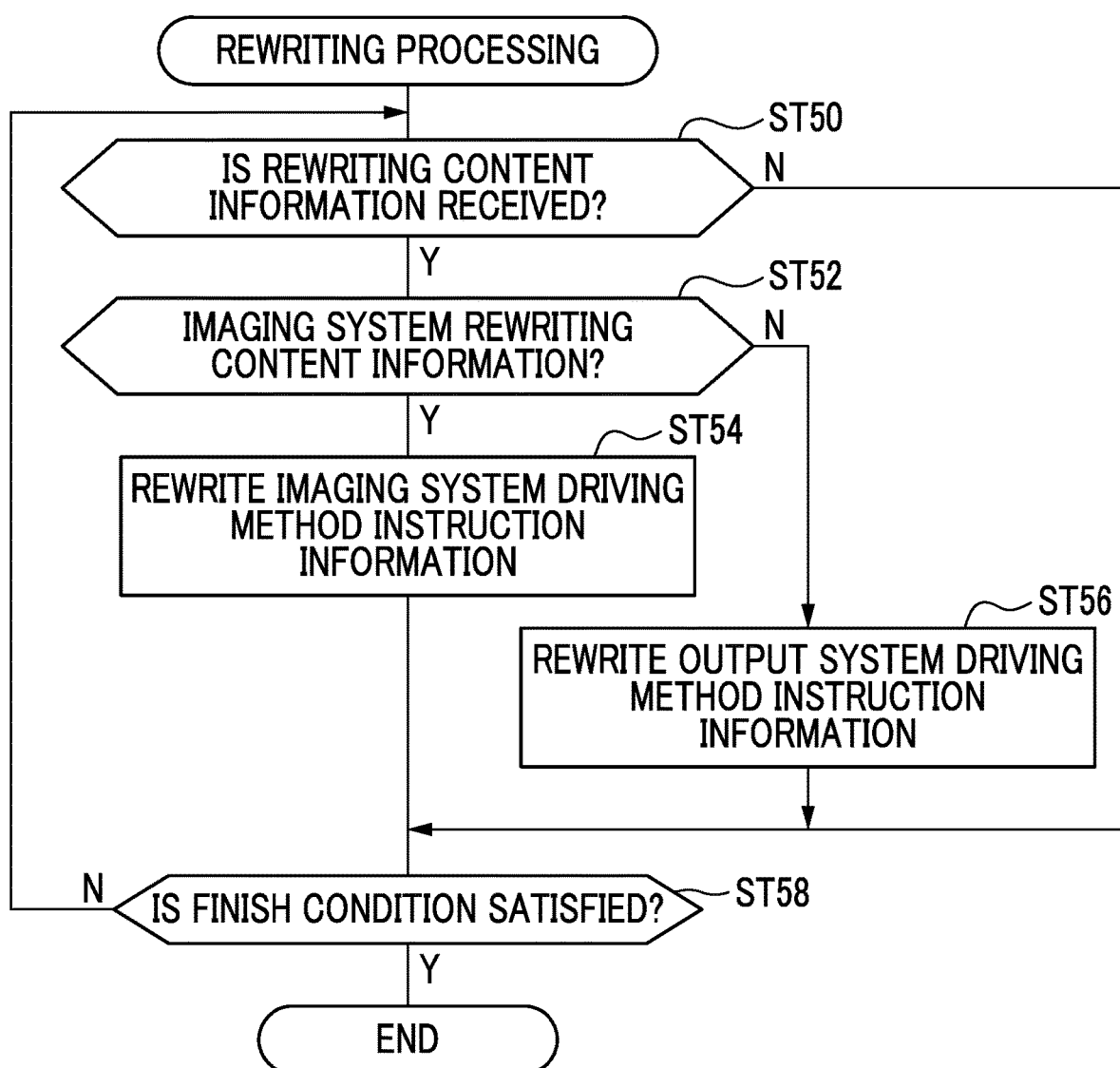
FIG. 16 is a flowchart illustrating an example of a flow of rewriting processing according to the first embodiment.

In the rewriting processing illustrated in FIG. 16, first, in step ST50, the control circuit 62E determines whether or not the rewriting content information is received by the first reception I/F 63A. In step ST50, in a case where the rewriting content information is not received by the first reception I/F 63A, a negative determination is made, and the rewriting processing transitions to step ST58. In step ST50, in a case where the rewriting content information is received by the first reception I/F 63A, a positive determination is made, and the rewriting processing transitions to step ST52.

In step ST52, the control circuit 62E determines whether or not the rewriting content information received by the first reception I/F 63A in step ST50 is the imaging system rewriting content information. In step ST52, in a case where the rewriting content information received by the first reception I/F 63A in step ST50 is the imaging system rewriting content information, a positive determination is made, and the rewriting processing transitions to step ST54. In step ST52, in a case where the rewriting content information received by the first reception I/F 63A in step ST50 is not the imaging system rewriting content information, a negative determination is made, and the rewriting processing transitions to step ST56. A case where the rewriting content information received by the first reception I/F 63A is not the imaging system rewriting content information refers to a case where the rewriting content information received by the first reception I/F 63A is the output system rewriting content information.

In step ST54, the control circuit 62E rewrites the content of the imaging system driving method instruction information in the imaging system storage region 62F1 in accordance with the imaging system rewriting content information received by the first reception I/F 63A in step ST50. Then, the rewriting processing transitions to step ST58.

In step ST56, the control circuit 62E rewrites the content of the output system driving method instruction information in the output system storage region 62F2 in accordance with the output system rewriting content information received by the first reception I/F 63A in step ST50. Then, the rewriting processing transitions to step ST58.

In step ST58, the control circuit 62E determines whether or not a condition (hereinafter, referred to as a "rewriting processing finish condition") under which the rewriting processing is finished is satisfied. A condition that an instruction to finish the rewriting processing is received by the reception device 84 (refer to FIG. 5) is exemplified as an example of the rewriting processing finish condition. In step ST58, in a case where the rewriting processing finish condition is not satisfied, a negative determination is made, and the rewriting processing transitions to step ST50. In step ST58, in a case where the rewriting processing finish condition is satisfied, a positive determination is made, and the rewriting processing is finished.

As described above, in the imaging apparatus 10, the imaging synchronization signal is received by the first reception I/F 63A, and the output synchronization signal is received by the second reception I/F 63B. In addition, the digital image data 69B obtained by performing imaging at the imaging frame rate in accordance with the imaging synchronization signal received by the first reception I/F 63A is stored in the memory 64. The digital image data 69B is output at the output frame rate in accordance with the output synchronization signal received by the second reception I/F 63B.

Accordingly, in a case where a processing speed of the signal processing portion 50 which is the output destination of the digital image data 69B is decreased due to any cause, a processing load on the signal processing portion 50 can be reduced compared to the processing load at the current point in time, by increasing an output interval of the output synchronization signal compared to the output interval at the current point in time. Conversely, in a case where processing performance of the signal processing portion 50 is sufficient, a processing amount in the signal processing portion 50 can be increased compared to the processing amount at the current point in time, by decreasing the output interval of the output synchronization signal compared to the output interval at the current point in time.

In addition, in a case where an output interval of the imaging synchronization signal is also increased after the output interval of the output synchronization signal is increased, imaging is not unnecessarily performed. Thus, power consumption required for imaging can be reduced compared to the power consumption at the current point in time. In addition, exceeding a capacity of the memory 64 in the imaging element 44 can be avoided. In addition, in a case where the output interval of the imaging synchronization signal is also decreased after the output interval of the imaging synchronization signal is decreased, the number of imaging operations can be increased, and more pieces of digital image data 69B can be processed. Furthermore, the output interval of the imaging synchronization signal can be increased or decreased regardless of a length of the output interval of the output synchronization signal. Accordingly, the number of imaging operations can be adjusted from an outside of the imaging element 44. According to the imaging apparatus 10, imaging and output corresponding to a situation of the outside of the imaging element 44 can be implemented.

In addition, in the imaging apparatus 10, the imaging vertical synchronization signal is included in the imaging synchronization signal. Accordingly, according to the imaging apparatus 10, a reading timing of each frame can be adjusted from the outside of the imaging element 44. In addition, in a case where processing in a rear stage circuit (the controller 46 and/or the signal processing portion 50 or the like) of the imaging element 44 is delayed due to any cause at the current point in time, an increase in digital image data 69B that cannot be processed by the rear stage circuit can be avoided by increasing an output interval of the imaging vertical synchronization signal compared to the output interval at the current point in time. In addition, the number of imaging operations can be reduced compared to the number of imaging operations at the current point in time, by increasing the output interval of the imaging vertical synchronization signal. Accordingly, the power consumption required for imaging can be reduced compared to the power consumption at the current point in time. In addition, exceeding the capacity of the memory 64 in the imaging element 44 can be avoided.

In addition, in the imaging apparatus 10, the output vertical synchronization signal is included in the output synchronization signal. Accordingly, according to the imaging apparatus 10, an output timing of each frame can be adjusted from the outside of the imaging element 44. In addition, in a case where processing in the rear stage circuit of the imaging element 44 is delayed due to any cause at the current point in time, the number of output frames can be reduced by increasing an output interval of the output vertical synchronization signal. Accordingly, a load exerted on the rear stage circuit of the imaging element 44 can be reduced compared to the load at the current point in time. In addition, power consumption required for output can be reduced by an amount corresponding to a decrease in number of output frames.

In addition, in the imaging apparatus 10, output is started using the digital image data 69B that is being stored in the memory 64 at a point in time when the output vertical synchronization signal is received by the second reception I/F 63B as the output target of the output circuit 62D. That is, the latest digital image data 69B stored in the memory 64 is used as the output target of the output circuit 62D and is output to the signal processing portion 50. Accordingly, according to the imaging apparatus 10, real-timeness between imaging and output can be increased, compared to a case where the digital image data 69B of a frame earlier than the point in time when the output vertical synchronization signal is received is output.

In addition, in the imaging apparatus 10, in a case where the imaging vertical synchronization signal is received by the first reception I/F 63A, a control for driving the imaging system using the driving method of the instruction provided by the imaging system driving method instruction information in the imaging system storage region 62F1 is performed (refer to FIG. 14). Accordingly, according to the imaging apparatus 10, the imaging system can be driven using the driving method of the instruction provided by the imaging system driving method instruction information in the imaging system storage region 62F1 for each frame.

In addition, in the imaging apparatus 10, in a case where the output vertical synchronization signal is received by the second reception I/F 63B, a control for driving the output system using the driving method of the instruction provided by the output system driving method instruction information in the output system storage region 62F2 is performed (refer to FIG. 15). Accordingly, according to the imaging apparatus 10, the output system can be driven using the driving method of the instruction provided by the output system driving method instruction information in the output system storage region 62F2 for each frame.

In addition, in the imaging apparatus 10, in a case where the imaging system rewriting content information is received by the first reception I/F 63A, the imaging system driving method instruction information in the imaging system storage region 62F1 is rewritten with the content indicated by the imaging system rewriting content information (refer to FIG. 11 and FIG. 16). Accordingly, according to the imaging apparatus 10, the content of the imaging system driving method instruction information held in the imaging element 44 can be rewritten from the outside of the imaging element 44.

In addition, in the imaging apparatus 10, the imaging region information, the pixel thinning information, the pixel addition method information, the exposure time period information, the conversion gain switching information, the analog gain information, and the A/D conversion accuracy information are included in the imaging system driving method instruction information (refer to FIG. 11). Accordingly, according to the imaging apparatus 10, a content of each of the imaging region information, the pixel thinning information, the pixel addition method information, the exposure time period information, the conversion gain switching information, the analog gain information, and the A/D conversion accuracy information held in the imaging element 44 can be rewritten from the outside of the imaging element 44.

In addition, in the imaging apparatus 10, in a case where the output system rewriting content information is received by the first reception I/F 63A, the output system driving method instruction information in the output system storage region 62F2 is rewritten with the content indicated by the output system rewriting content information (refer to FIG. 11 and FIG. 16). Accordingly, according to the imaging apparatus 10, the content of the output system driving method instruction information held in the imaging element 44 can be rewritten from the outside of the imaging element 44.

In addition, in the imaging apparatus 10, the output destination information, the digital thinning information, the digital addition method information, the number-of-frames information, the digital gain information, the A/D output number-of-bits information, and the empty bit filling method information are included in the output system driving method instruction information (refer to FIG. 11). Accordingly, according to the imaging apparatus 10, a content of each of the output destination information, the digital thinning information, the digital addition method information, the number-of-frames information, the digital gain information, the A/D output number-of-bits information, and the empty bit filling method information held in the imaging element 44 can be rewritten from the outside of the imaging element 44.

In addition, the imaging element 44 is an imaging element in which the photoelectric conversion element 61, the processing circuit 62, and the memory 64 are formed in one chip. Accordingly, portability of the imaging element 44 is increased, compared to an imaging element in which the photoelectric conversion element 61, the processing circuit 62, and the memory 64 are not formed in one chip. In addition, a degree of design freedom can be increased, compared to a case of the imaging element in which the photoelectric conversion element 61, the processing circuit 62, and the memory 64 are not formed in one chip. Furthermore, it is possible to contribute to size reduction of the imaging apparatus main body 12, compared to a case of the imaging element in which the photoelectric conversion element 61, the processing circuit 62, and the memory 64 are not formed in one chip.

In addition, as illustrated in FIG. 7, the laminated imaging element in which the photoelectric conversion element 61 is laminated with the memory 64 is employed as the imaging element 44. Accordingly, since a wire that connects the photoelectric conversion element 61 to the memory 64 can be shortened, a wire delay can be reduced. Consequently, a transfer speed of the image data 69 from the photoelectric conversion element 61 to the memory 64 can be increased, compared to a case where the photoelectric conversion element 61 and the memory 64 are not laminated. Improving the transfer speed contributes to high-speed processing in the entire processing circuit 62. In addition, the degree of design freedom can be increased, compared to a case of not laminating the photoelectric conversion element 61 and the memory 64. Furthermore, it is possible to contribute to size reduction of the imaging apparatus main body 12, compared to a case of not laminating the photoelectric conversion element 61 and the memory 64.

Furthermore, in the imaging apparatus 10, the live view image or the like based on the digital image data 69B is displayed on the second display 86. Accordingly, the user can visually recognize an image indicated by the digital image data 69B.

While the imaging element in which the photoelectric conversion element 61, the processing circuit 62, and the memory 64 are formed in one chip is illustrated as the imaging element 44 in the first embodiment, the technology of the present disclosure is not limited thereto. For example, at least the photoelectric conversion element 61 and the memory 64 among the photoelectric conversion element 61, the processing circuit 62, and the memory 64 may be formed in one chip.

In addition, in the first embodiment, the image processing circuit 63C performs the image processing on the digital image data 69B obtained by performing the A/D conversion, and the digital image data 69B on which the image processing is performed is used as the output target. However, the technology of the present disclosure is not limited thereto. The digital image data 69B obtained by performing the A/D conversion may be output by the output circuit 62D without performing the image processing on the digital image data 69B. In this case, instead of the image processing circuit 63C, the signal processing portion 50 and/or the controller 46 which is the rear stage circuit of the imaging element 44 may perform the image processing on the digital image data 69B.

In addition, in the first embodiment, while an example of a form of performing wired communication between the imaging element 44 and the signal processing portion 50 through the communication lines 53 and 55 is illustratively described, the technology of the present disclosure is not limited thereto. For example, wireless communication may be performed between the imaging element 44 and the signal processing portion 50. Similarly, wireless communication may be performed between the imaging element 44 and the controller 46, and wireless communication may be performed between the signal processing portion 50 and the controller 46.

Second Embodiment

In the first embodiment, an example of a form of including the imaging vertical synchronization signal in the imaging synchronization signal and including the output vertical synchronization signal in the output synchronization signal is illustratively described. In a second embodiment, a case of further including an imaging horizontal synchronization signal in the imaging synchronization signal and further including an output horizontal synchronization signal in the output synchronization signal will be described. In the second embodiment, the same constituents as the first embodiment will be designated by the same reference signs and will not be described. Hereinafter, parts different from the first embodiment will be described.

Figure 17:
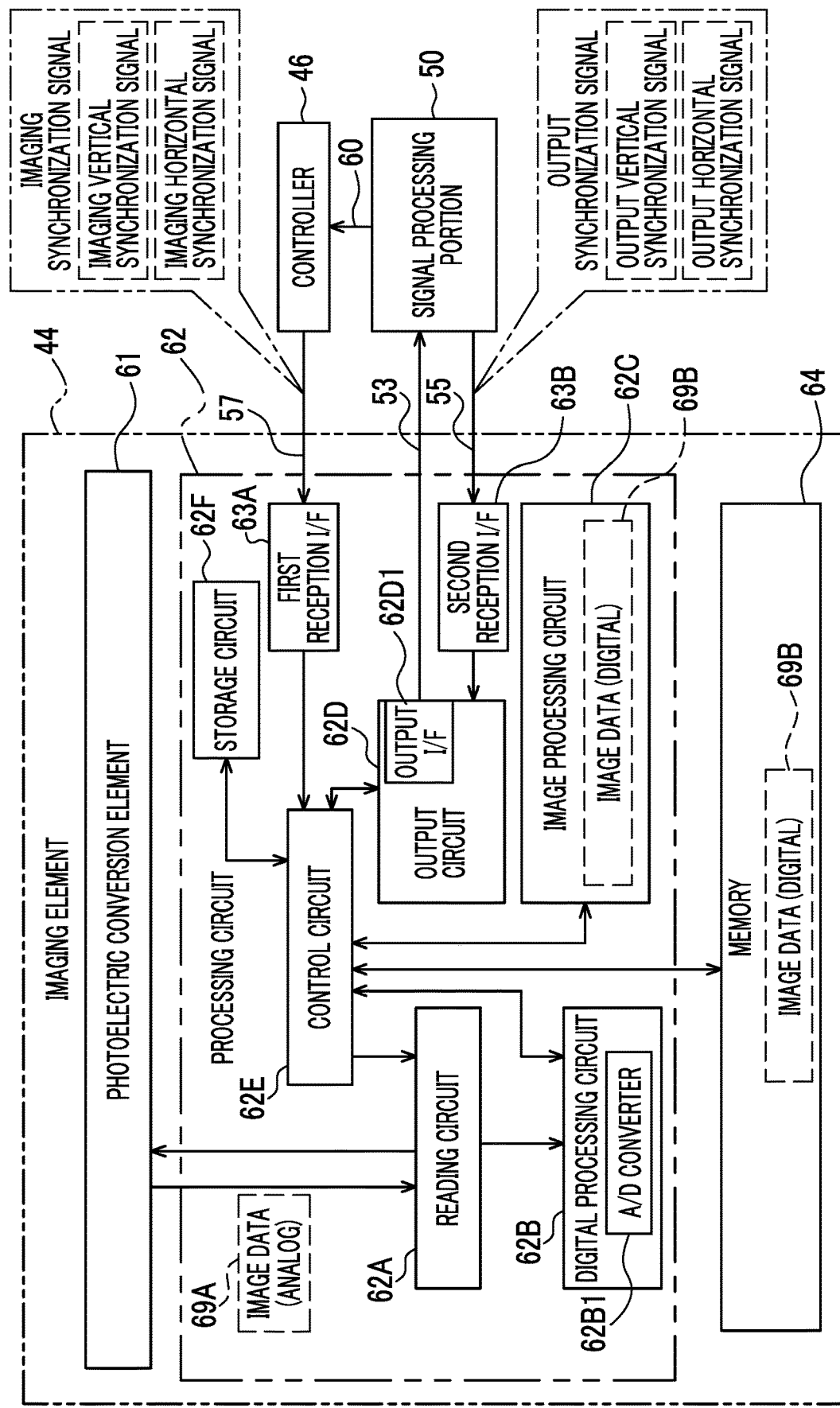
FIG. 17 is a block diagram illustrating an example of a configuration of an electric system of the imaging element included in the imaging apparatus according to the second embodiment.

As illustrated in FIG. 17 as an example, the imaging apparatus 10 according to the second embodiment is different from the first embodiment in that the imaging horizontal synchronization signal is further included in the imaging synchronization signal. In addition, as illustrated in FIG. 17 as an example, the imaging apparatus 10 according to the second embodiment is different from the first embodiment in that the output horizontal synchronization signal is further included in the output synchronization signal. In description of the second embodiment, for convenience of description, the imaging apparatus 10 according to the second embodiment will be simply referred to as the "imaging apparatus 10".

The imaging horizontal synchronization signal is a signal for defining a start timing of reading of the analog image data 69A of one horizontal line. The output horizontal synchronization signal is a signal for defining a start timing of output of the analog image data 69A of one horizontal line.

The controller 46 outputs the imaging horizontal synchronization signal to the first reception I/F 63A through the communication line 57. The signal processing portion 50 outputs the output horizontal synchronization signal to the second reception I/F 63B through the communication line 55.

The first reception I/F 63A receives the imaging vertical synchronization signal for each frame and receives a plurality of imaging horizontal synchronization signals, which are output from the controller 46 through the communication line 57, between adjacent frames.

The first reception I/F 63A outputs the received imaging horizontal synchronization signal to the control circuit 62E. The control circuit 62E transfers the imaging horizontal synchronization signal, which is input from the controller 46 through the first reception I/F 63A, to the reading circuit 62A. In a case where the imaging horizontal synchronization signal is input from the control circuit 62E, the reading circuit 62A starts reading out the analog image data 69A of one horizontal line from the photoelectric conversion element 61.

The second reception I/F 63B receives the output vertical synchronization signal for each frame and receives a plurality of output horizontal synchronization signals, which are output from the signal processing portion 50 through the communication line 55, between adjacent frames.

The second reception I/F 63B outputs the received output horizontal synchronization signal to the output circuit 62D. In a case where the output horizontal synchronization signal is input from the signal processing portion 50 through the second reception I/F 63B, the output circuit 62D starts outputting the digital image data 69B of one horizontal line to the signal processing portion 50 from the output I/F 62D1.

Next, an action of the imaging apparatus 10 will be described.

First, a flow of reading and storage processing executed by the processing circuit 62 of the imaging element 44 will be described with reference to FIG. 18.

Figure 18:
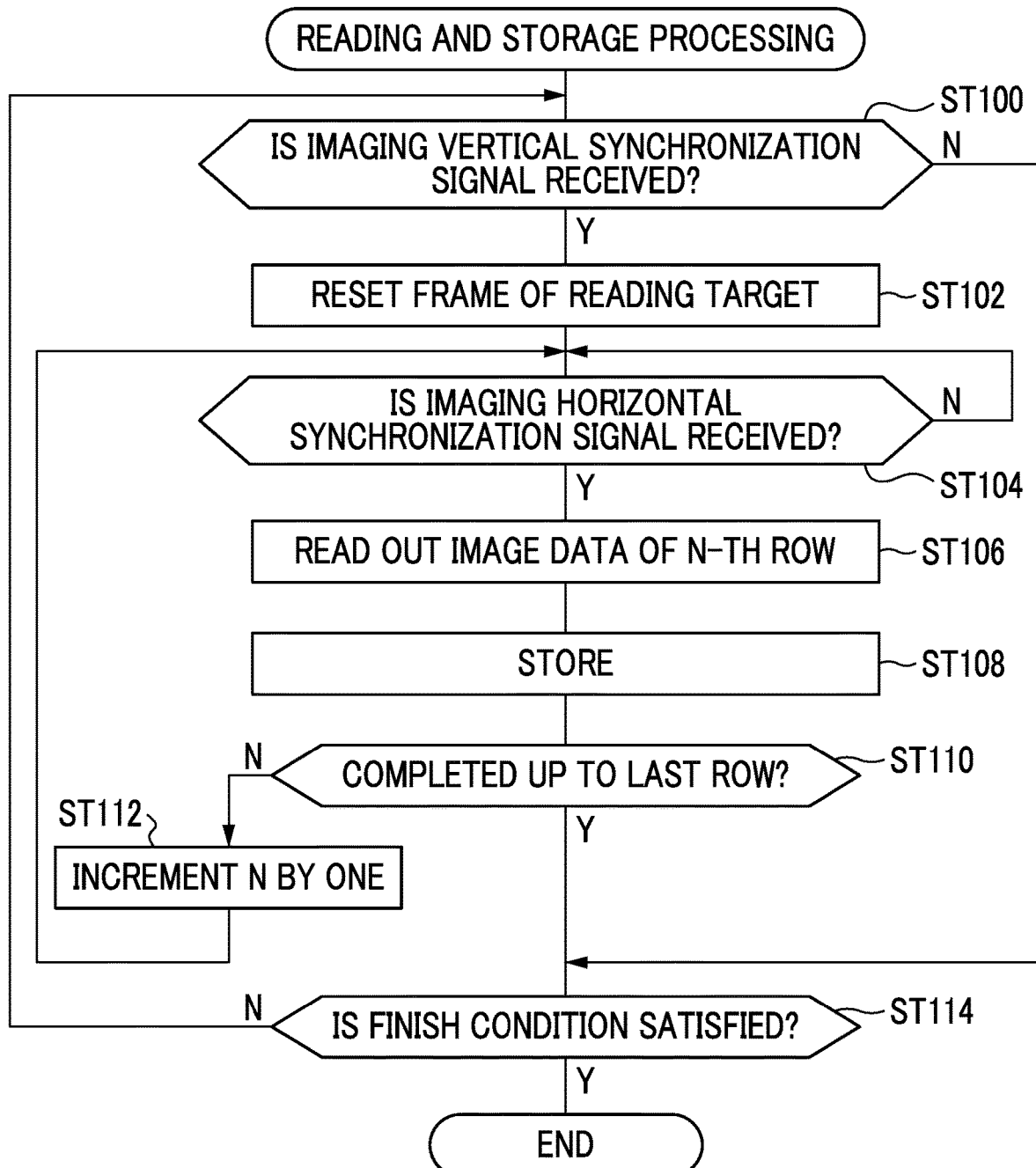
FIG. 18 is a flowchart illustrating an example of a flow of reading and storage processing according to the second embodiment.

In the reading and storage processing illustrated in FIG. 18, first, in step ST100, the control circuit 62E determines whether or not the imaging vertical synchronization signal is received by the first reception I/F 63A. In step ST100, in a case where the imaging vertical synchronization signal is not received by the first reception I/F 63A, a negative determination is made, and the reading and storage processing transitions to step ST114. In step ST100, in a case where the imaging vertical synchronization signal is received by the first reception I/F 63A, a positive determination is made, and the reading and storage processing transitions to step ST102. In step ST100, in a case where the positive determination is made, the imaging vertical synchronization signal is transferred to the reading circuit 62A.

In step ST102, the reading circuit 62A resets a frame of the analog image data 69A of a reading target from the photoelectric conversion element 61 in accordance with an instruction of the control circuit 62E. That is, the reading circuit 62A sets the horizontal line of the first row among all horizontal lines included in the photoelectric conversion element 61 as a reading target line of the analog image data 69A.

In subsequent step ST104, the control circuit 62E determines whether or not the imaging horizontal synchronization signal is received by the first reception I/F 63A. In step ST104, in a case where the imaging horizontal synchronization signal is not received by the first reception I/F 63A, a negative determination is made, and the determination of step ST104 is performed again. In step ST104, in a case where the imaging horizontal synchronization signal is received by the first reception I/F 63A, a positive determination is made, and the reading and storage processing transitions to step ST106. In step ST104, in a case where the positive determination is made, the imaging horizontal synchronization signal is transferred to the reading circuit 62A.

In step ST106, the reading circuit 62A reads out the analog image data 69A of an N-th row from the photoelectric conversion element 61 as the analog image data 69A of one horizontal line. Here, "N" of the "N-th row" means a value indicating which row the horizontal line is in, that is, an address of the horizontal line. An initial value of "N" is "1".

The analog image data 69A of one horizontal line read out from the photoelectric conversion element 61 by the reading circuit 62A is converted into the digital image data 69B and output to the control circuit 62E by the digital processing circuit 62B.

In subsequent step ST108, the control circuit 62E stores the digital image data 69B input from the digital processing circuit 62B in the memory 64. Then, the reading and storage processing transitions to step ST110.

In step ST110, the control circuit 62E determines whether or not processing of step ST104 to step ST108 is completed up to the horizontal line of the last row. In step ST110, in a case where processing of step ST104 to step ST108 is completed up to the horizontal line of the last row, a positive determination is made, and the reading and storage processing transitions to step ST114. In step ST110, in a case where processing of step ST104 to step ST108 is not completed up to the horizontal line of the last row, a negative determination is made, and the reading and storage processing transitions to step ST112.

In step ST112, the control circuit 62E increments N by one. Then, the reading and storage processing transitions to step ST104.

In step ST114, in the same manner as the first embodiment, the control circuit 62E determines whether or not the reading and storage processing finish condition is satisfied. In step ST114, in a case where the reading and storage processing finish condition is not satisfied, a negative determination is made, and the reading and storage processing transitions to step ST100. In step ST114, in a case where the reading and storage processing finish condition is satisfied, a positive determination is made, and the reading and storage processing is finished.

Next, a flow of output processing executed by the processing circuit 62 of the imaging element 44 will be described with reference to FIG. 19.

Figure 19:
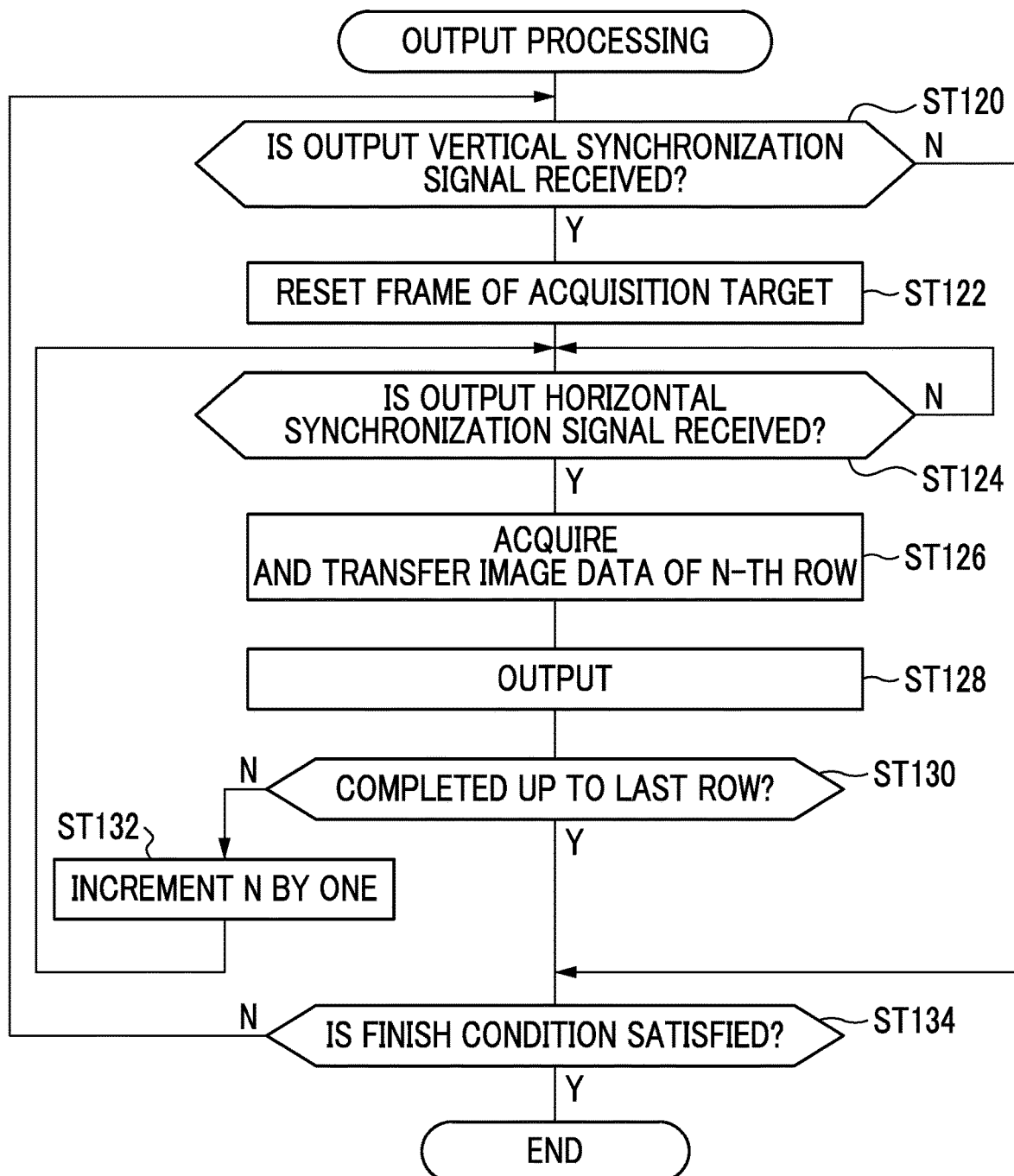
FIG. 19 is a flowchart illustrating an example of a flow of output processing according to the second embodiment.

In the output processing illustrated in FIG. 19, in step ST120, the control circuit 62E determines whether or not the output vertical synchronization signal is received by the second reception I/F 63B. In step ST120, in a case where the output vertical synchronization signal is not received by the second reception I/F 63B, a negative determination is made, and the output processing transitions to step ST134. In step ST120, in a case where the output vertical synchronization signal is received by the second reception I/F 63B, a positive determination is made, and the output processing transitions to step ST122.

In step ST122, the control circuit 62E resets a frame of the digital image data 69B of an acquisition target from the memory 64. That is, the control circuit 62E sets a horizontal line of a first row among all horizontal lines included in the latest digital image data 69B in the memory 64 as a reading target line of the digital image data 69B. Here, the latest digital image data 69B refers to the digital image data 69B that is being stored in the memory 64 at the current point in time in the same manner as the first embodiment.

In subsequent step ST124, the control circuit 62E determines whether or not the output horizontal synchronization signal is received by the second reception I/F 63B. In step ST124, in a case where the output horizontal synchronization signal is not received by the second reception I/F 63B, a negative determination is made, and the determination of step ST124 is performed again. In step ST124, in a case where the output horizontal synchronization signal is received by the second reception I/F 63B, a positive determination is made, and the output processing transitions to step ST126. In step ST124, in a case where the positive determination is made, the output horizontal synchronization signal is transferred to the control circuit 62E from the second reception I/F 63B through the output circuit 62D.

In subsequent step ST126, the control circuit 62E acquires the digital image data 69B of the horizontal line of the N-th row included in the latest digital image data 69B from the memory 64, and transfers the acquired digital image data 69B of the horizontal line of the N-th row to the output circuit 62D.

In subsequent step ST128, the output circuit 62D outputs the digital image data 69B of the horizontal line of the N-th row, which is input from the control circuit 62E, to the signal processing portion 50 from the output I/F 62D through the communication line 53.

In subsequent step ST130, the control circuit 62E determines whether or not processing of step ST124 to step ST128 is completed up to the horizontal line of the last row. In step ST130, in a case where processing of step ST124 to step ST128 is completed up to the horizontal line of the last row, a positive determination is made, and the output processing transitions to step ST134. In step ST130, in a case where processing of step ST124 to step ST128 is not completed up to the horizontal line of the last row, a negative determination is made, and the output processing transitions to step ST132.

In step ST132, the control circuit 62E increments N by one. Then, the output processing transitions to step ST124.

In step ST134, in the same manner as the first embodiment, the control circuit 62E determines whether or not the output processing finish condition is satisfied. In step ST134, in a case where the output processing finish condition is not satisfied, a negative determination is made, and the output processing transitions to step ST120. In step ST134, in a case where the output processing finish condition is satisfied, a positive determination is made, and the output processing is finished.

As described above, in the imaging apparatus 10, the imaging horizontal synchronization signal is included in the imaging synchronization signal. Accordingly, according to the imaging apparatus 10, a reading timing of the horizontal line can be adjusted from the outside of the imaging element 44. In the second embodiment, while an example of a form of including the imaging vertical synchronization signal and the imaging horizontal synchronization signal in the imaging synchronization signal is illustratively described, only the imaging horizontal synchronization signal out of the imaging vertical synchronization signal and the imaging horizontal synchronization signal may be included in the imaging synchronization signal. In this case, the imaging vertical synchronization signal may be received from the controller 46 through another communication line by the first reception I/F 63A or another reception I/F, and the received imaging vertical synchronization signal may be transferred to the control circuit 62E.

In addition, in the imaging apparatus 10, the output horizontal synchronization signal is included in the output synchronization signal. Accordingly, according to the imaging apparatus 10, an output timing for each horizontal line can be adjusted from the outside of the imaging element 44. In the second embodiment, while an example of a form of including the output vertical synchronization signal and the output horizontal synchronization signal in the output synchronization signal is illustratively described, only the output horizontal synchronization signal out of the output vertical synchronization signal and the output horizontal synchronization signal may be included in the output synchronization signal. In this case, the output vertical synchronization signal may be received from the signal processing portion 50 through another communication line by the second reception I/F 63B or another reception I/F, and the received output vertical synchronization signal may be transferred to the control circuit 62E through the output circuit 62D.

Third Embodiment

In the first and second embodiments, an example of a form of using the digital image data 69B that is being stored in the memory 64 at a point in time when the output vertical synchronization signal is received by the second reception I/F 63B as the output target of the output circuit 62D is illustratively described. In a third embodiment, a case of using the digital image data 69B of one frame of which storage in the memory 64 is already completed as the output target of the output circuit 62D will be described. In the third embodiment, the same constituents as the first and second embodiments will be designated by the same reference signs and will not be described. Hereinafter, parts different from the first and second embodiments will be described. In addition, in description of the third embodiment, for convenience of description, the imaging apparatus 10 according to the third embodiment will be simply referred to as the "imaging apparatus 10".

Figure 20:
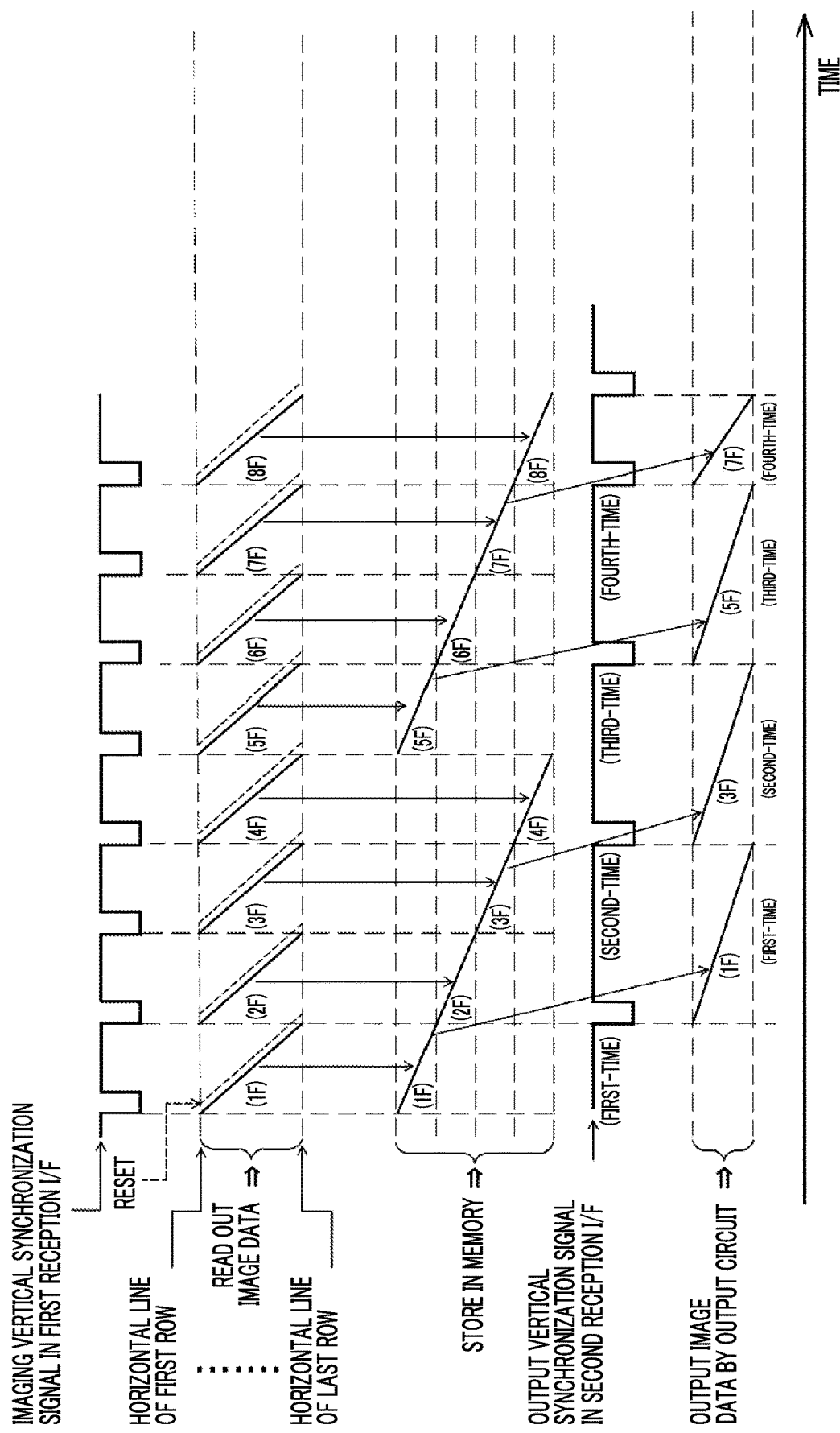
FIG. 20 is a time chart illustrating an example of a flow of operation of the imaging element included in the imaging apparatus according to the third embodiment.

As illustrated in FIG. 20 as an example, in the imaging apparatus 10, in a case where the output vertical synchronization signal is received by the second reception I/F 63B, the latest digital image data 69B of one frame already stored in the memory 64 is output by the output circuit 62D.

In the example illustrated in FIG. 20, the digital image data 69B of the second frame is being stored in the memory 64 at a point in time when the first-time output vertical synchronization signal is received by the second reception I/F 63B. At this point, the digital image data 69B of the first frame which is the digital image data 69B earlier by one frame than the digital image data 69B of the second frame being stored in the memory 64 is already stored in the memory 64. In this case, the digital image data 69B of the first frame output by the output circuit 62D is the digital image data 69B of the first frame that is already stored in the memory 64 at a point in time when the first-time output vertical synchronization signal is received by the second reception I/F 63B.

That is, in a case where the first-time output vertical synchronization signal is received by the second reception I/F 63B, the output circuit 62D outputs the digital image data 69B of the first frame already stored in the memory 64.

The digital image data 69B of the fourth frame is being stored in the memory 64 at a point in time when the second-time output vertical synchronization signal is received by the second reception I/F 63B. At this point, the digital image data 69B of the third frame which is the digital image data 69B earlier by one frame than the digital image data 69B of the fourth frame being stored in the memory 64 is already stored in the memory 64. In this case, the digital image data 69B of the second frame output by the output circuit 62D is the digital image data 69B of the third frame that is already stored in the memory 64 at a point in time when the second-time output vertical synchronization signal is received by the second reception I/F 63B.

That is, in a case where the second-time output vertical synchronization signal is received by the second reception I/F 63B, the output circuit 62D outputs the digital image data 69B of the third frame already stored in the memory 64.

The digital image data 69B of the sixth frame is being stored in the memory 64 at a point in time when the third-time output vertical synchronization signal is received by the second reception I/F 63B. At this point, the digital image data 69B of the fifth frame which is the digital image data 69B earlier by one frame than the digital image data 69B of the sixth frame being stored in the memory 64 is already stored in the memory 64. In this case, the digital image data 69B of the third frame output by the output circuit 62D is the digital image data 69B of the fifth frame that is already stored in the memory 64 at a point in time when the third-time output vertical synchronization signal is received by the second reception I/F 63B.

That is, in a case where the third-time output vertical synchronization signal is received by the second reception I/F 63B, the output circuit 62D outputs the digital image data 69B of the fifth frame already stored in the memory 64.

The digital image data 69B of the eighth frame is being stored in the memory 64 at a point in time when the fourth-time output vertical synchronization signal is received by the second reception I/F 63B. At this point, the digital image data 69B of the seventh frame which is the digital image data 69B earlier by one frame than the digital image data 69B of the eighth frame being stored in the memory 64 is already stored in the memory 64. In this case, the digital image data 69B of the fourth frame output by the output circuit 62D is the digital image data 69B of the seventh frame that is already stored in the memory 64 at a point in time when the fourth-time output vertical synchronization signal is received by the second reception I/F 63B.

That is, in a case where the fourth-time output vertical synchronization signal is received by the second reception I/F 63B, the output circuit 62D outputs the digital image data 69B of the seventh frame already stored in the memory 64.

Next, a flow of output processing executed by the processing circuit 62 of the imaging element 44 will be described with reference to FIG. 21.

Figure 21:
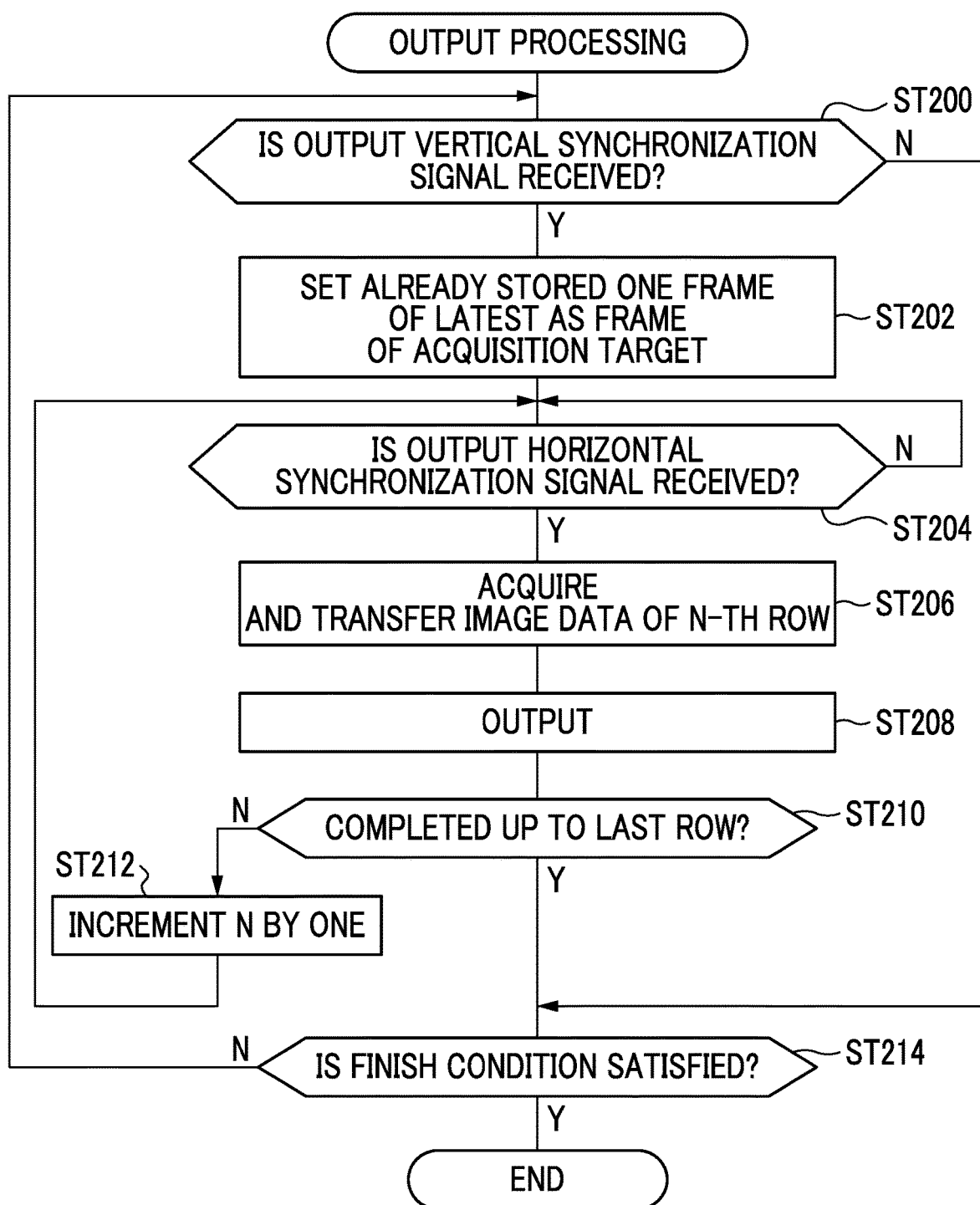
FIG. 21 is a flowchart illustrating an example of a flow of output processing according to the third embodiment.

In the output processing illustrated in FIG. 21, in step ST200, the control circuit 62E determines whether or not the output vertical synchronization signal is received by the second reception I/F 63B. In step ST200, in a case where the output vertical synchronization signal is not received by the second reception I/F 63B, a negative determination is made, and the output processing transitions to step ST214. In step ST200, in a case where the output vertical synchronization signal is received by the second reception I/F 63B, a positive determination is made, and the output processing transitions to step ST202.

In step ST202, the control circuit 62E sets the latest digital image data 69B of one frame already stored in the memory 64 as the digital image data 69B of one frame of the acquisition target. That is, the control circuit 62E sets a horizontal line of a first row among all horizontal lines included in the latest digital image data 69B in the memory 64 as a reading target line of the digital image data 69B. That is, here, the latest digital image data 69B of one frame refers to the digital image data 69B already stored in the memory 64 earlier by one frame than the digital image data 69B that is being stored in the memory 64 at the current point in time.

In subsequent step ST204, the control circuit 62E determines whether or not the output horizontal synchronization signal is received by the second reception I/F 63B. In step ST204, in a case where the output horizontal synchronization signal is not received by the second reception I/F 63B, a negative determination is made, and the determination of step ST204 is performed again. In step ST204, in a case where the output horizontal synchronization signal is received by the second reception I/F 63B, a positive determination is made, and the output processing transitions to step ST206. In step ST204, in a case where the positive determination is made, the output horizontal synchronization signal is transferred to the control circuit 62E from the second reception I/F 63B through the output circuit 62D.

In subsequent step ST206, the control circuit 62E acquires the digital image data 69B of the horizontal line of the N-th row included in the latest digital image data 69B of one frame already stored in the memory 64, and transfers the acquired digital image data 69B of the horizontal line of the N-th row to the output circuit 62D.

In subsequent step ST208, the output circuit 62D outputs the digital image data 69B of the horizontal line of the N-th row, which is input from the control circuit 62E, to the signal processing portion 50 from the output I/F 62D through the communication line 53.

In subsequent step ST210, the control circuit 62E determines whether or not processing of step ST204 to step ST208 is completed up to the horizontal line of the last row. In step ST210, in a case where processing of step ST204 to step ST208 is completed up to the horizontal line of the last row, a positive determination is made, and the output processing transitions to step ST214. In step ST210, in a case where processing of step ST204 to step ST208 is not completed up to the horizontal line of the last row, a negative determination is made, and the output processing transitions to step ST212.

In step ST212, the control circuit 62E increments N by one. Then, the output processing transitions to step ST204.

In step ST214, in the same manner as the first embodiment, the control circuit 62E determines whether or not the output processing finish condition is satisfied. In step ST214, in a case where the output processing finish condition is not satisfied, a negative determination is made, and the output processing transitions to step ST200. In step ST214, in a case where the output processing finish condition is satisfied, a positive determination is made, and the output processing is finished.

As described above, in the imaging apparatus 10, the digital image of one frame already stored in the memory 64 earlier by one frame than the digital image data 69B that is being stored in the memory 64 at a point in time when the output vertical synchronization signal is received by the second reception I/F 63B is used as the output target of the output circuit 62D. In a case where the digital image data 69B being stored in the memory 64 is used as the output target, output is started in a state where the digital image data 69B of one frame is not stored in the memory 64. Thus, it is necessary to wait until the entire digital image data 69B of one frame is stored in the memory 64. Meanwhile, in a case of a digital image of one frame already stored in the memory 64, the entire digital image of one frame can be output without waiting. Accordingly, according to the imaging apparatus 10, a delay in output of the digital image data 69B can be avoided.

Fourth Embodiment

In the third embodiment, an example of a form of using only the digital image data 69B of one frame already stored in the memory 64 as the output target is described. In a fourth embodiment, a case of selectively using the digital image data 69B of one frame already stored in the memory 64 and the digital image data 69B being stored in the memory 64 as the output target will be described. In the fourth embodiment, the same constituents as the first to third embodiments will be designated by the same reference signs and will not be described. Hereinafter, parts different from the first to third embodiments will be described. In addition, in description of the fourth embodiment, for convenience of description, the imaging apparatus 10 according to the fourth embodiment will be simply referred to as the "imaging apparatus 10".

Figure 22:
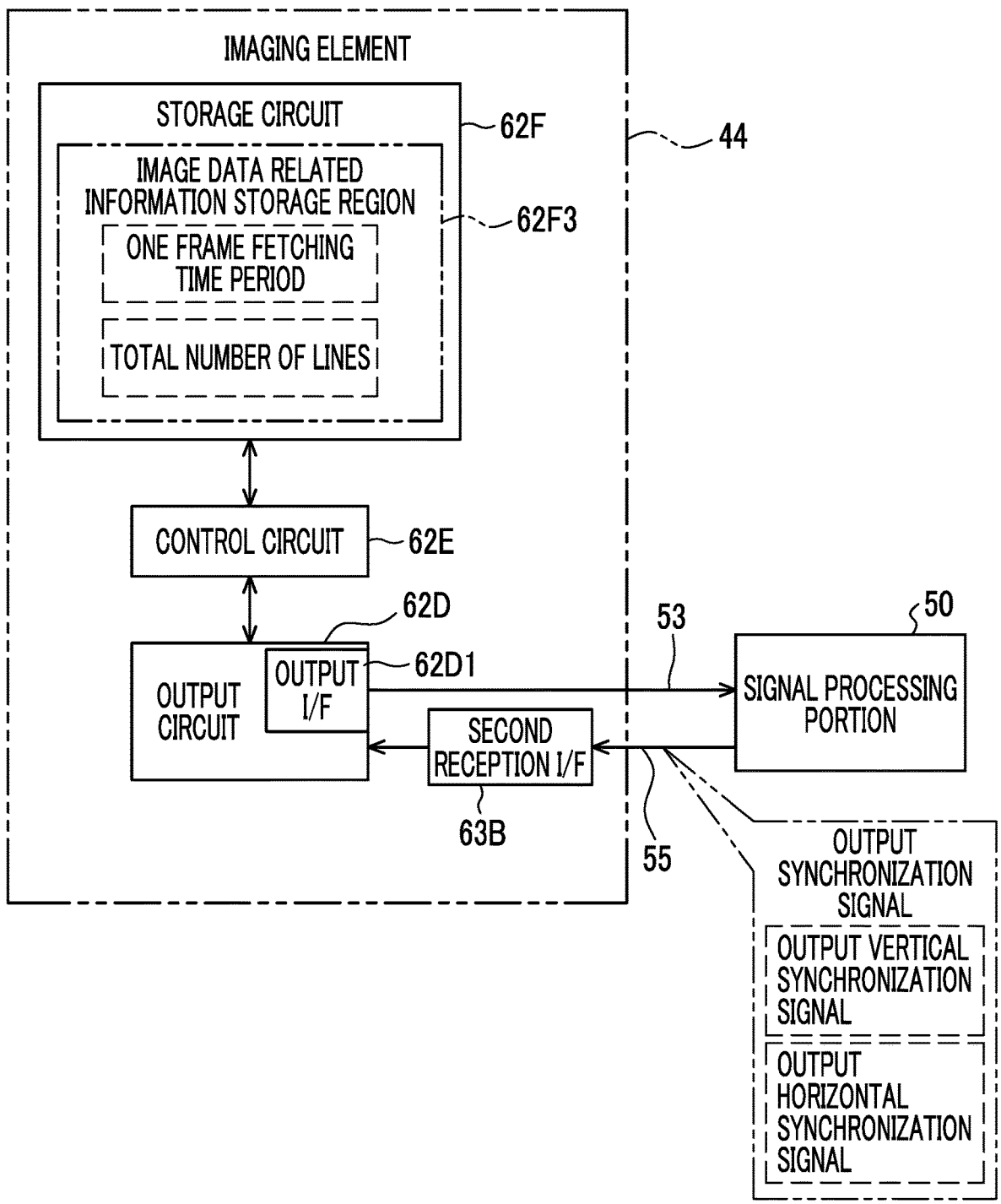
FIG. 22 is a block diagram for describing the storage content of the storage circuit in the imaging element included in the imaging apparatus according to the fourth embodiment.

As illustrated in FIG. 22 as an example, the storage circuit 62F of the imaging element 44 included in the imaging apparatus 10 is different from the storage circuit 62F employed in the first to third embodiments in that an image data related information storage region 62F3 is included.

Information related to the digital image data 69B is stored in the image data related information storage region 62F3. Specifically, the image data related information storage region 62F3 stores a one frame fetching time period and the total number of lines.

The one frame fetching time period refers to a time period in which the image data 69 of one frame is fetched into the imaging element 44. A time period from a start to a finish of the imaging processing described in the first embodiment for one frame is exemplified as an example of the one frame fetching time period. For example, the time period from the start to the finish of the imaging processing refers to a time period required from reception of the imaging vertical synchronization signal by the first reception I/F 63A (refer to FIG. 17) to storage of the digital image data 69B of one frame obtained by imaging in the memory 64.

The total number of lines refers to the total number of horizontal lines of the reading target of the analog image data 69A among all horizontal lines included in the photoelectric conversion element 61. In the fourth embodiment, for convenience of description, the number of all horizontal lines included in the photoelectric conversion element 61 is employed as the total number of horizontal lines of the reading target of the analog image data 69A. Each horizontal line is assigned a line address for specifying the horizontal line. Here, a row number indicating which row each of the horizontal line of the first row to the horizontal line of the last row is in is employed as the line address for specifying the horizontal line.

Figure 23:
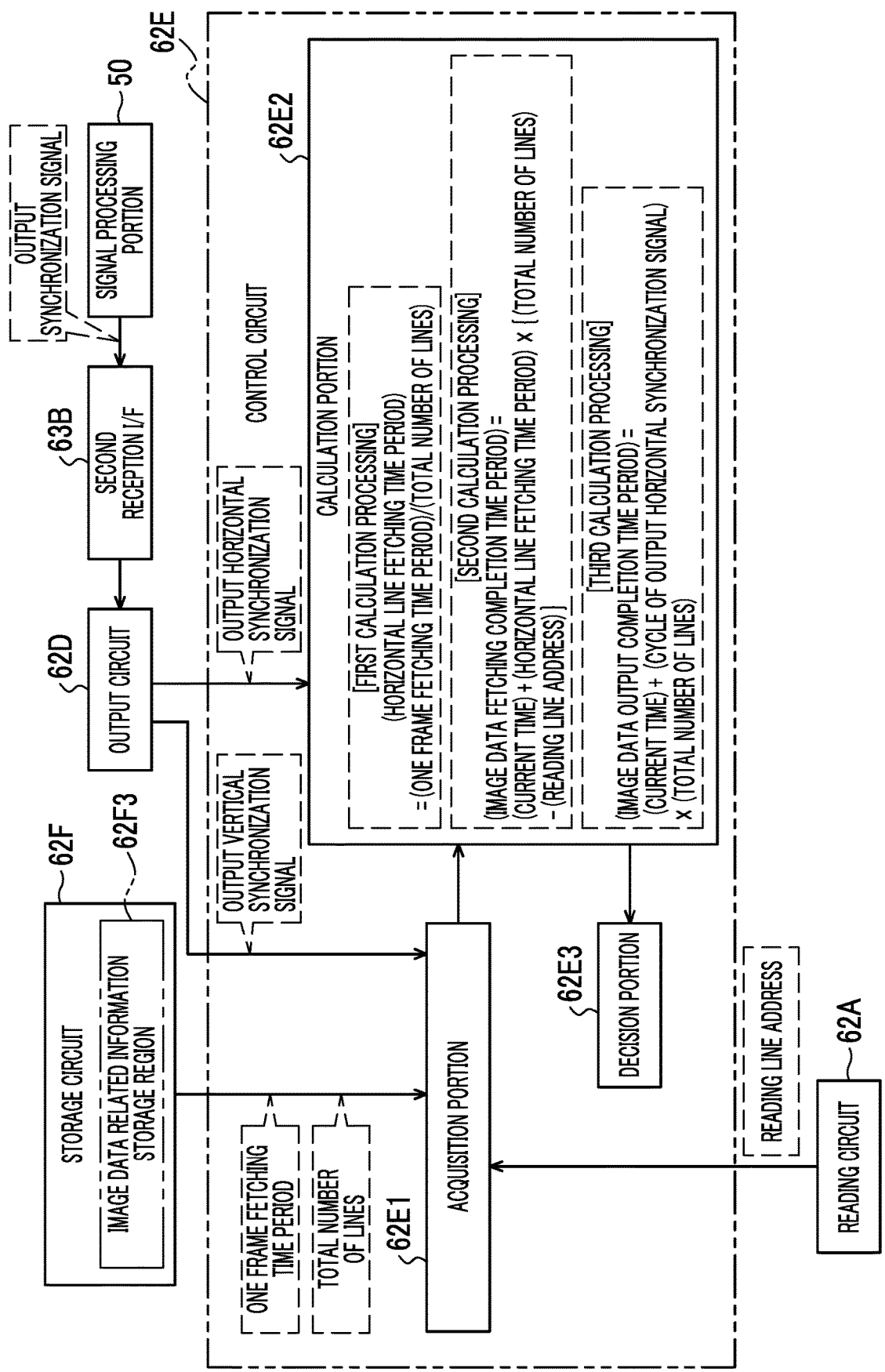
FIG. 23 is a block diagram illustrating an example of a characteristic part of a configuration of an electric system of the imaging element included in the imaging apparatus according to the fourth embodiment.

As illustrated in FIG. 23 as an example, the control circuit 62E includes an acquisition portion 62E1, a calculation portion 62E2, and a decision portion 62E3. The storage circuit 62F and the output circuit 62D are connected to the acquisition portion 62E1.

The output vertical synchronization signal output from the signal processing portion 50 through the communication line 55 is received by the second reception I/F 63B and transferred to the acquisition portion 62E1 through the output circuit 62D. In a case where the output vertical synchronization signal is input from the output circuit 62D, the acquisition portion 62E1 acquires the one frame fetching time period and the total number of lines from the image data related information storage region 62F3. In addition, in a case where the output vertical synchronization signal is input from the output circuit 62D, the acquisition portion 62E1 acquires a line address (hereinafter, referred to as a "reading line address") of a horizontal line that is being read out from the photoelectric conversion element 61 at the current point in time, from the reading circuit 62A. The acquisition portion 62E1 outputs the acquired one frame fetching time period, the total number of lines, and the reading line address to the calculation portion 62E2.

The calculation portion 62E2 performs first calculation processing, second calculation processing, and third calculation processing based on the one frame fetching time period, the total number of lines, and the reading line address input from the acquisition portion 62E1.

In the first calculation processing, a horizontal line fetching time period is calculated. The horizontal line fetching time period refers to a time period in which the image data 69 of one horizontal line is fetched into the imaging element 44. A time period from a start to a finish of the imaging processing described in the first embodiment for one horizontal line is exemplified as an example of the horizontal line fetching time period. The horizontal line fetching time period is calculated from Expression (1) below by the calculation portion 62E2.

(Horizontal line fetching time period)=(one frame
 fetching time period)/(total number of lines)  (1)

In the second calculation processing, an image data fetching completion time period is calculated. The image data fetching completion time period refers to a remaining time period required until storage, in the memory 64, of the digital image data 69B of one frame that is being stored in the memory 64 at the current point in time is completed. The image data fetching completion time period is calculated from Expression (2) below by the calculation portion 62E2. In Expression (2), "current time" is included as an independent variable. However, "current time" may be "0".

(Image data fetching completion time period)=(cur-
 rent time)+(horizontal line fetching time
 period)×{(total number of lines)−(reading line
 address)}  (2)

In the third calculation processing, an image data output completion time period is calculated. The image data output completion time period refers to a time period required from a start to completion of output of the digital image data 69B of one frame that is used as the output target at the current point in time. The image data output completion time period is an example of an "output completion time period predicted as a time period in which output of image data of one frame is completed" according to the embodiments of the technology of the present disclosure. The image data output completion time period is calculated from Expression (3) below by the calculation portion 62E2. In Expression (3) below, "cycle of output horizontal synchronization signal" is a cycle in which the output horizontal synchronization signal is received by the second reception I/F 63B.

(Image data output completion time period)=(current time)+(cycle of output horizontal synchronization signal)×(total number of lines)     (3)

The output horizontal synchronization signal received by the second reception I/F 63B is transferred to the calculation portion 62E2. Accordingly, "cycle of output horizontal synchronization signal" is obtained by inputting the output horizontal synchronization signal into the calculation portion 62E2 twice. That is, a time period from input of a first-time output horizontal synchronization signal to input of a second-time output horizontal synchronization signal is "cycle of output horizontal synchronization signal". In Expression (3), "current time" is included as an independent variable. However, "current time" may be "0".

Figure 24:
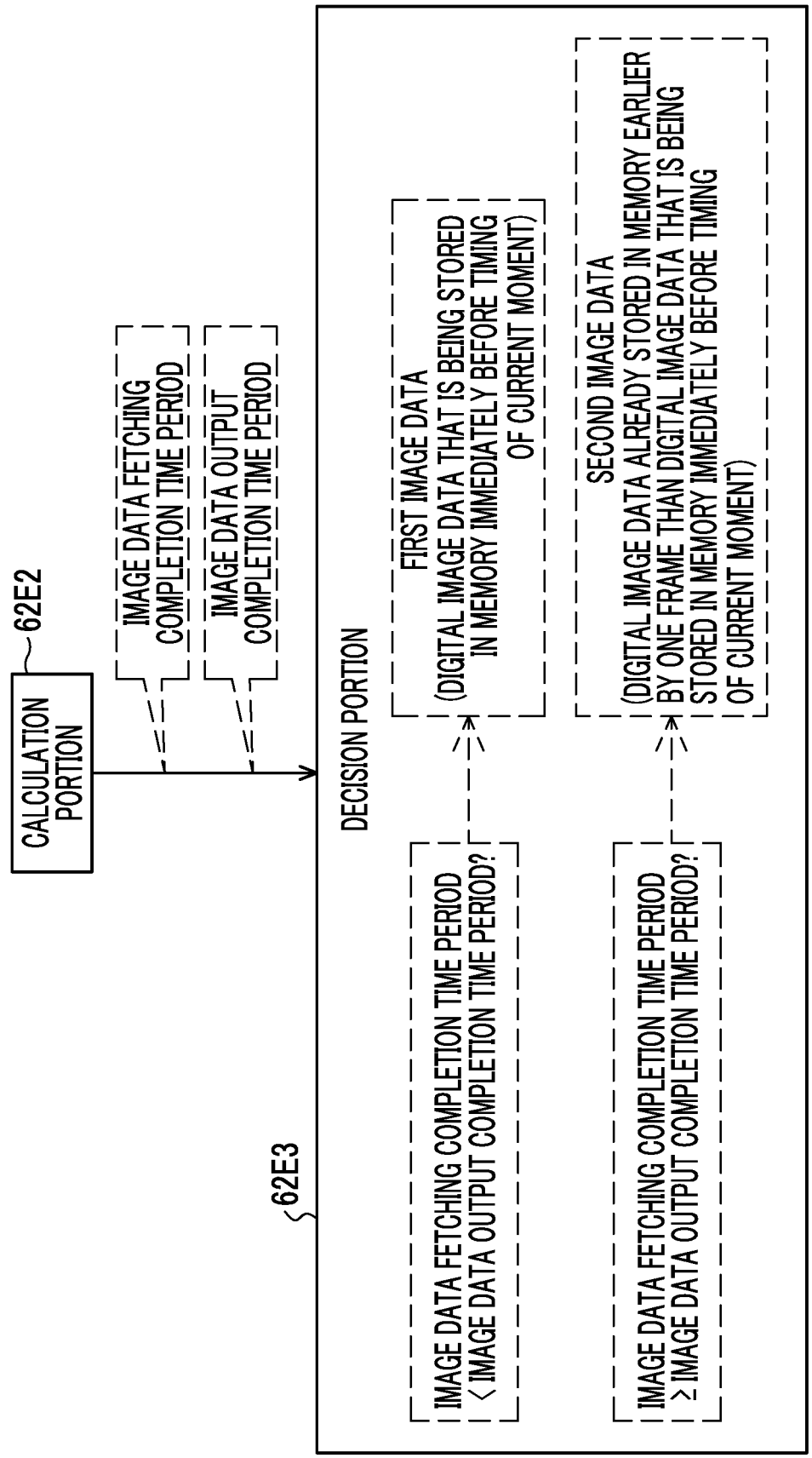
FIG. 24 is a conceptual diagram for describing a processing content of a decision portion in a control circuit of the imaging element included in the imaging apparatus according to the fourth embodiment.

As illustrated in FIG. 24 as an example, the decision portion 62E3 acquires the image data fetching completion time period and the image data output completion time period from the calculation portion 62E2. The decision portion 62E3 decides first image data or second image data as the digital image data 69B of the output target based on the image data fetching completion time period and the image data output completion time period acquired from the calculation portion 62E2. Here, the first image data refers to the digital image data 69B that is being stored in the memory 64 at the current point in time. The second image data refers to the digital image data 69B already stored in the memory 64 earlier by one frame than the digital image data 69B that is being stored in the memory 64 at the current point in time. The first image data is an example of "latest image data" and "image data of one frame related to a subject imaged at a current point in time" according to the embodiments of the technology of the present disclosure. The second image data is an example of the "latest image data" and "image data of which one frame is already stored in a storage portion" according to the embodiments of the technology of the present disclosure. The "digital image data 69B already stored in the memory 64 earlier by one frame than the digital image data 69B that is being stored in the memory 64 at the current point in time" is an example of a "latest one stored in the storage portion" according to the embodiments of the technology of the present disclosure.

In a case where the image data fetching completion time period is shorter than the image data output completion time period, the decision portion 62E3 decides the first image data as the digital image data 69B of the output target. In a case where the image data fetching completion time period is longer than or equal to the image data output completion time period, the decision portion 62E3 decides the second image data as the digital image data 69B of the output target.

Next, a flow of output processing executed by the processing circuit 62 of the imaging element 44 will be described with reference to FIG. 25A and FIG. 25B.

Figure 25A:
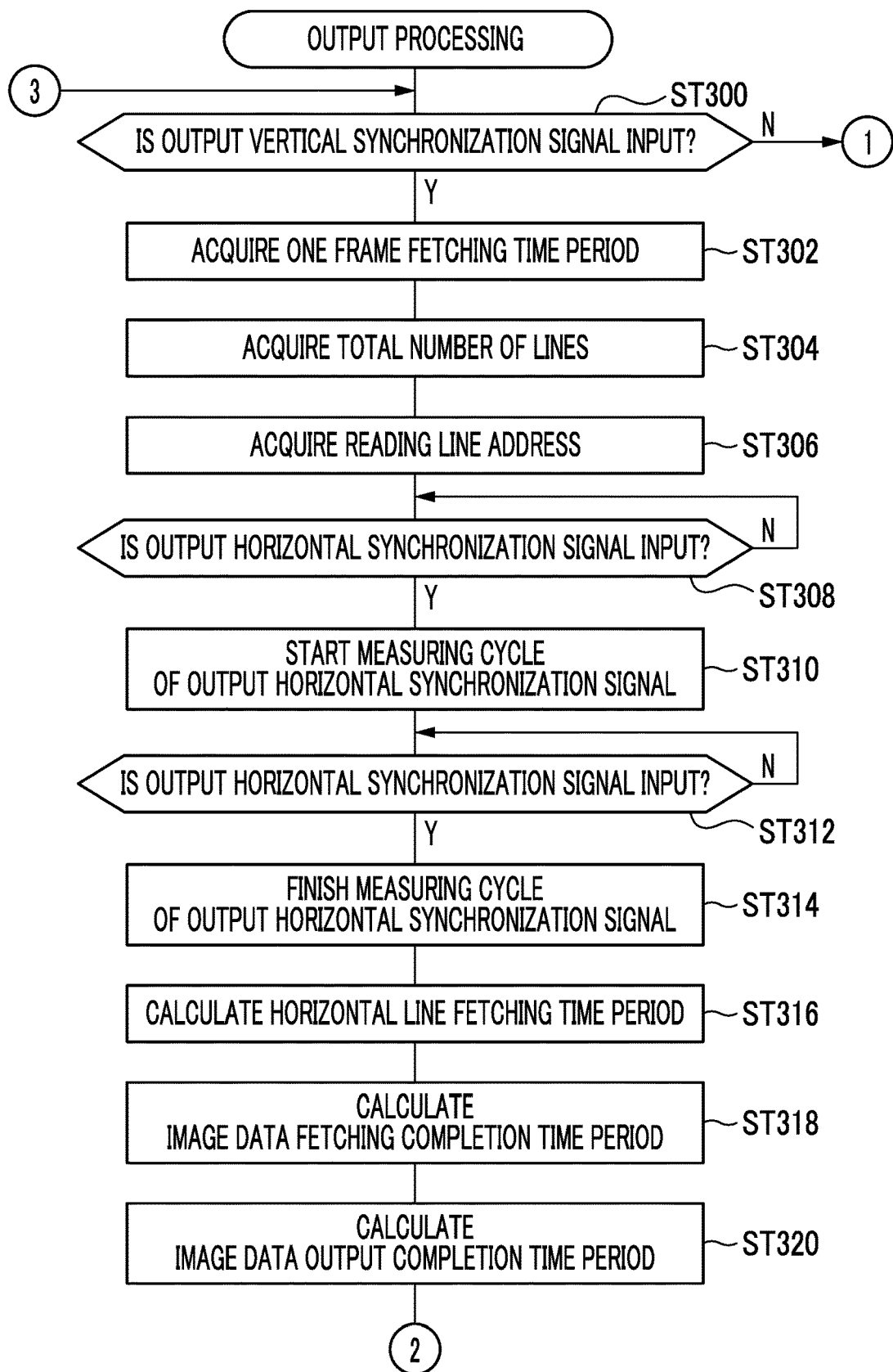
FIG. 25A is a flowchart illustrating an example of a flow of output processing according to the fourth embodiment.

In the output processing illustrated in FIG. 25A, in step ST300, the acquisition portion 62E1 determines whether or not the output vertical synchronization signal is input. In step ST300, in a case where the output vertical synchronization signal is not input, a negative determination is made, and the output processing transitions to step ST338 (refer to FIG. 25B). In step ST300, in a case where the output vertical synchronization signal is input, a positive determination is made, and the output processing transitions to step ST302.

In step ST302, the acquisition portion 62E1 acquires the one frame fetching time period from the image data related information storage region 62F3 (refer to FIG. 22 and FIG. 23). Then, the output processing transitions to step ST304.

In step ST304, the acquisition portion 62E1 acquires the total number of lines from the image data related information storage region 62F3 (refer to FIG. 22 and FIG. 23). Then, the output processing transitions to step ST306.

In step ST306, the acquisition portion 62E1 acquires the reading line address from the reading circuit 62A. Then, the output processing transitions to step ST308.

In step ST308, the calculation portion 62E2 determines whether or not the output horizontal synchronization signal is input. In step ST308, in a case where the output horizontal synchronization signal is not input, a negative determination is made, and the determination of step ST308 is performed again. In step ST308, in a case where the output horizontal synchronization signal is input, a positive determination is made, and a transition is made to step ST310.

In step ST310, the calculation portion 62E2 starts measuring a cycle of the output horizontal synchronization signal. Then, the output processing transitions to step ST312. A start of measuring the cycle of the output horizontal synchronization signal means a start of timing using a timer (not illustrated).

In subsequent step ST312, the calculation portion 62E2 determines whether or not the output horizontal synchronization signal is input. In step ST312, in a case where the output horizontal synchronization signal is not input, a negative determination is made, and the determination of step ST312 is performed again. In step ST312, in a case where the output horizontal synchronization signal is input, a positive determination is made, and a transition is made to step ST314.

In step ST314, the calculation portion 62E2 finishes measuring the cycle of the output horizontal synchronization signal. Then, the output processing transitions to step ST316. A finish of measuring the cycle of the output horizontal synchronization signal means a finish of timing using the timer. The cycle of the output horizontal synchronization signal is a time period from execution of processing of step ST310 to execution of processing of step ST314, that is, a time period measured by the timer.

In step ST316, the calculation portion 62E2 calculates the horizontal line fetching time period from Expression (1). Then, the output processing transitions to step ST318. In step ST316, the one frame fetching time period acquired in step ST302 and the total number of lines acquired in step ST304 are applied as independent variables of Expression (1).

In step ST318, the calculation portion 62E2 calculates the image data fetching completion time period from Expression (2). Then, the output processing transitions to step ST320. In step 318, the current time, the horizontal line fetching time period calculated in step ST316, the total number of lines acquired in step ST304, and the reading line address acquired in step ST306 are applied as independent variables of Expression (2).

In step ST320, the calculation portion 62E2 calculates the image data output completion time period from Expression (3). Then, the output processing transitions to step ST322. In step ST320, the current time, the cycle measured by processing of step ST310 and step ST314, and the total number of lines acquired in step ST304 are applied as independent variables of Expression (3).

Figure 25B:
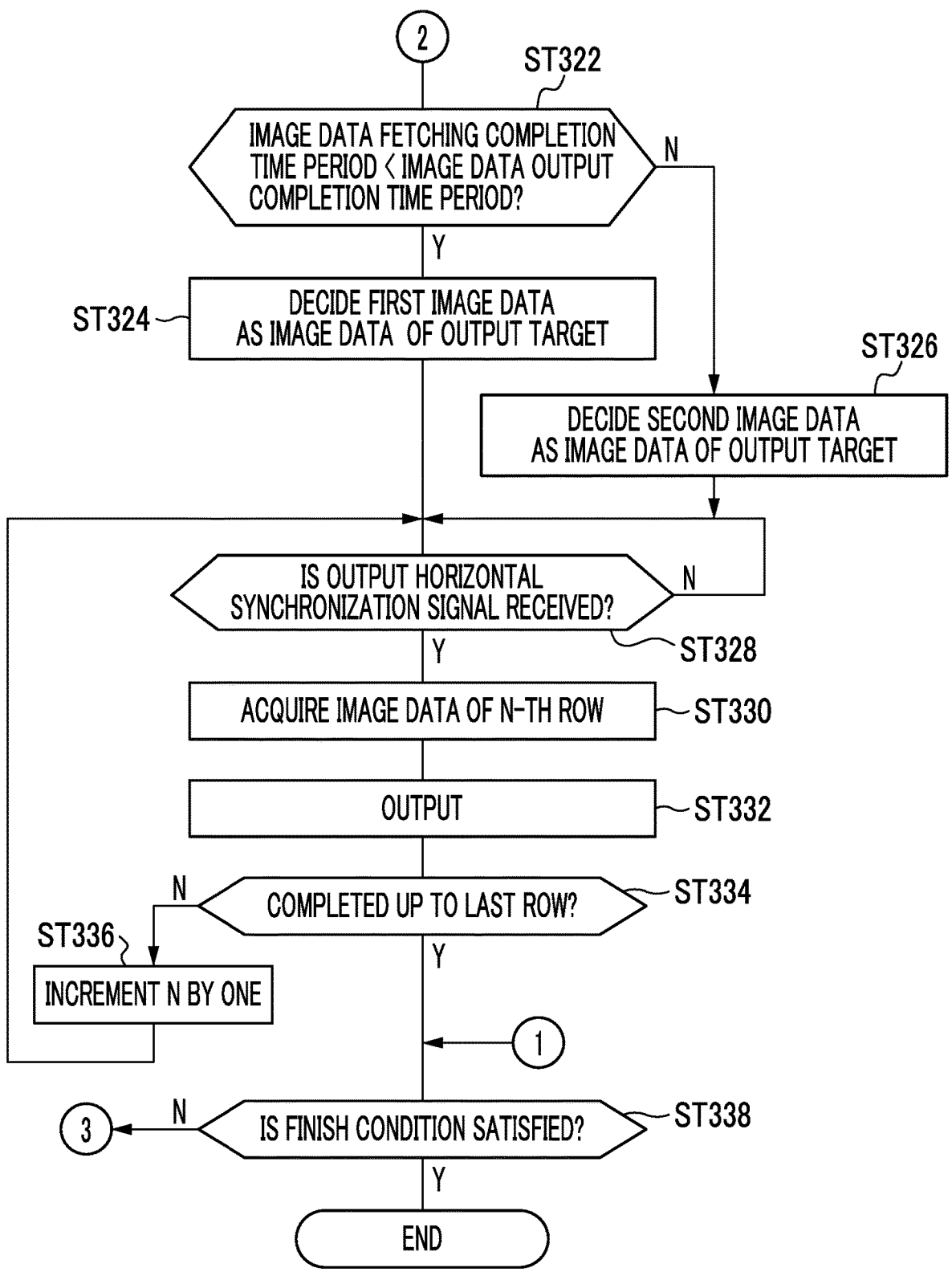
FIG. 25B is a continuation of the flowchart illustrated in FIG. 25A.

In step ST322 illustrated in FIG. 25B, the decision portion 62E3 determines whether or not the image data fetching completion time period calculated in step ST318 is shorter than the image data output completion time period calculated in step ST320. In step ST322, in a case where the image data fetching completion time period calculated in step ST318 is shorter than the image data output completion time period calculated in step ST320, a positive determination is made, and the output processing transitions to step ST324. In step ST322, in a case where the image data fetching completion time period calculated in step ST318 is not shorter than the image data output completion time period calculated in step ST320, a positive determination is made, and the output processing transitions to step ST326.

A case where the positive determination is made in step ST322 is an example of a "case where storage of the image data of one frame related to the subject imaged at the current point in time in the storage portion is completed within an output completion time period" according to the embodiments of the technology of the present disclosure. In addition, a case where the negative determination is made in step ST322 is an example of a "case where storage of the image data of one frame related to the subject imaged at the current point in time in the storage portion is not completed within the output completion time period" according to the embodiments of the technology of the present disclosure.

In step ST324, the decision portion 62E3 decides the first image data as the digital image data 69B of the output target. Then, the output processing transitions to step ST328.

In step ST326, the decision portion 62E3 decides the second image data as the digital image data 69B of the output target. Then, the output processing transitions to step ST328.

In subsequent step ST328, the control circuit 62E determines whether or not the output horizontal synchronization signal is received by the second reception I/F 63B. In step ST328, in a case where the output horizontal synchronization signal is not received by the second reception I/F 63B, a negative determination is made, and the determination of step ST328 is performed again. In step ST328, in a case where the output horizontal synchronization signal is received by the second reception I/F 63B, a positive determination is made, and the output processing transitions to step ST330. In step ST328, in a case where the positive determination is made, the output horizontal synchronization signal is transferred to the control circuit 62E from the second reception I/F 63B through the output circuit 62D.

In subsequent step ST330, in a case where the first image data is decided as the digital image data 69B of the output target in step ST324, the control circuit 62E acquires the digital image data 69B of the horizontal line of the N-th row included in the first image data. In addition, in a case where the second image data is decided as the digital image data 69B of the output target in step ST326, the control circuit 62E acquires the digital image data 69B of the horizontal line of the N-th row included in the second image data. The digital image data 69B of the horizontal line of the N-th row acquired in such a manner is transferred to the output circuit 62D by the control circuit 62E.

In subsequent step ST332, the output circuit 62D outputs the digital image data 69B of the horizontal line of the N-th row, which is input from the control circuit 62E, to the signal processing portion 50 from the output I/F 62D through the communication line 53.

In subsequent step ST334, the control circuit 62E determines whether or not processing of step ST328 to step ST332 is completed up to the horizontal line of the last row. In step ST334, in a case where processing of step ST328 to step ST332 is completed up to the horizontal line of the last row, a positive determination is made, and the output processing transitions to step ST338. In step ST334, in a case where processing of step ST328 to step ST332 is not completed up to the horizontal line of the last row, a negative determination is made, and the output processing transitions to step ST336.

In step ST336, the control circuit 62E increments N by one. Then, the output processing transitions to step ST328.

In step ST338, in the same manner as the first embodiment, the control circuit 62E determines whether or not the output processing finish condition is satisfied. In step ST338, in a case where the output processing finish condition is not satisfied, a negative determination is made, and the output processing transitions to step ST300. In step ST338, in a case where the output processing finish condition is satisfied, a positive determination is made, and the output processing is finished.

As described above, in the imaging apparatus 10, the first image data is output in a case where the image data fetching completion time period is shorter than the image data output completion time period. In addition, the second image data is output in a case where the image data fetching completion time period is longer than or equal to the image data image output completion time period. Accordingly, according to the imaging apparatus 10, both of the real-timeness between imaging and output and avoidance of a delay in output of the digital image data can be established.

In addition, in the imaging apparatus 10, the second image data is the digital image data 69B already stored in the memory 64 earlier by one frame than the digital image data 69B that is being stored in the memory 64 at the current point in time. Accordingly, according to the imaging apparatus 10, the real-timeness between imaging and output can be secured, compared to a case where the digital image data 69B already stored in the memory 64 earlier by a plurality of frames than the digital image data 69B that is being stored in the memory 64 at the current point in time is output.

Furthermore, in the imaging apparatus 10, the image data output completion time period is a time period that is predicted based on the cycle in which the output horizontal synchronization signal is received by the second reception I/F 63B. Accordingly, according to the imaging apparatus 10, the image data output completion time period can be accurately obtained, compared to a case where the image data output completion time period is obtained using a signal other than the output horizontal synchronization signal.

In the fourth embodiment, while the digital image data 69B already stored in the memory 64 earlier by one frame than the digital image data 69B that is being stored in the memory 64 at the current point in time is illustrated as the second image data, the technology of the present disclosure is not limited thereto. Even in a case where the second image data is the digital image data 69B already stored in the memory 64 earlier by a plurality of frames than the digital image data 69B that is being stored in the memory 64 at the current point in time, the technology of the present disclosure is established.

Fifth Embodiment

In the first to fourth embodiments, an example of a form of connecting only the signal processing portion 50 to the processing circuit 62 of the imaging element 44 is illustratively described. In a fifth embodiment, an example of a form of connecting two signal processing portions to the processing circuit 62 of the imaging element 44 will be described. In the fifth embodiment, the same constituents as the first to fourth embodiments will be designated by the same reference signs and will not be described. Hereinafter, parts different from the first to fourth embodiments will be described. In addition, in description of the fifth embodiment, for convenience of description, the imaging apparatus 10 according to the fifth embodiment will be simply referred to as the "imaging apparatus 10".

Figure 26:
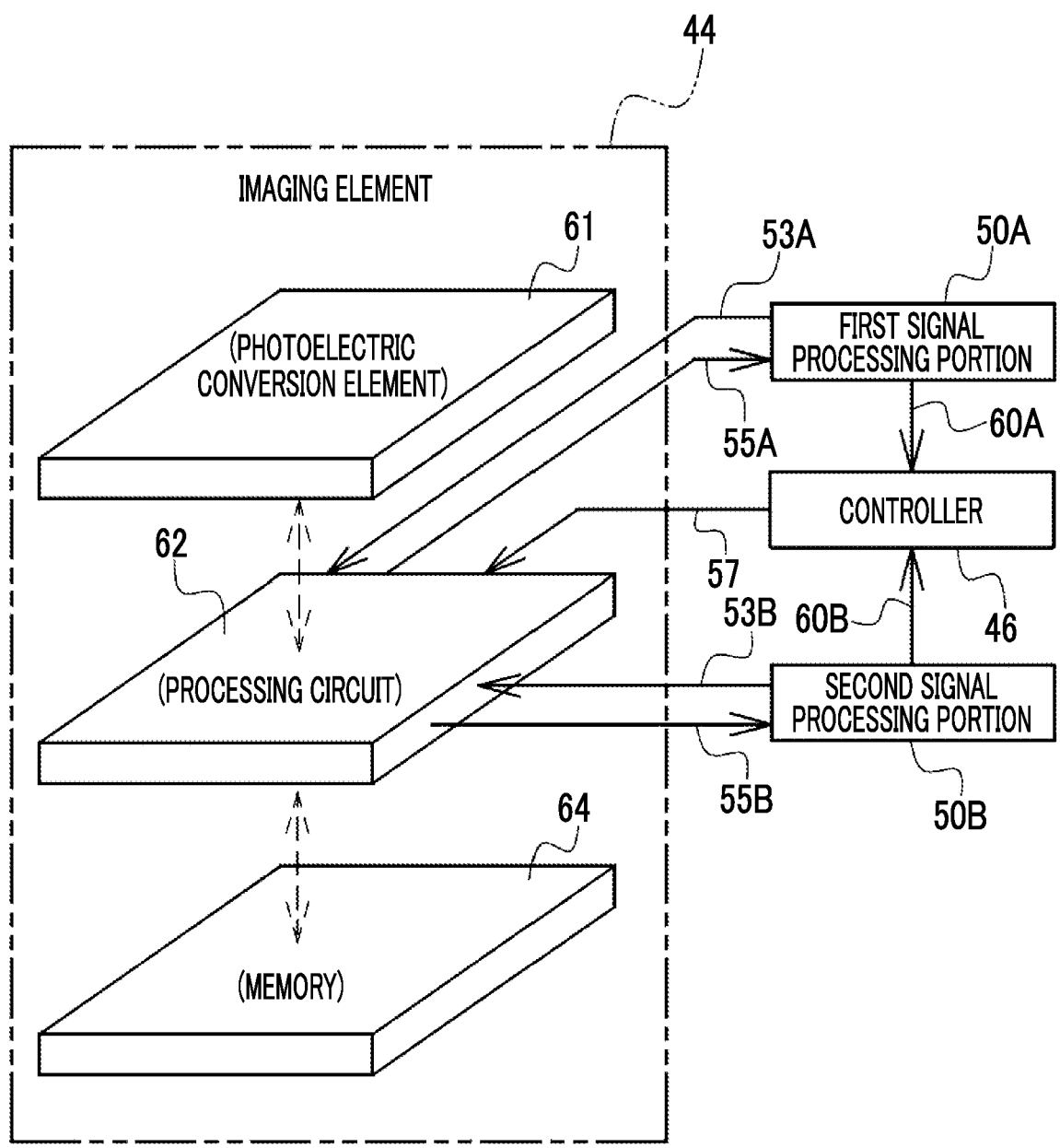
FIG. 26 is a block diagram illustrating an example of a laminated structure of the imaging element included in the imaging apparatus according to the fifth embodiment, and an example of a connection relationship among the imaging element, a first signal processing portion, a second signal processing portion, and a controller.

As illustrated in FIG. 26 as an example, a first signal processing portion 50A is connected to the processing circuit 62 through communication lines 53A and 55A. In addition, a second signal processing portion 50B is connected to the processing circuit 62 through communication lines 53B and 55B. In addition, the first signal processing portion 50A is connected to the controller 46 through a communication line 60A. Furthermore, the second signal processing portion 50B is connected to the controller 46 through a communication line 60B.

Figure 27:
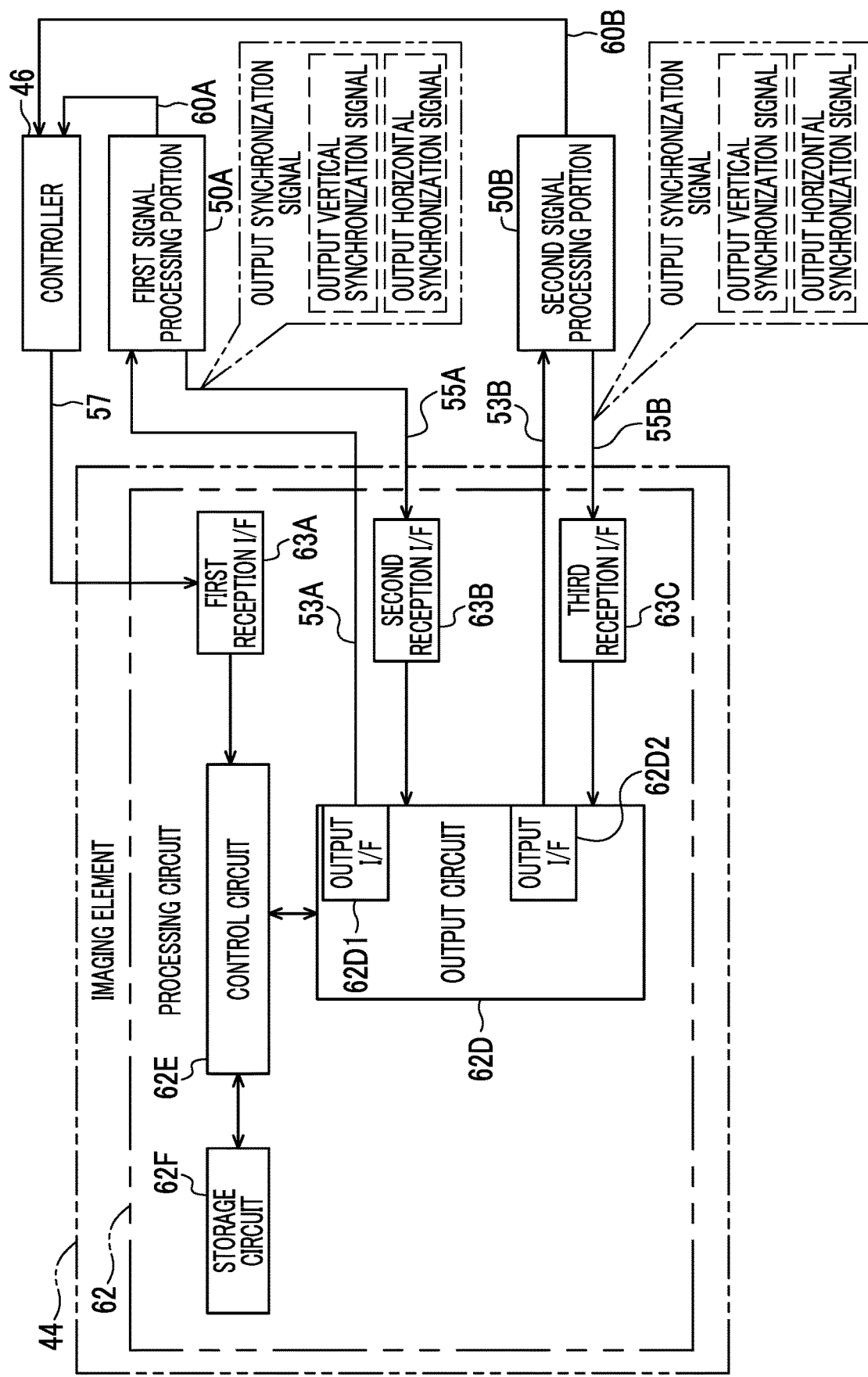
FIG. 27 is a block diagram illustrating an example of a characteristic part of a configuration of an electric system in a processing circuit of the imaging element included in the imaging apparatus according to the fifth embodiment, and an example of a connection relationship among the processing circuit, the first signal processing portion, the second signal processing portion, and the controller.

As illustrated in FIG. 27 as an example, the first signal processing portion 50A is connected to the second reception I/F 63B through the communication line 55A and is connected to the output I/F 62D1 through the communication line 53A. In addition, the first signal processing portion 50A is connected to the controller 46 through the communication line 60A. The first signal processing portion 50A is a device corresponding to the signal processing portion 50 employed in the first to fourth embodiments. Accordingly, the same input and output as input and output performed between the signal processing portion 50 and the output circuit 62D are performed between the output circuit 62D and the first signal processing portion 50A. In addition, the same input and output as input and output performed between the signal processing portion 50 and the controller 46 are performed between the first signal processing portion 50A and the controller 46.

The processing circuit 62 comprises a third reception I/F 63C. The second signal processing portion 50B is connected to the third reception I/F 63C through the communication line 55B. In addition, the output circuit 62D is connected to the third reception I/F 63C. Furthermore, in the same manner as the signal processing portion 50, the second signal processing portion 50B outputs the output synchronization signal to the third reception I/F 63C through the communication line 55B. The output synchronization signal output to the third reception I/F 63C includes the output vertical synchronization signal and the output horizontal synchronization signal.

The output circuit 62D comprises an output I/F 62D2. The output I/F 62D2 is connected to the second signal processing portion 50B through the communication line 53B. In addition, the second signal processing portion 50B is connected to the controller 46 through the communication line 60B.

The second signal processing portion 50B is a device having the same function as the first signal processing portion 50A. Accordingly, the same input and output as input and output performed between the output circuit 62D and the first signal processing portion 50A are performed between the output circuit 62D and the second signal processing portion 50B. In addition, the same input and output as input and output performed between the first signal processing portion 50A and the controller 46 are performed between the second signal processing portion 50B and the controller 46.

In the fifth embodiment, the output I/Fs 62D1 and 62D2 are an example of a "plurality of output interfaces" according to the embodiments of the technology of the present disclosure. The output synchronization signal output from the first signal processing portion 50A and the output synchronization signal output from the second signal processing portion 50B are an example of a "plurality of output synchronization signals respectively corresponding to the plurality of output interfaces" according to the embodiments of the technology of the present disclosure.

As described above, in the imaging apparatus 10, the output synchronization signal output from the first signal processing portion 50A is received by the output I/F 62D1, and the output synchronization signal output from the second signal processing portion 50B is received by the output I/F 62D2. Accordingly, according to the imaging apparatus 10, even in a case where a plurality of output destinations of the digital image data 69B are present, the digital image data 69B can be processed in accordance with a situation of each output destination (the first signal processing portion 50A and the second signal processing portion 50B).

In the fifth embodiment, while two signal processing portions of the first signal processing portion 50A and the second signal processing portion 50B are illustrated as the rear stage circuit of the imaging element 44, the technology of the present disclosure is not limited thereto. For example, three or more signal processing portions may be connected to the processing circuit 62. In this case, the output circuit 62D includes output I/Fs corresponding in number to the signal processing portions, and each output I/F is individually connected to the corresponding signal processing portion. In addition, in the same manner as connection of the third reception I/F 63C to the output circuit 62D and the second signal processing portion 50B, a reception I/F corresponding to the third reception I/F 63C (refer to FIG. 27) is connected to a signal processing portion after a third signal processing portion. Furthermore, the signal processing portion after the third signal processing portion is connected to the controller 46.

In addition, in the fifth embodiment, while an example of a form of performing wired communication between the imaging element 44 and the first signal processing portion 50A through the communication lines 53A and 55A is illustratively described, the technology of the present disclosure is not limited thereto. For example, wireless communication may be performed between the imaging element 44 and the first signal processing portion 50A. Similarly, wireless communication may be performed between the imaging element 44 and the second signal processing portion 50B. In addition, wireless communication may be performed between the imaging element 44 and the controller 46. In addition, wireless communication may be performed between the first signal processing portion 50A and the controller 46. Furthermore, wireless communication may be performed between the second signal processing portion 50B and the controller 46.

In addition, while an example of a form of implementing the processing circuit 62 by an ASIC and an FPGA is illustratively described in each of the embodiments, the technology of the present disclosure is not limited thereto. For example, the imaging processing may be implemented by a software configuration using a computer.

Figure 28:
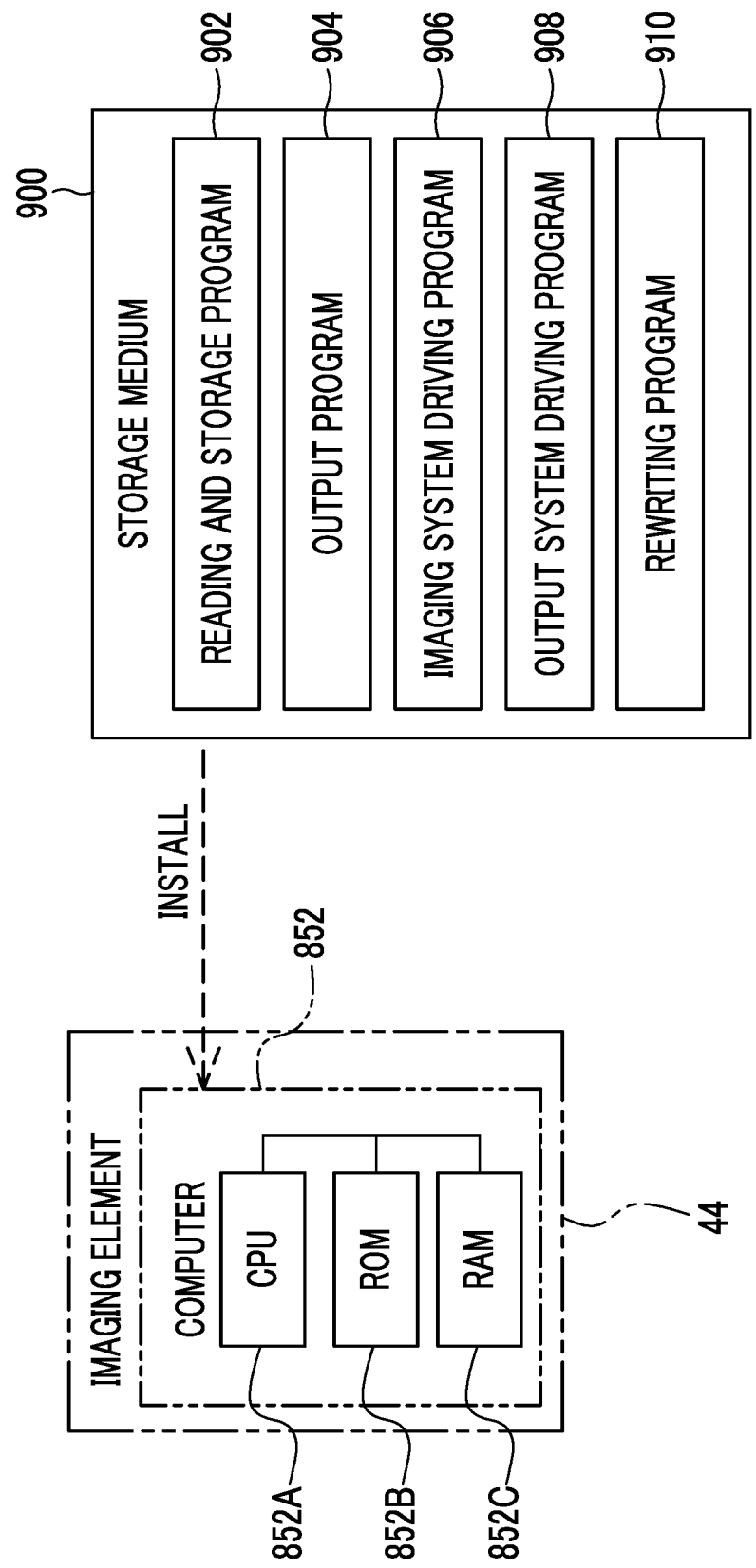
FIG. 28 is a conceptual diagram illustrating an example of an aspect in which various programs are installed on a computer in the imaging element from a storage medium storing the various programs.

In this case, for example, as illustrated in FIG. 28, various programs causing a computer 852 incorporated in the imaging element 44 to execute the reading and storage processing, the output processing, the imaging system driving processing, the output system driving processing, and the rewriting processing are stored in a storage medium 900.

The various programs refer to a reading and storage program 902, an output program 904, an imaging system driving program 906, an output system driving program 908, and a rewriting program 910. The reading and storage program 902 is a program causing the computer 852 to execute the reading and storage processing. The output program 904 is a program causing the computer 852 to execute the output processing. The imaging system driving program 906 is a program causing the computer 852 to execute the imaging system driving processing. The output system driving program 908 is a program causing the computer 852 to execute the output system driving processing. The rewriting program 910 is a program causing the computer 852 to execute the rewriting processing.

As illustrated in FIG. 28 as an example, the computer 852 comprises a CPU 852A, a ROM 852B, and a RAM 852C. The various programs stored in the storage medium 900 are installed on the computer 852. The CPU 852A executes the reading and storage processing in accordance with the reading and storage program 902. In addition, the CPU 852A executes the output processing in accordance with the output program 904. In addition, the CPU 852A executes the imaging system driving processing in accordance with the imaging system driving program 906. In addition, the CPU 852A executes the output system driving processing in accordance with the output system driving program 908. Furthermore, the CPU 852A executes the rewriting processing in accordance with the rewriting program 910.

While a single CPU is illustrated as the CPU 852A here, the technology of the present disclosure is not limited thereto. A plurality of CPUs may be employed instead of the CPU 852A. The storage medium 900 is a non-temporary storage medium. Any portable storage medium such as an SSD or a USB memory is exemplified as an example of the storage medium 900.

While the various programs are stored in the storage medium 900 in the example illustrated in FIG. 28, the technology of the present disclosure is not limited thereto. For example, the various programs may be stored in advance in the ROM 852B, and the CPU 852A may read out the various programs from the ROM 852B, load the various programs into the RAM 852C, and execute the loaded various programs.

In addition, the various programs may be stored in a storage portion of another computer, a server apparatus, or the like connected to the computer 852 through a communication network (not illustrated), and the various programs may be downloaded to the computer 852 in response to a request from the imaging apparatus 10. In this case, the downloaded various programs are executed by the CPU 852A of the computer 852.

In addition, the computer 852 may be disposed on the outside of the imaging element 44. In this case, the computer 852 may control the processing circuit 62 in accordance with the various programs.

The following various processors can be used as a hardware resource for executing the reading and storage processing, the output processing, the imaging system driving processing, the output system driving processing, and the rewriting processing (hereinafter, referred to as "various types of processing") described in each of the embodiments. For example, as described above, a CPU that is a general-purpose processor functioning as the hardware resource for executing the various types of processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor.

The hardware resource for executing the various types of processing may be configured with one of those various processors or may be configured with a combination of two or more processors of the same type or different types (for example, a combination of a plurality of FPGAs or a combination of a CPU and an FPGA). In addition, the hardware resource for executing the various types of processing may be one processor.

As an example of a configuration with one processor, first, as represented by a computer such as a client and a server, a form in which one processor is configured with a combination of one or more CPUs and software, and in which this processor functions as a hardware resource for executing in-imaging element processing is available. Second, as represented by a system-on-a-chip (SoC) or the like, a form of using a processor that implements, by one IC chip, a function of the entire system including a plurality of hardware resources for executing the various types of processing is available. In such a manner, the in-imaging element processing is implemented using one or more of the various processors as the hardware resource.

Furthermore, as a hardware structure of those various processors, more specifically, an electric circuit in which circuit elements such as semiconductor elements are combined can be used.

Figure 29:
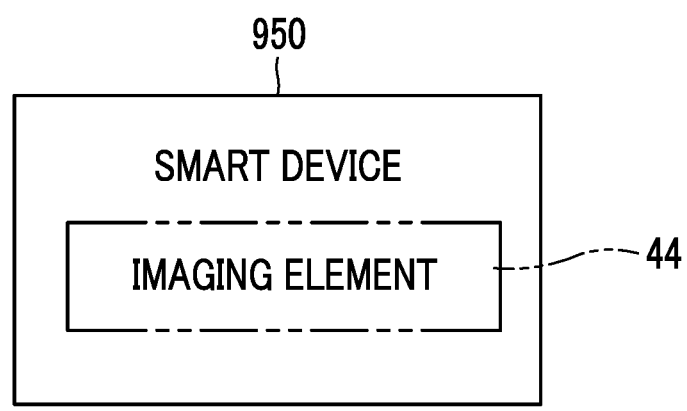
FIG. 29 is a block diagram illustrating an example of a schematic configuration of a smart device incorporating the imaging element according to the first to fifth embodiments.

While an interchangeable lens camera is illustrated as the imaging apparatus 10 in each of the embodiments, the technology of the present disclosure is not limited thereto. For example, the technology of the present disclosure may be applied to a smart device 950 illustrated in FIG. 29. The smart device 950 illustrated in FIG. 29 as an example is an example of the imaging apparatus according to the embodiments of the technology of the present disclosure. The imaging element 44 described in the embodiments is mounted in the smart device 950. Even with the smart device 950 configured in such a manner, the same actions and effects as the imaging apparatus 10 described in each of the embodiments are obtained. The technology of the present disclosure can be applied to not only the smart device 950 but also a personal computer or a wearable terminal apparatus.

In addition, while the first display 32 and the second display 86 are illustrated in each of the embodiments, the technology of the present disclosure is not limited thereto. For example, a separate display that is retrofit into the imaging apparatus main body 12 may be used as the "display portion (display)" according to the embodiments of the technology of the present disclosure.

In addition, the various types of processing are merely an example. Accordingly, unnecessary steps may be deleted, new steps may be added, or a processing order may be rearranged without departing from a gist of the present disclosure.

Above described contents and illustrated contents are detailed description for parts according to the embodiments of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiments of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, and technical standards are specifically and individually indicated to be incorporated by reference.

What is claimed is:

1. An imaging element comprising:
    a reception interface that receives an imaging synchronization signal related to a timing of imaging, and at least one output synchronization signal related to a timing of output of image data obtained by imaging, from an exterior of the imaging element;
    a memory that is incorporated in the imaging element and stores the image data obtained by imaging at a first frame rate in accordance with the imaging synchronization signal received by the reception interface; and
    an output circuit that is incorporated in the imaging element and outputs the image data stored in the memory at a second frame rate in accordance with the output synchronization signal received by the reception interface, wherein:
    the first frame rate is greater than or equal to the second frame rate,
    the reception interface includes a first reception interface and a second reception interface,
    the first reception interface receives the imaging synchronization signal from the exterior, and
    the second reception interface receives the output synchronization signal from the exterior.

2. The imaging element according to claim 1, wherein the imaging synchronization signal includes at least one of an imaging vertical synchronization signal or an imaging horizontal synchronization signal.

3. The imaging element according to claim 1, wherein the output synchronization signal is a signal including at least one of an output vertical synchronization signal or an output horizontal synchronization signal.

4. The imaging element according to claim 1, wherein:
    the output circuit includes a plurality of output interfaces, and
    the reception interface receives a plurality of the output synchronization signals respectively corresponding to the plurality of output interfaces.

5. The imaging element according to claim 1, wherein the output circuit outputs most recent image data that is stored in the memory at a point in time at which the output synchronization signal is received by the reception interface.

6. The imaging element according to claim 1,
    wherein the imaging synchronization signal includes an imaging vertical synchronization signal, and
    the imaging element further comprises:
        an imaging system holding circuit that holds imaging system driving method instruction information for providing an instruction for a driving method of an imaging system of the imaging element, and
        an imaging system control circuit that, in a case in which the imaging vertical synchronization signal is received by the reception interface, performs a control for driving the imaging system using the driving method of the instruction provided by the imaging system driving method instruction information held by the imaging system holding circuit.

7. The imaging element according to claim 6, wherein:
    the reception interface receives imaging system rewriting content information indicating a content of rewriting of the imaging system driving method instruction information, and
    in a case in which the imaging system rewriting content information is received by the reception interface, the imaging system driving method instruction information held by the imaging system holding circuit is rewritten with the content indicated by the imaging system rewriting content information.

8. The imaging element according to claim 7, wherein the imaging system driving method instruction information is information including at least one of information related to an imaging region, information related to pixel thinning, information related to a pixel addition method, information related to an exposure time period, information related to conversion gain switching, information related to an analog gain, or information related to A/D conversion accuracy.

9. The imaging element according to claim 1,
    wherein the output synchronization signal includes an output vertical synchronization signal, and
    the imaging element further comprises:
        an output system holding circuit that holds output system driving method instruction information for providing an instruction for a driving method of an output system of the imaging element, and
        an output system control circuit that, in a case in which the output vertical synchronization signal is received by the reception interface, performs a control for driving the output system using the driving method of the instruction provided by the output system driving method instruction information held by the output system holding circuit.

10. The imaging element according to claim 9, wherein:
    the reception interface receives output system rewriting content information indicating a content of rewriting of the output system driving method instruction information, and
    in a case where the output system rewriting content information is received by the reception interface, the output system driving method instruction information held by the output system holding circuit is rewritten with the content indicated by the output system rewriting content information.

11. The imaging element according to claim 9, wherein the output system driving method instruction information is information including at least one of information related to an output destination, information related to digital thinning, information related to a digital addition method, information related to an average number of output frames, information related to a digital gain, information related to the number of A/D output bits, or information related to a method of filling a lower empty bit.

12. The imaging element according to claim 1, wherein at least a photoelectric conversion element and the memory are formed in one chip.

13. The imaging element according to claim 12, wherein the imaging element is a layered imaging element in which the photoelectric conversion element is layered with the memory.

14. An imaging apparatus comprising:
the imaging element according to claim 1; and
a display processor configured to perform a control for displaying an image based on the image data output by the output circuit on a display.

15. An imaging element, comprising:
a reception interface that receives an imaging synchronization signal related to a timing of imaging, and at least one output synchronization signal related to a timing of output of image data obtained by imaging, from an exterior of the imaging element;
a memory that is incorporated in the imaging element and stores the image data obtained by imaging at a first frame rate in accordance with the imaging synchronization signal received by the reception interface; and
an output circuit that is incorporated in the imaging element and outputs the image data stored in the memory at a second frame rate in accordance with the output synchronization signal received by the reception interface,
wherein the first frame rate is greater than or equal to the second frame rate,
the output circuit outputs a most recent item of image data among a plurality of items of the image data, and
in a case in which storage of the image data for one frame related to a subject imaged at a current point in time in the memory is completed within an output completion time period predicted as a time period in which output of the image data of one frame will be completed, the most recent item of image data comprises the image data for one frame related to the subject imaged at the current point in time, and in a case in which storage of the image data for one frame related to the subject imaged at the current point in time in the memory is not completed within the output completion time period, the most recent item of image data is the image data for which one frame is already stored in the memory.

16. The imaging element according to claim 15, wherein in a case in which storage of the most recent item of image data in the memory is not completed within the output completion time period, the most recent item of image data is a most recent item in the memory.

17. The imaging element according to claim 15,
wherein the output synchronization signal includes an output horizontal synchronization signal, and
the output completion time period is a time period that is predicted based on a cycle in which the output horizontal synchronization signal is received by the reception interface.

18. A method of operating an imaging element that includes a reception interface, a memory, and an output circuit and incorporates the memory and the output circuit, the method comprising:
by the reception interface, receiving an imaging synchronization signal related to a timing of imaging, and at least one output synchronization signal related to a timing of output of image data obtained by imaging, from an exterior of the imaging element;
by the memory, storing the image data obtained by imaging at a first frame rate in accordance with the imaging synchronization signal received by the reception interface;
by the output circuit, outputting the image data stored in the memory at a second frame rate in accordance with the output synchronization signal received by the reception interface; and
setting the first frame rate to be greater than or equal to the second frame rate, wherein:
the reception interface includes a first reception interface and a second reception interface,
the first reception interface receives the imaging synchronization signal from the exterior, and
the second reception interface receives the output synchronization signal from the exterior.

19. A non-transitory computer-readable storage medium storing a program executable by a computer to function as a reception interface and an output circuit included in an imaging element that includes the reception interface, a memory, and the output circuit and incorporates the memory and the output circuit, wherein:
the reception interface receives an imaging synchronization signal related to a timing of imaging, and at least one output synchronization signal related to a timing of output of image data obtained by imaging, from an exterior of the imaging element,
the memory stores the image data obtained by imaging at a first frame rate in accordance with the imaging synchronization signal received by the reception interface,
the output circuit outputs the image data stored in the memory at a second frame rate in accordance with the output synchronization signal received by the reception interface,
the first frame rate is greater than or equal to the second frame rate,
the reception interface includes a first reception interface and a second reception interface,
the first reception interface receives the imaging synchronization signal from the exterior, and
the second reception interface receives the output synchronization signal from the exterior.

* * * * *